(12) United States Patent
Koseki et al.

(10) Patent No.: US 9,405,478 B2
(45) Date of Patent: Aug. 2, 2016

(54) STORAGE APPARATUS PROVIDED WITH A PLURALITY OF NONVOLATILE SEMICONDUCTOR STORAGE MEDIA AND STORAGE CONTROL METHOD

(75) Inventors: Hideyuki Koseki, Machida (JP); Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 568 days.

(21) Appl. No.: 13/391,728

(22) PCT Filed: Feb. 8, 2012

(86) PCT No.: PCT/JP2012/000843
§ 371 (c)(1),
(2), (4) Date: Feb. 22, 2012

(87) PCT Pub. No.: WO2013/118170
PCT Pub. Date: Aug. 15, 2013

(65) Prior Publication Data
US 2013/0205070 A1    Aug. 8, 2013

(51) Int. Cl.
*G06F 12/00* (2006.01)
*G06F 3/06* (2006.01)

(52) U.S. Cl.
CPC ............ *G06F 3/0616* (2013.01); *G06F 3/0647* (2013.01); *G06F 3/0688* (2013.01)

(58) Field of Classification Search
CPC .............. G06F 12/0246; G06F 3/0679; G06F 2212/2022; G06F 2212/7211; G11C 16/102
USPC ........................................................ 711/103
See application file for complete search history.

(56) References Cited

U.S. PATENT DOCUMENTS

| | | | |
|---|---|---|---|
| 5,737,742 | A | 4/1998 | Achiwa et al. |
| 7,409,492 | B2 | 8/2008 | Tanaka et al. |

(Continued)

FOREIGN PATENT DOCUMENTS

| | | |
|---|---|---|
| EP | 1 840 722 A2 | 10/2007 |
| EP | 1 876 519 A2 | 1/2008 |

(Continued)

OTHER PUBLICATIONS

PCT International Search Report and Written Opinion on application PCT/JP2012/000843 mailed Jul. 25, 2012; 12 pages.

(Continued)

*Primary Examiner* — Charles Rones
*Assistant Examiner* — Nanci Wong
(74) *Attorney, Agent, or Firm* — Foley & Lardner LLP

(57) ABSTRACT

A storage apparatus is provided with a plurality of nonvolatile semiconductor storage media and a storage controller that is a controller that is coupled to the plurality of semiconductor storage media. The storage controller identifies a first semiconductor storage unit that is at least one semiconductor storage media and a second semiconductor storage unit that is at least one semiconductor storage media and that is provided with a remaining length of life shorter than that of the first semiconductor storage unit based on the remaining life length information that has been acquired. The storage controller moreover identifies a first logical storage region for the first semiconductor storage unit and a second logical storage region that is provided with a write load higher than that of the first logical storage region for the second semiconductor storage unit based on the statistics information that indicates the statistics that is related to a write for every logical storage region. The storage controller reads data from the first logical storage region and the second logical storage region, and writes data that has been read from the first logical storage region to the second logical storage region and/or writes data that has been read from the second logical storage region to the first logical storage region.

20 Claims, 38 Drawing Sheets

(56) References Cited

U.S. PATENT DOCUMENTS

| | | | |
|---|---|---|---|
| 2007/0271413 A1* | 11/2007 | Fujibayashi et al. | 711/112 |
| 2008/0010398 A1* | 1/2008 | Jiang | 711/103 |
| 2008/0091748 A1* | 4/2008 | Beniyama et al. | 707/205 |
| 2008/0250270 A1* | 10/2008 | Bennett | 714/6 |
| 2009/0144516 A1* | 6/2009 | Sandorfi | 711/163 |
| 2010/0005228 A1* | 1/2010 | Fukutomi et al. | 711/103 |
| 2010/0100678 A1* | 4/2010 | Kobayashi | 711/114 |
| 2010/0205359 A1* | 8/2010 | Tanaka et al. | 711/103 |
| 2010/0257306 A1* | 10/2010 | Kawaguchi | 711/103 |
| 2010/0332749 A1* | 12/2010 | Benhase et al. | 711/114 |
| 2011/0078398 A1* | 3/2011 | Jess | 711/162 |
| 2011/0145474 A1* | 6/2011 | Intrater | G06F 13/385 711/103 |
| 2011/0185124 A1 | 7/2011 | Koseki | |
| 2011/0258363 A1* | 10/2011 | Doatmas et al. | 711/103 |
| 2011/0320717 A1* | 12/2011 | Doi | 711/118 |
| 2012/0117304 A1* | 5/2012 | Worthington et al. | 711/103 |
| 2013/0138867 A1* | 5/2013 | Craft et al. | 711/103 |

FOREIGN PATENT DOCUMENTS

| | | |
|---|---|---|
| GB | 2479235 A | 10/2011 |
| JP | 2007-265265 A | 10/2007 |
| JP | 2008-015769 A | 1/2008 |
| JP | 2008-310685 A | 12/2008 |
| WO | WO 2011/010344 A1 | 1/2011 |

OTHER PUBLICATIONS

Japan Patent Office; Notification of Reasons for Refusal on application 2014-534292 mailed Mar. 31, 2015; 3 pages.

* cited by examiner

| RG# | Disk type | RAID Level | RAID configuration | Disk# | | | |
|---|---|---|---|---|---|---|---|
| 0 | SSD (SLC) | RAID 5 | 3D + 1P | 1 | 10 | ... | — |
| 1 | SSD (SLC) | RAID 6 | 6D + 2P | 33 | 34 | ... | 40 |
| 2 | SSD (MLC) | RAID 1 | 3D + 3P | | | ... | |
| 3 | SSD (MLC) | RAID 1+0 | 3D + 3P | | | ... | |
| n | HDD | RAID 5 | 7D + 1P | | | ... | |

13201, 13202, 13203, 13204, 13205

RG management TBL — 13200

Fig. 5

| Pool# | RG# | RG remaining capacity (GB) | Pool remaining capacity (GB) |
|---|---|---|---|
| 0 | 0 | 123 GB | 3456 GB |
| | 1 | 234 GB | |
| | 2 | 321 GB | |
| | 3 | 456 GB | |
| | n | n | |

Pool management TBL 13300

13301 Pool#
13302 RG#
13303 RG remaining capacity (GB)
13304 Pool remaining capacity (GB)

Fig. 6

| Extent# | RG# | Size | Disk Type | Disk# | Stripe# | Start-LBA | Last-LBA | Allocation flag |
|---|---|---|---|---|---|---|---|---|
| 0 | 0 | 1GB | SSD (MLC) | 0 | 1 | 0 | 100 | Done |
| | | | | 1 | 21 | 120 | 220 | |
| | | | | 2 | 56 | 2 | 102 | |
| | | | | 3 | 45 | 4321 | 4421 | |
| | | | | n | n | n | m | |

Extent management TBL 13400

13401 Extent#
13402 RG#
13403 Size
13404 Disk Type
13405 Disk#
13406 Stripe#
13407 Start-LBA
13408 Last-LBA
13409 Allocation flag

Fig. 7

| Virtual volume# | Virtual capacity | Real used capacity | Virtual extent# | Allocating extent# |
|---|---|---|---|---|
| | | | 0 | 0 |
| | | | 1 | 100 |
| 0 | 800 GB | 150 GB | 2 | n |
| | | | 3 | - |
| | | | ... | ... |
| | | | n | - |
| 13501 | 13502 | 13503 | 13504 | 13505 |

Virtual volume management TBL — 13500

| Disk# | Extent# | WR IOPS | RD IOPS | Ave WR I/O Size | WR I/O pattern | WR rate | WR amount | RD amount |
|---|---|---|---|---|---|---|---|---|
| 0 | 1 | 2000 | 1000 | 4KB | RND | 80% | 20MB | 1MB |
|  | 2 | 10 | 50 | 64KB | SEQ | 20% | 100MB | 500MB |
| ⋮ | ⋮ | ⋮ | ⋮ | ⋮ | ⋮ | ⋮ | ⋮ | ⋮ |

13601 / 13602 / 13603 / 13604 / 13605 / 13606 / 13607 / 13608 / 13609

Statistics information management TBL — 13600

| Disk# | Extent# | WR amount | FM WR predicted amount |
|---|---|---|---|
| 0 | 1 | 20MB | 20MB |
| | 2 | 100MB | 100MB |
| ⋮ | ⋮ | ⋮ | ⋮ |

13701  13702  13706  13708

FM WR amount prediction TBL  13700

Fig. 10

| Start LBA | Chunk# | Block# | Page# |
|---|---|---|---|
| 0 | 0 | 0 | 0 |
| 8KB | 1 | 0 | 1 |
| 16KB | 2 | 0 | 2 |
| ... | 3 | ... | 3 |
| n | n | n | n |

Logical physical conversion TBL 23100

23101 — Start LBA
23102 — Chunk#
23103 — Block#
23104 — Page#

Fig. 15

| SSD unit | | | Chunk unit | | |
|---|---|---|---|---|---|
| SSD# | WR amount | Remaining erasing frequency | Chunk# | WR amount | Remaining erasing frequency |
| 1 | 112345 MB | 1234567 | 1 | 2094 MB | 12345 |
| | | | 2 | 4523 MB | 56789 |
| | | | ... | ... | ... |

Statistics information management TBL 23200

FM WR amount prediction TBL — 13700

| Disk# | Extent# | Ave WR I/O Size | WR I/O pattern | WR rate | WR amount | Predicted WA | FM WR predicted amount |
|---|---|---|---|---|---|---|---|
| 0 | 1 | 4KB | RND | 80% | 20MB | 7.0 | 140MB |
|   | 2 | 64KB | SEQ | 20% | 100MB | 1.1 | 110MB |
|   | ... | ... | ... | ... | ... | ... | ... |
| ... |   |   |   |   |   |   |   |

Column labels: 13701, 13702, 13703, 13704, 13705, 13706, 13707, 13708

13800 — WR information storage table

| WA I/O Pattern 13801 | Average WR I/O Size 13802 | Predicted WA 13803 |
|---|---|---|
| Sequential | 256KB | 1.0 |
| | 8KB | |
| | 4KB | |
| | 2KB | |
| Random | 256KB | 2.5 |
| | 8KB | 1.5 |
| | 4KB | 3.0 |
| | 2KB | 6.0 |

Fig. 34

| Disk# | Extent # | Ave WR I/O Size | WR I/O pattern | WR rate | WR amount | Predicted WA | Chunk# | Chunk WR amount | FM WR predicted amount |
|---|---|---|---|---|---|---|---|---|---|
| 0 | 1 | 4KB | RND | 80% | 20MB | 6.3 | 1 | 250MB | 126MB |
|  | 2 | 64KB | SEQ | 20% | 100MB | 1.2 |  |  | 120MB |
| ⋮ | ⋮ | ⋮ | ⋮ | ⋮ | ⋮ | ⋮ | ⋮ | ⋮ | ⋮ |

FM WR amount prediction TBL 13700

Fig. 36

STORAGE APPARATUS PROVIDED WITH A PLURALITY OF NONVOLATILE SEMICONDUCTOR STORAGE MEDIA AND STORAGE CONTROL METHOD

TECHNICAL FIELD

The present invention relates to a storage control of a storage apparatus that is provided with a plurality of nonvolatile semiconductor storage media.

BACKGROUND ART

A storage apparatus is provided with a physical storage medium that is configured to store data and a controller that is configured to control a physical storage medium in general. The controller provides a data store space (a logical volume in general) to a computer (such as a host) that is coupled to a storage apparatus.

A storage apparatus enables an I/O processing to be executed at a high speed and can show a high fault tolerance to a failure of a physical storage medium by using a plurality of physical storage media with a RAID (Redundant Array of Independent (or Inexpensive) Disks) configuration.

A storage apparatus is equipped with an HDD (Hard Disk Drive) as a physical storage medium in general. In recent years however, a physical storage medium that is provided with a flash memory (hereafter referred to as an FM) such as an SSD (Solid State Drive) has attracted attention as a new physical storage medium as substitute for an HDD.

The SSD is provided with a merit of an extremely high speed of an I/O processing as compared with an HDD. However, there is an upper limit to the frequency of write of data for the SSD and a length of life of an SSD is shorter than that of an HDD disadvantageously. The disadvantages of the SSD will be described in the following.

In the case in which data of a flash memory (a flash memory of a NAND type typically) is tried to be rewritten, data cannot be overwritten on a physical region that has stored the data. In order to rewrite data to the data on the physical region, after an erasing processing is executed to data on the physical region in a unit of a block that is an erasing unit of a flash memory (hereafter referred to as a block erasing), it is necessary to write data on the physical region in which the block erasing has been executed.

However, the number of times of a block erasing (hereafter referred to as a frequency of erasing) for each block is limited because of a physical restriction of a flash memory. In the case in which a frequency of erasing of a block exceeds the limit, data cannot be stored into the block. In other words, a length of life of an SSD is when a frequency of erasing of all blocks that configure the SSD exceeds the upper limit.

A length of life of an SSD is lengthened by using a method called a wear leveling (hereafter referred to as a WL) for a general SSD. This is a technique for leveling a frequency of erasing between blocks and for suppressing only a specific block from being degraded by controlling a store location of data in such a manner that data that is updated with a low frequency is stored into a block that is provided with a more frequency of erasing and data that is updated with a high frequency is stored into a block that is provided with a less frequency of erasing.

In the case in which an SSD is adopted as a physical storage medium of a storage apparatus, a plurality of SSDs is mounted on the storage apparatus in general. In other words, even in the case in which only a specific block can be suppressed from being degraded, an imbalance occurs to loads between SSDs and a load is concentrated solely on a specific SSD in some cases. Patent Literature 1 discloses a method for implementing a long life of the entire of a storage apparatus by applying the WL to SSDs and by leveling an erasing frequency between a plurality of SSDs. A WL that is executed between physical storage media such as an SSD is referred to as an "inter-device WL" in the following.

CITATION LIST

Patent Literature

PTL 1: WO/2011/010344

SUMMARY OF INVENTION

Technical Problem

A controller of a storage apparatus (hereafter referred to as a storage controller) decides data of a movement target for an inter-device WL. Consequently, it is necessary that the storage controller comprehends the internal information of an SSD. The internal information is information such as a data write amount to a flash memory and a remaining erasing frequency. In the case in which a granularity of the information is finer (that is, the information is more detailed), an execution accuracy of an inter-device WL is improved. This means that the storage controller can comprehend an SSD, data of the SSD, and an SSD to which the data is to be moved. For instance, Patent Literature 1 discloses a technique in which the storage controller can comprehend the internal information of the SSD in a physical block unit in detail to implement an inter-device WL. For Patent Literature 1, the storage controller controls the information of an erasing frequency of a plurality of blocks in each SSD.

However in this case, since the internal information of each SSD is detailed, an amount of the internal information of each SSD is large, and a memory of a large capacity is required for the storage controller. A huge amount of internal information from each SSD is stored into the memory. Consequently, in the case in which the storage controller levels an erasing frequency, it is necessary that the storage controller refers to a huge amount of internal information that has been stored into the memory. Therefore, a load of the storage controller is larger.

Such a problem may occur for a storage apparatus that is provided with nonvolatile semiconductor storage media in which an erasing frequency is limited other than the SSD.

Solution of Problem

A storage apparatus is provided with a plurality of nonvolatile semiconductor storage media and a storage controller that is a controller that is coupled to the plurality of semiconductor storage media.

Each of the semiconductor storage media unit is configured by at least one non-volatile semiconductor storage media and is a basis of a logical storage region. The storage controller writes data based on data of a write target to a semiconductor storage unit that is a basis of a logical storage region of a write destination of a plurality of logical storage regions. The storage controller acquires the internal information from each of the semiconductor storage media on a regular basis or on an irregular basis for instance, and stores the internal information that has been acquired for every semiconductor storage medium.

The storage controller stores the statistics information that indicates the statistics that is related to a write for every logical storage region, and stores the remaining life length information that is the information that is related to a remaining length of life of each of the semiconductor storage media. The remaining life length information can be a numerical value that indicates a remaining length of life itself, can be an attribute that has an effect on a remaining length of life (for instance, a storage media type such as a single level cell and a multi-level cell), and can be a numerical value that is used for predicting (calculating) a remaining length of life. The storage apparatus can be provided with a physical storage medium of other type (such as a hard disk drive) in addition to a plurality of semiconductor storage media.

The storage controller identifies a first semiconductor storage unit and a second semiconductor storage unit that is provided with a remaining length of life shorter than that of the first semiconductor storage unit based on the remaining life length information that has been acquired.

The storage controller moreover identifies a first logical storage region for the first semiconductor storage unit and a second logical storage region that is provided with a write load higher than that of the first logical storage region for the second semiconductor storage unit based on the statistics information that indicates the statistics that is related to a write for every logical storage region.

The storage controller reads data from the first logical storage region and the second logical storage region, and writes data that has been read from the first logical storage region to the second logical storage region and/or writes data that has been read from the second logical storage region to the first logical storage region.

The semiconductor storage unit can be one SSD or can be a RAID group that is configured by at least two SSDs for instance.

The logical storage region can be a logical address range based on one SSD or can be a logical address range that is over at least two SSDs that configure a RAID group for instance.

Advantageous Effects of Invention

An increase in a load of the storage controller can be reduced, and a leveling of an erasing frequency between nonvolatile semiconductor storage media can be executed with a high degree of accuracy.

BRIEF DESCRIPTION OF DRAWINGS

FIG. 5 is a view showing a configuration example of an RG management TBL 13200.

FIG. 6 is a view showing a configuration example of a Pool management TBL 13300.

FIG. 7 is a view showing a configuration example of an extent management TBL 13400.

FIG. 8 is a view showing a configuration example of a virtual volume management TBL 13500.

FIG. 9 is a view showing a configuration example of a statistics information management TBL 13600.

FIG. 10 is a view showing a configuration example of an FM WR amount prediction TBL 13700 in accordance with a first embodiment.

FIG. 15 is a view showing a configuration example of a logical physical conversion TBL 23100.

FIG. 16 is a view showing a configuration example of a statistics information management TBL 23200 in an SSD.

FIG. 33 is a view showing a configuration example of an FM WR amount prediction TBL 13700 in accordance with a second embodiment.

FIG. 34 is a view showing a configuration example of a WA information storage table 13800 in accordance with a second embodiment.

FIG. 36 is a view showing a configuration example of an FM WR amount prediction TBL 13700 in accordance with a second embodiment.

DESCRIPTION OF EMBODIMENTS

Some embodiments of the present invention will be described below in detail with reference to the drawings.

In the following descriptions, while a wide variety of information will be described in the expression of "xxx table" in some cases, a wide variety of information can be represented by a data structure other than a table. In order to indicate that a wide variety of information is not depended on a data structure, the expression of "xxx table" can also be referred to as "xxx information".

In the following descriptions, while a number is adopted as the identification information of an element (such as an extent), the identification information of other types (such as a name and an identifier) can also be adopted.

In the following descriptions, the processing will be described while a "program is handled as a subject in some cases. In the case in which the program is executed by a processor (for instance, a CPU (Central Processing Unit)) that is included in a controller (a storage controller and an SSD controller), the processor executes the predetermined processing by using a storage resource (such as a memory) and/or a communication interface apparatus (such as a communication port) as it decides proper. Consequently, a subject of a processing can also be a controller or a processor. Moreover, the processor can include a hardware circuit that executes a part or a whole of a processing. A computer program can be installed from a program source. The program source can be a program distribution server or a storage medium that can be read by a computer for instance.

In the following descriptions, a physical storage medium is represented as "Disk" as a matter of practical convenience in some cases. However, this notation does not always mean that a physical storage medium is a storage medium in a disk shape. In the following description, Disk indicates an SSD in many cases.

In the following descriptions, a unit of a period or a time is not restricted. For instance, a unit of a period or a time can be represented as any one or a combination of at least two of a year, a month, a day, an hour, a minute, and a second.

In the following descriptions, the nonvolatile semiconductor storage medium that is included in an SSD is a flash memory (FM). For the flash memory, an erasing is executed in a unit of a block. The flash memory is a flash memory in which a read/write is executed in a unit of a page, a flash memory of a NAND type in a quintessential way. However, the flash memory can also be a flash memory of other type as substitute for a NAND type (for instance, a NOR type). Moreover, a non-volatile semiconductor storage medium of other type such as a phase change memory can also be adopted as substitute for a flash memory.

In the first place, the summary of the present embodiment will be described in the following.

Figure 37:
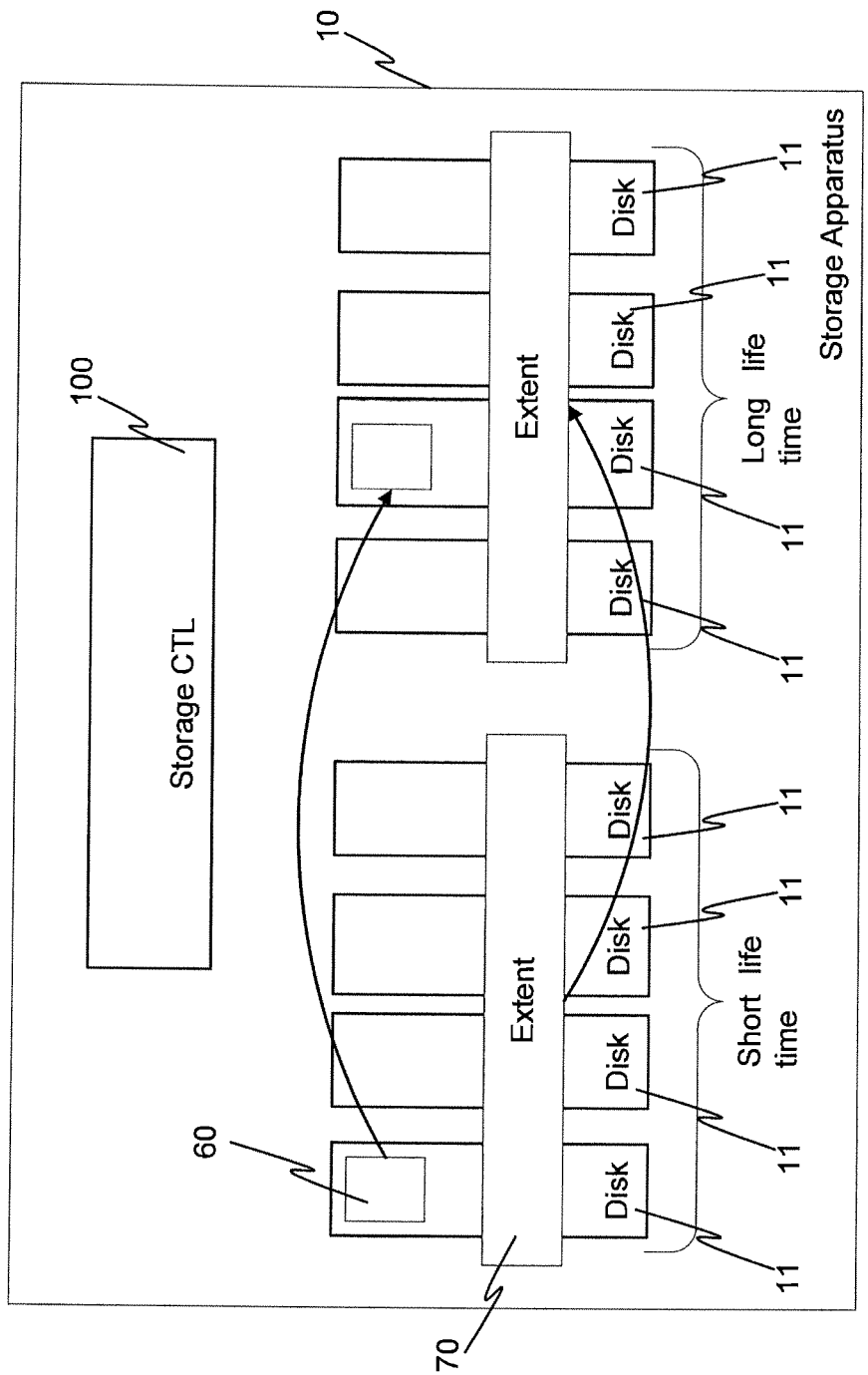
FIG. 37 is a view showing a summary of an embodiment.

FIG. 37 is a view showing a summary of an embodiment.

A storage apparatus 10 is provided with a storage controller 100 and a plurality of physical storage media 11. Each of the physical storage media 11 is a basis of at least two logical storage regions. The logical storage region can be an extent described later or can be a whole or a part of a logical volume (LU: Logical Unit) that is provided to an upper level apparatus (such as a host computer) that is coupled to the storage apparatus 10. The plurality of physical storage media 11 can configure a RAID group. The storage controller 100 executes a leveling of an erasing frequency between physical storage media 11.

In the first place, the storage controller 100 acquires the internal information that is related to each of physical storage media from the physical storage media 11. The internal information is the information that is an index of a length of life and a consumption status of the physical storage media 11.

In the case in which the physical storage media 11 is an SSD (storage media that includes a flash memory) for instance, the internal information is the information that includes a total erasing frequency of a plurality of blocks and a real write amount that is a total amount of data that has been written to a flash memory. The storage controller 100 judges a remaining length of life of an SSD based on the internal information. In other words, the storage controller 100 identifies an SSD 11 that is provided with a short length of life and that is a movement source of data and an SSD 11 that is provided with a long length of life and that is the movement source of the data. The storage controller 100 can reduce an overhead caused by an information transfer between the storage controller 100 and the SSD 11 by acquiring the internal information in a unit of an SSD. The storage controller 100 can acquire the internal information for every logical address range in an SSD and for every physical range (for instance, in a unit of a DIMM).

In the next place, the storage controller 100 identifies data to be moved from the SSD 11 that is provided with a short length of life. A range of a storage region (a certain address range) in moving data is called an extent for an inter-device WL. The extent can be an address range (a logical region) based on one SSD as shown by a reference symbol 60 and can be an address range (a logical region) that is disposed over a plurality of SSDs as shown by a reference symbol 70. A part of the extent can be a target of the inter-device WL, and an aggregate of a plurality of SSDs can be a target of the inter-device WL. An address range (a logical region) based on one SSD can also be called an extent, and an address range (a logical region) that is disposed over a plurality of SSDs can also be called an extent group.

A load for a data movement is larger in a small unit such as a block unit and a page unit of a flash memory. Consequently, by executing the inter-device WL in a unit called an extent that is larger than a block and a page, a load of a data movement can be prevented from being increased.

The storage controller 100 measures a write data amount to an extent for every extent. In the case in which a write data amount to an SSD is large for instance, a rewriting of a block occurs on a number of occasions and an erasing frequency is increased in accordance with that. In the case in which an erasing frequency of a block is increased, the erasing frequency of a block reaches the upper limit and a read/write to the block is not possible. Moreover, an SSD in which such a block is increased cannot be used. Consequently, the storage controller 100 finds an extent in which a write data amount is large and moves data that is included in the extent from an SSD that is provided with a short length of life to an SSD that is provided with a long length of life. In the case in which an extent is disposed over a plurality of SSDs, data in an extent in which a write data amount is large is also moved between SSD groups (a plurality of SSDs).

By this configuration, an erasing frequency can be leveled between SSDs without increasing a load of the storage controller 100.

Moreover, a degradation rate of an SSD that is provided with a short length of life can be suppressed by exchanging data of an extent in which a write data amount is large for an SSD that is provided with a short length of life and data of an extent in which a write data amount is small for an SSD that is provided with a long length of life.

The present embodiment will be described in detail in the following.

Embodiment 1

Figure 1:
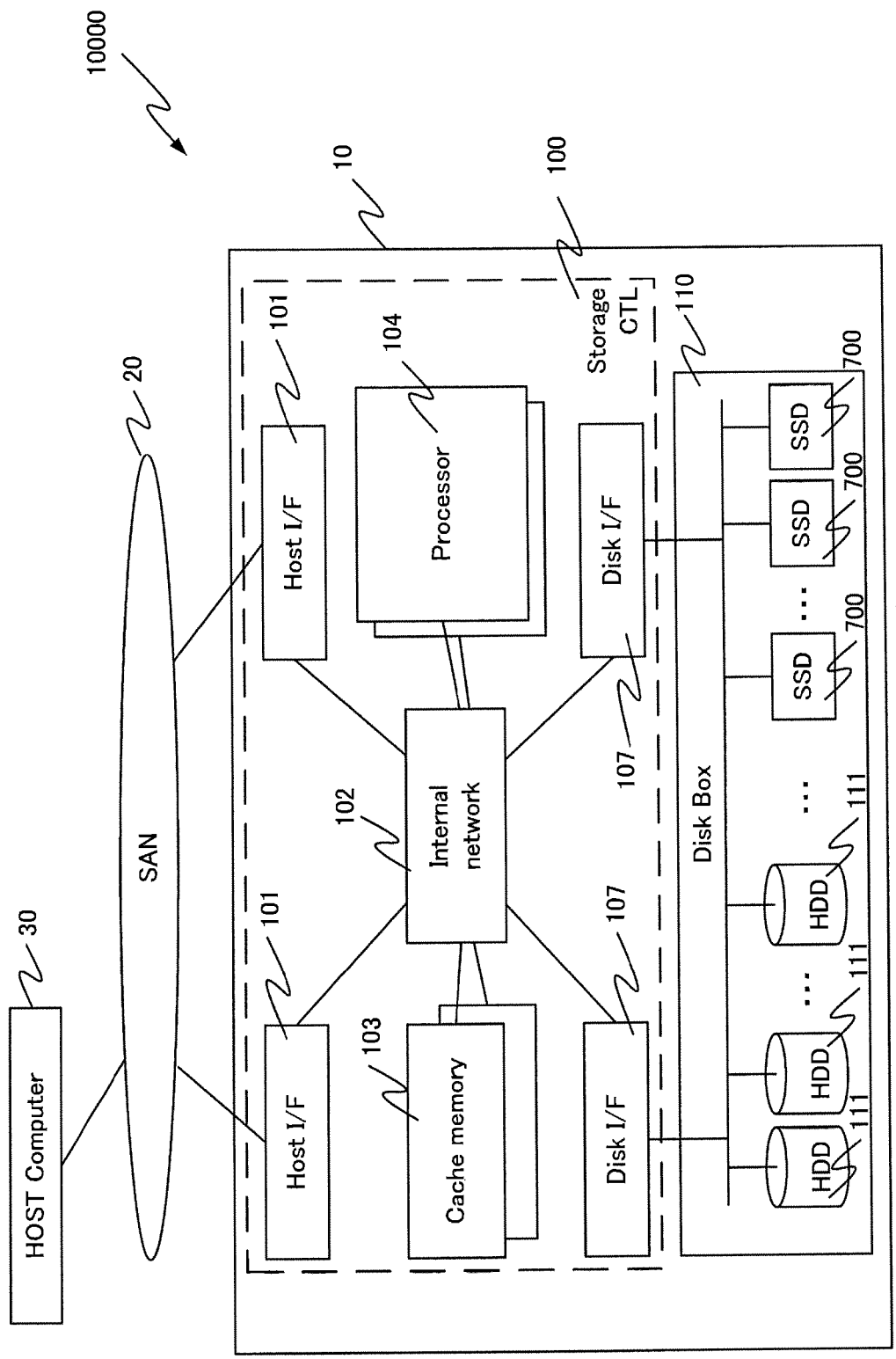
FIG. 1 is a view showing a configuration example of a storage system 10000 that includes a storage apparatus 10 in accordance with a first embodiment.

FIG. 1 is a view showing a configuration example of a storage system 10000 that includes a storage apparatus 10 in accordance with a first embodiment.

A storage system 10000 is provided with a storage apparatus 10 and a host computer 30.

The host computer 30 is an example of an upper level apparatus that utilizes the storage apparatus 10. The host computer 30 is an application server for instance. The host computer 30 and the storage apparatus 10 communicate with each other via a SAN (Storage Area Network) 20. As the SAN 20, a fiber channel, an SCSI (Small Computer System Interface), an iSCSI (internet Small Computer System Interface), a USB (Universal Serial Bus), an IEEE 1394 bus, and a SAS (Serial Attached SCSI) can be used for instance. As substitute for the SAN 20, a communication network of other type (such as a LAN (Local Area Network)) can also be adopted. In the figure, there is one host computer 30 and one storage apparatus 10. However, there can be a plurality of host computers 30 and/or a plurality of storage apparatuses 10.

The host computer 30 issues a control command or the like to the storage apparatus 10 by executing the control software (not shown) that issues a control command or the like to the storage apparatus 10. In the case in which the storage apparatus 10 executes the control command, a modification of a RAID level of a RAID group which the storage apparatus 10 is provided with can be executed. The RAID group is a physical storage medium group that is configured by a plurality of SSDs (or HDDs) and that stores data in accordance with a predetermined RAID level. As a computer that issues a control command to the storage apparatus 10, a computer other than the host computer 30 can also be used.

The storage apparatus 10 is provided with a storage controller 100 and a Disk Box 110 that is coupled to the storage controller 100.

The storage controller 100 controls an operation of the storage apparatus 10. The storage controller 100 is provided with a communication interface device, a memory, and a control device that is coupled to the communication interface device and the memory. As a communication interface device, there is a Host I/F 101 that is a communication interface device of a front end and a Disk I/F 107 that is a communication interface device of a back end. As a memory, there is a cache memory 103. As a control device, there is a processor (such as a CPU (Central Processing Unit)) 104. The Host I/F 101, the cache memory 103, the processor 104, and the Disk OF 107 are coupled to an internal network 102 by a dedicated connection bus such as a PCI (Peripheral Component Interconnect) and can be communicated with each other via the internal network 102. The cache memory 103 is coupled to an internal network 102 by a dedicated connection bus such as a DDR3 (Double Data Rate3).

The Host I/F 101 is an interface by which the storage apparatus 10 is coupled to the SAN 20.

The internal network 102 is a network for coupling devices that exist in the storage apparatus 10 to each other. The internal network 102 includes a switch. As substitute for the internal network 102, the ASICs (Application Specific Integrated Circuit) that is provided with a switch function, a DMA transfer, and an assist function such as a RAID operation can also be used.

The processor 104 controls the entire of the storage apparatus 10. A plurality of processors 104 exist. In this case, the plurality of processors 104 can control the storage apparatus 10 in consort with each other or while paying a share.

The cache memory 103 is a region for storing a computer program and data that are required for controlling the storage apparatus 10 by the processor 104.

The Disk I/F 107 is an interface for coupling the storage controller 100 and the Disk Box 110 to each other.

The Disk Box 110 is provided with a plurality of Disks of different types (for instance, nonvolatile physical storage media such as an HDD 111 and an SSD 700). The RAID group is configured by Disks of the same type. A logical volume as a storage space of user data is provided from each RAID group. In the figure, the HDD 111 and the SSD 700 are shown as the Disk that configures the Disk Box 110. However, the HDD 111 can also be omitted.

Figure 11:
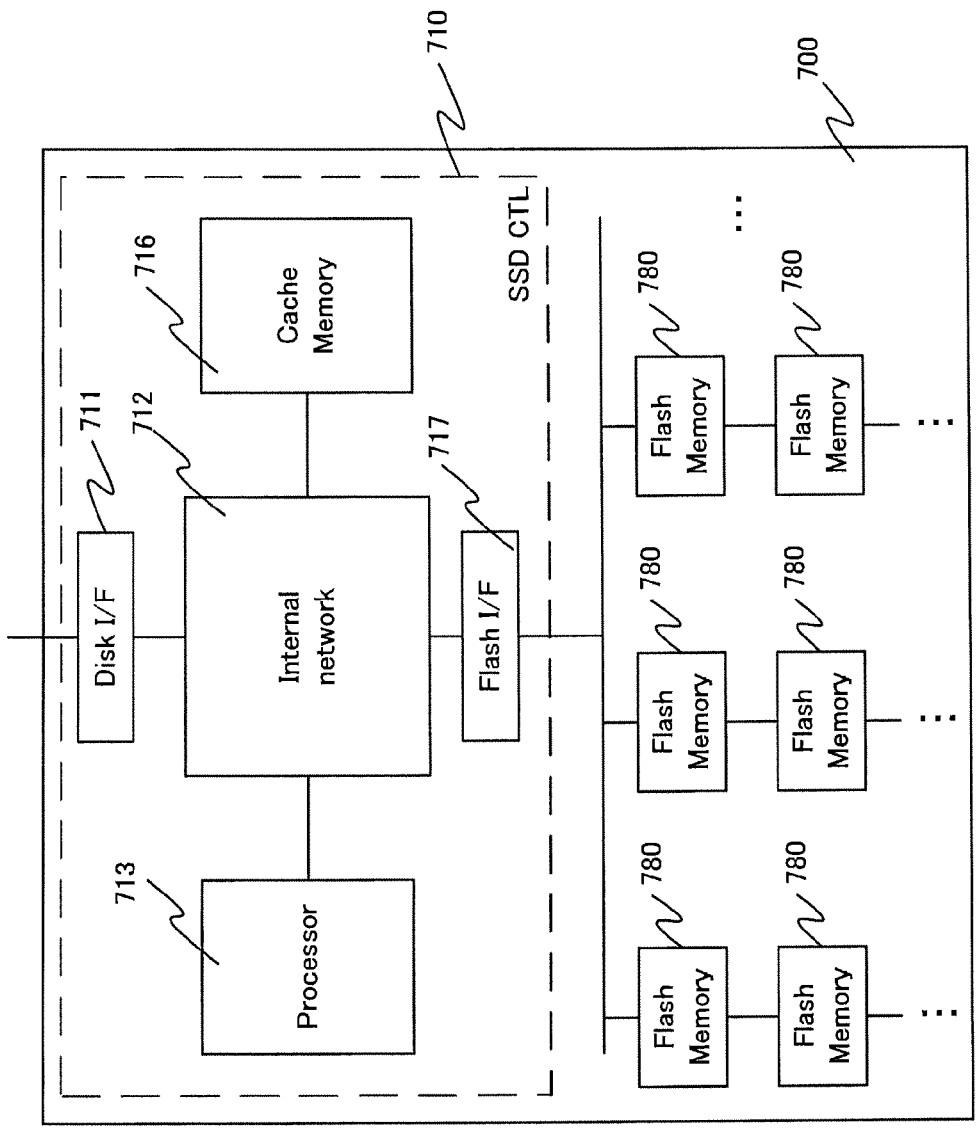
FIG. 11 is a view showing a configuration example of an SSD 700.

FIG. 11 is a view showing a configuration example of the SSD 700.

The SSD 700 is provided with a plurality of flash memories and an SSD controller 710 that is coupled to the flash memories. The SSD controller 710 controls an operation of the SSD 700.

The SSD controller 710 is provided with a communication interface device, a memory, and a control device that is coupled to the communication interface device and the memory. As the communication interface device, there can be mentioned for instance a Disk I/F 711 that is a communication interface device of a front end and a Flash I/F 717 that is a communication interface device of a back end. As the memory, there can be mentioned for instance a cache memory 716. As the control device, there can be mentioned for instance a processor 713. The Disk I/F 711, the processor 713, the cache memory 716, and the Flash I/F 717 are coupled to each other via an internal network 712.

The Disk I/F 711 is coupled to the Disk I/F 107 of the storage controller 100 via a dedicated communication bus. The internal network 712 is a network that is configured to couple devices to each other. The internal network 712 can include a switch and can be replaced by the ASICs that are provided with a switch function. The processor 713 controls the entire of the SSD 700. The cache memory 716 is a region that is configured to store a computer program and data that are required for controlling the SSD 700 by the processor 713. The Flash I/F 717 is an interface that is configured to couple the SSD controller 710 and a flash memory 780 to each other.

In the present embodiment, an SSD is a storage media that is provided with a plurality of flash memories and a controller that controls the plurality of flash memories, and the external shape of the SSD is not limited to a form factor.

Figure 12:
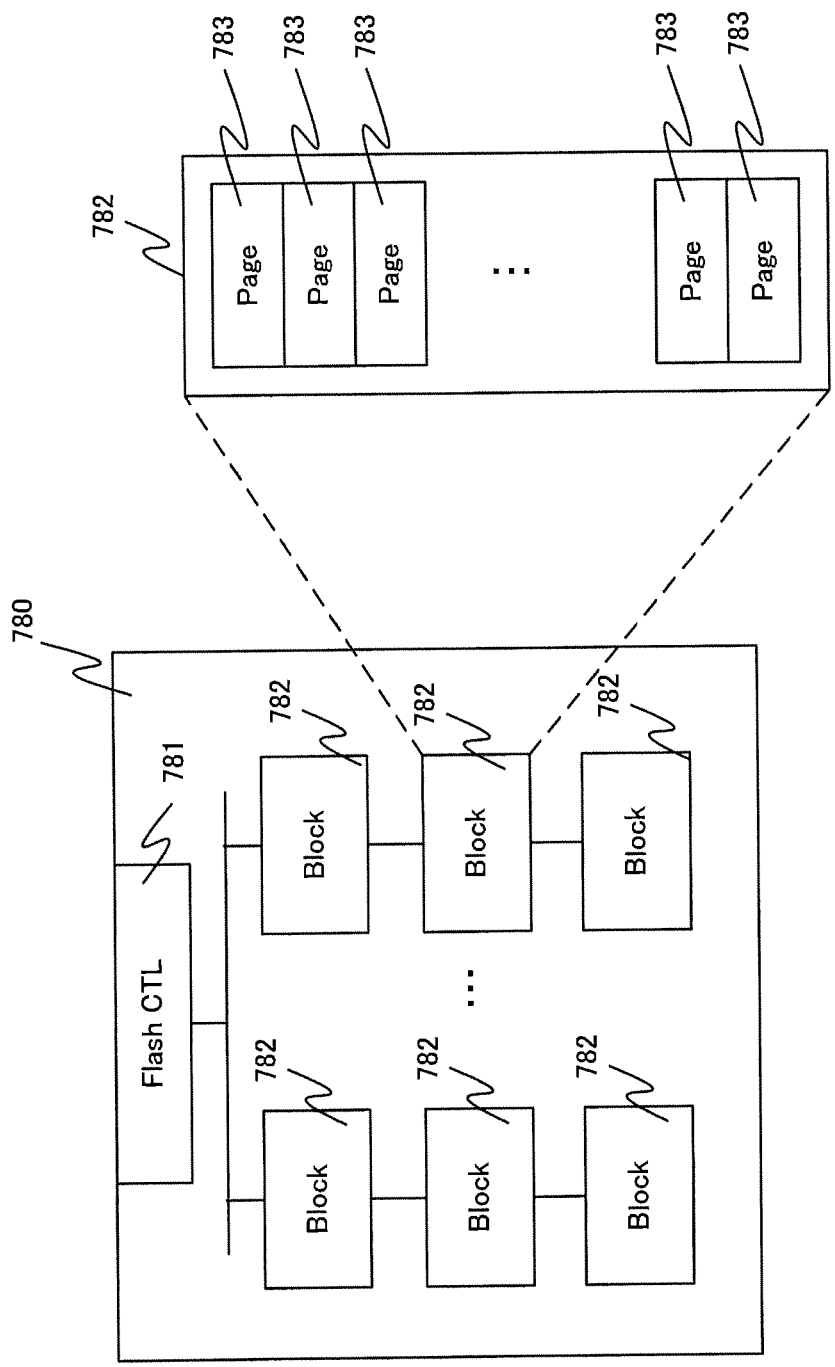
FIG. 12 is a view showing a configuration example of a flash memory 780.

FIG. 12 is a view showing a configuration example of the flash memory 780.

The flash memory 780 is provided with a plurality of blocks 782 and a flash memory controller 781 that is coupled to the blocks. The flash memory controller (hereafter referred to as a flash controller) 781 controls the flash memory 780. Each of blocks 782 is configured by a plurality of pages 783. A read of data from the flash memory 780 and a write of data to the flash memory 780 are executed in a unit of a page. A data erasing is executed in a unit of a block.

The flash memory 780 is a flash memory of a NAND type for instance. Data cannot be overwritten to the flash memory of a NAND type. Consequently, in the case in which new data is tried to be written to a page to which data has been written, data is erased and data is written to a page in which data has been erased.

The SSD controller 710 executes a leveling of an erasing frequency to a plurality of blocks 782 in the SSD 700. The SSD controller 710 stores data that is provided with a small update frequency into a block that is provided with a large erasing frequency and stores data that is provided with a large update frequency into a block that is provided with a small erasing frequency to level an erasing frequency to a block in the SSD 700.

Moreover, the SSD controller 710 can also execute a leveling of an erasing frequency by selecting a free block that is provided with a small erasing frequency and storing data into the block. In this case, a plurality of blocks can be divided into a plurality of groups depending on an erasing frequency, and a block can be selected from a group that is provided with a small erasing frequency.

A long length of life of an SSD can be achieved by leveling an erasing frequency of a plurality of blocks in an SSD.

Figure 13:
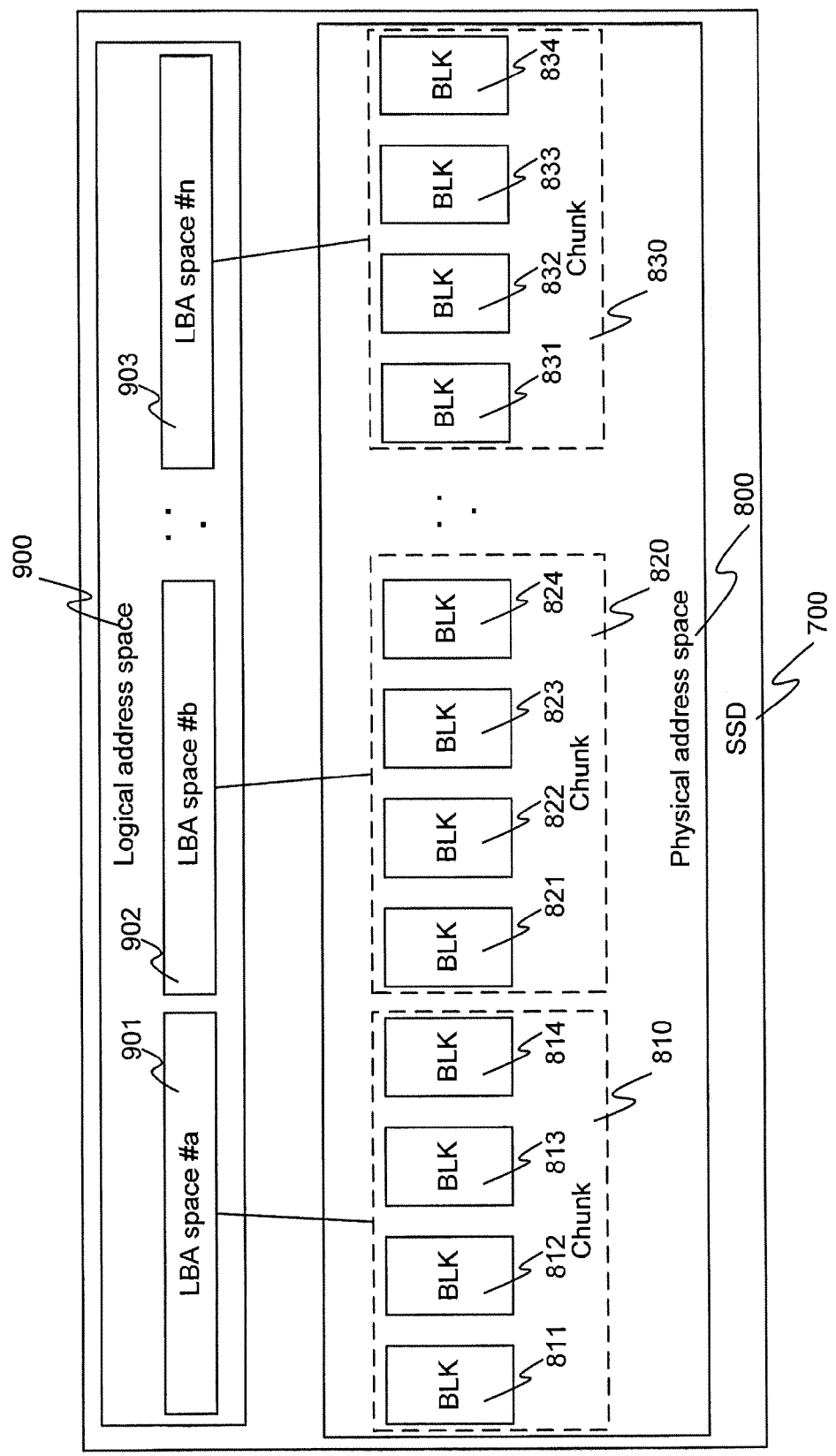
FIG. 13 is a view showing a configuration example of an address space of an SSD.

FIG. 13 is a view showing a configuration example of an address space of an SSD.

A logical address space 900 and a physical address space 800 exist for the SSD 700. The logical address space 900 is a unique address space that is provided to the storage controller 100 by the SSD 700. On the other hand, the physical address space 800 is an address space in which actual data is stored. The SSD controller 710 dynamically modifies a mapping of an address range (region) that configures the logical address space 900 and an address range (region) that configures the physical address space 800, thereby implementing a WL or the like.

A correspondence between the logical address space 900 and the physical address space 800 is managed using a logical physical conversion table 23100 described later by the processor 713. In the present embodiment, the storage controller 100 does not manage a logical physical conversion table in an SSD in a direct manner. Consequently, in the case in which the processor 713 does not notify the storage controller 100 of the SSD internal information, the storage controller 100 cannot comprehend a correspondence relationship between the logical address space 900 and the physical address space 800.

In the present embodiment, the SSD 700 manages a chunk that is an aggregate of blocks. In FIG. 13, a chunk 810 is formed by blocks 811 to 814, a chunk 820 is formed by blocks 821 to 824, and a chunk 830 is formed by blocks 831 to 834. Moreover, the chunk 810 provides a logical address (LBA) space #a 901, the chunk 820 provides a logical address (LBA) space #b 902, and the chunk 830 provides a logical address (LBA) space #c 903.

In the next place, the capacity virtualization technique will be described in the following.

The capacity virtualization technique (for instance, Thin Provisioning) is a technique for providing a virtual capacity larger than a physical capacity which the storage apparatus 10 is provided with to the side of the host computer 30. The host computer 30 accesses a virtual logical volume (a virtual volume). For the capacity virtualization technique, in the case in which the storage apparatus 10 receives a write request, a physical storage region is allocated to a virtual region (a virtual extent) of the write destination of the data of the write request. In the present embodiment, a unit of a physical storage region that is allocated for the capacity virtualization technique is called an extent unit. Moreover, a size of the extent can be rich in diversity in the range from several MB to several GB.

The capacity virtualization technique will be described in detail with reference to FIG. 2 in the following. The RAID group (RG) is configured by the Disks (such as SSDs) of the same type. A Pool Volume 500 is configured based on at least one RG.

The extent is a storage region that is obtained by dividing the Pool Volume 500, that is, a part of the Pool Volume 500. In the figure, the Pool Volume 500 is configured based on three RGs of an RG 200, an RG 300, and an RG 400. The RG 200 will be described in the following.

The RG 200 is configured by a Disk1 210, a Disk2 220, and a Disk3 230. Moreover, the RG 200 constructs a RAID 5, and a Data (D in the figure) and Parity (P in the figure) are stored into a stripe line based on Disks (210 to 230). Here, a "stripe line" is a storage region that is configured by the same address region of a plurality of Disks that configure the same RG. That is, the stripe line is arranged on a plurality of Disks that configure the same RG. The set of the Data and Parity is stored into the stripe line. In the figure, a D 211, D 221, and P 231 are stored into one stripe line 250 for instance. In the case in which at least two same Data or Parity of the same stripe line exist in the same Disk by a data movement, the redundancy of the RAID is degraded. Consequently, the storage controller 100 controls a stored destination of data in such a manner that at least two Data or Parity that have been stored into one stripe line do not exist in the same Disk as a result of an execution of an inter-device WL.

A storage region based on the RG is divided into a plurality of extents. Moreover, a storage region based on the RG is made of a logical address space 900 that is provided by a plurality of SSDs.

In the next place, a configuration of an extent will be described in the following. For instance, each of extents is configured by at least one stripe line.

Figure 2:
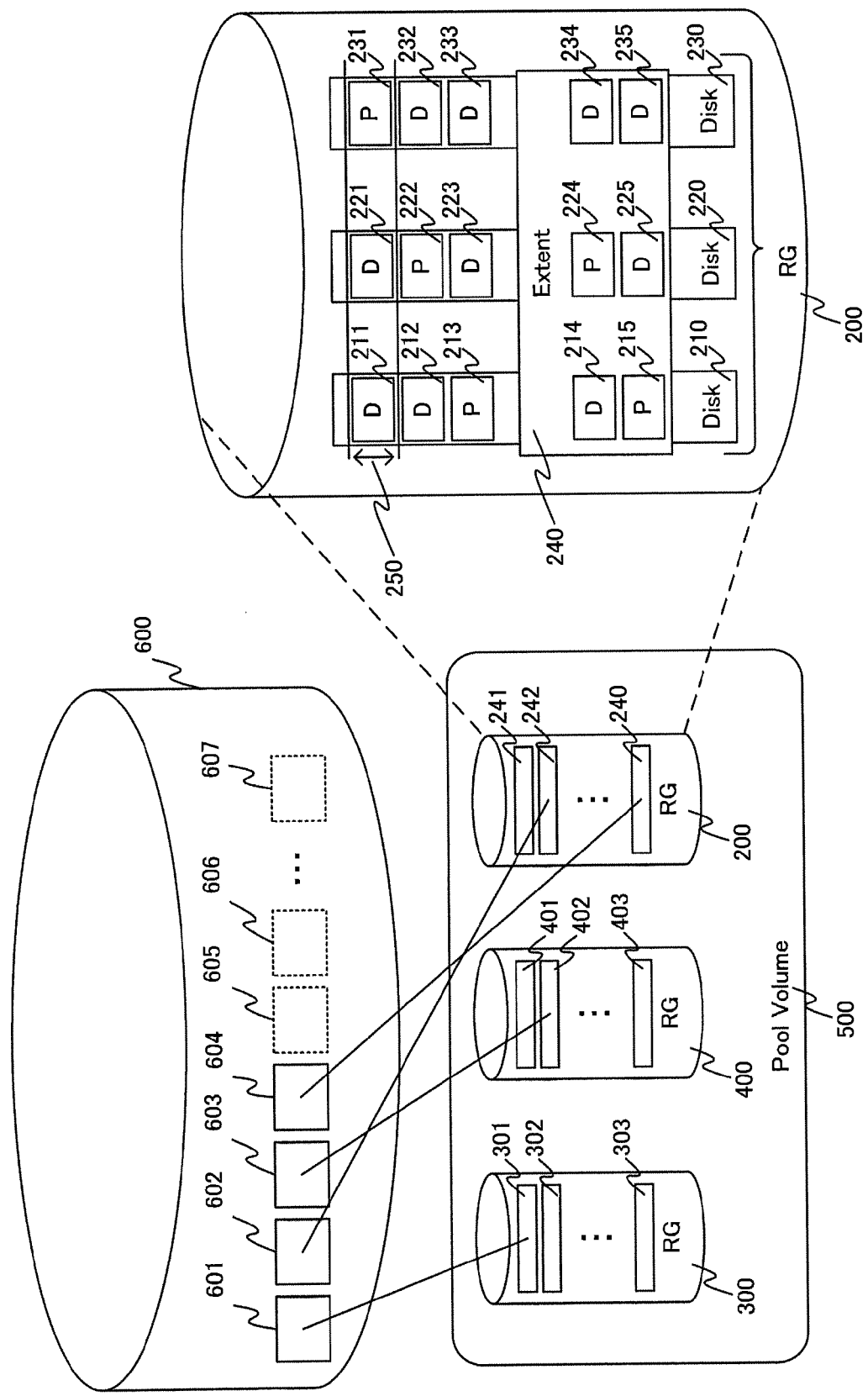
FIG. 2 is a schematic illustrative drawing showing the capacity virtualization technique.

In FIG. 2, an extent 240, an extent 241, and an extent 242 are formed from the RG 200. An extent 340, an extent 341, and an extent 342 are formed from a storage region of the RG 300. An extent 440, an extent 441, and an extent 442 are formed from a storage region of the RG 400. The extent 240 is configured by two stripe lines, that is, a stripe line in which Data 214, Parity 224, and Data 234 have been stored and a stripe line in which Parity 215, Data 225, and Data 235 have been stored. Similarly, an extent 301 and an extent 401 are also formed from the RG 300 and the RG 400.

The extent is a storage region of which a size is larger than that of a block. A size of the extent is N times (N is an integer number that is equal to or larger than 2) of that of a block for instance. Chunk described later is an aggregate of a plurality of extents.

A virtual volume 600 is a virtual logical volume that is configured to store user data by the host computer 30. A capacity that is defined as a capacity of the virtual volume 600 can be a storage capacity larger than a total capacity of the storage media that is included in the storage apparatus 10. The virtual volume 600 is configured by virtual extents of arbitrary number of 601 to 607. For instance, although one extent is corresponded to one virtual extent shown in FIG. 2, a plurality of extents can also be corresponded to one virtual extent. The virtual volume 600 is provided with a virtual address (a logical address that configures a virtual volume), and the virtual address is divided in a predetermined range to configure the virtual extent.

The virtual extents 601 to 604 that are shown by solid lines are virtual extents in which an extent has been allocated from the RGs 200, 300, and 400. In other words, an extent 301 has been allocated to a virtual extent 601, an extent 242 has been allocated to a virtual extent 602, an extent 402 has been allocated to a virtual extent 603, and an extent 240 has been allocated to a virtual extent 604.

The virtual extents 605 to 607 that are shown by dotted lines are not virtual extents to which an address that has been specified as a write destination of data belongs. Consequently, an extent has not been allocated to the virtual extents 605 to 607.

Figure 38:
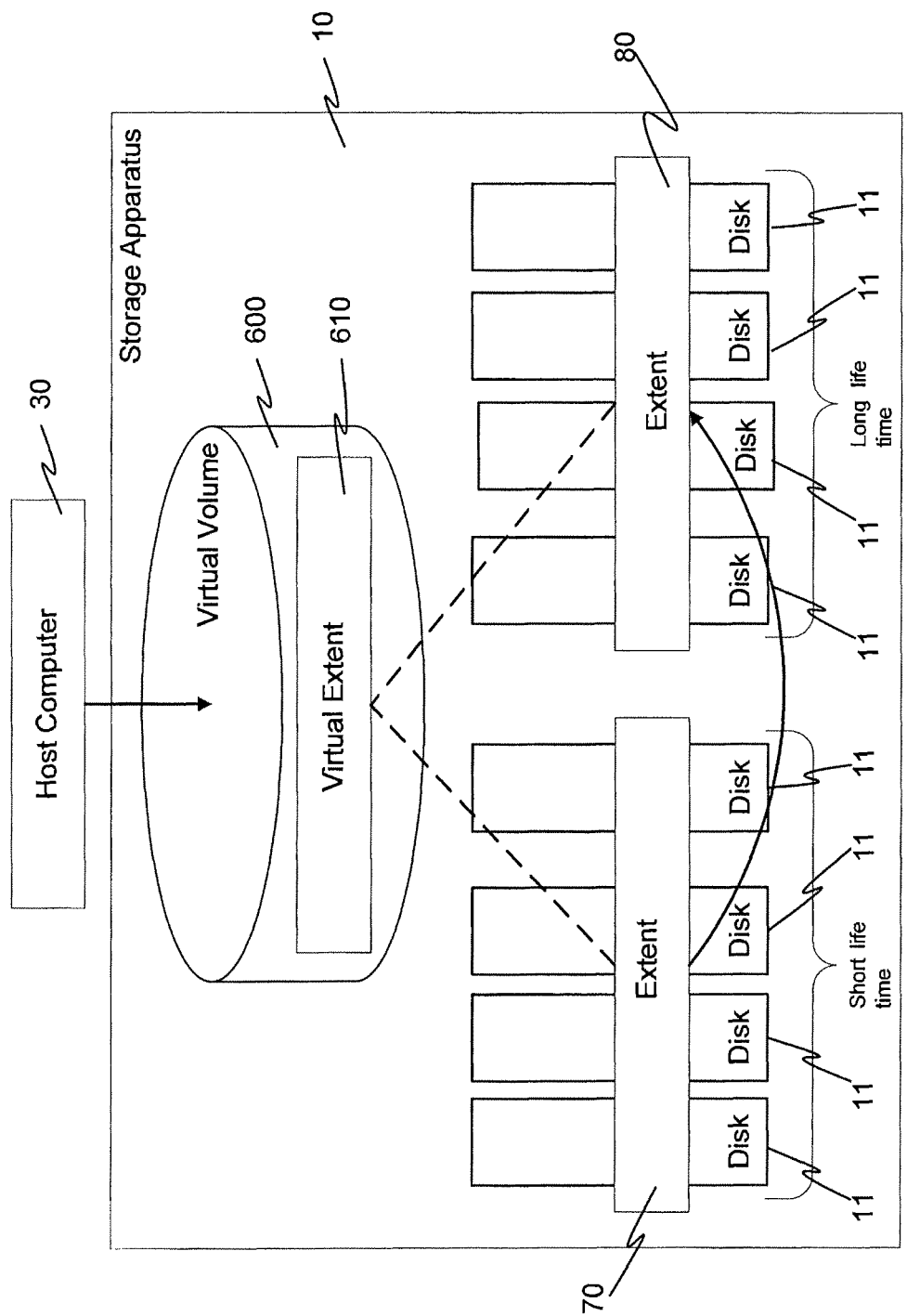
FIG. 38 is a view showing an example of a relationship between an inter-device WL and a virtual volume.

FIG. 38 is a view showing an example of a relationship between an inter-device WL and a virtual volume.

In the case in which data is moved between SSDs, the host computer 30 must modify an access destination of data to be an SSD of a movement destination. However, in the case in which an address is converted by using the virtual volume 600, the host computer 30 can access data of a movement destination without modifying an access destination. In other words, an association with a virtual address of the virtual extent 610 is changed from a logical address of the extent 70 of a movement source to a logical address of the extent 80 of a movement destination by the storage controller 100. The host computer 30 can execute an inter-device WL by accessing the virtual volume 600 without modifying an address of an access destination.

The case in which a virtual volume is used for an address conversion is an example, and an address conversion can also be executed without using a virtual volume.

Figure 3:
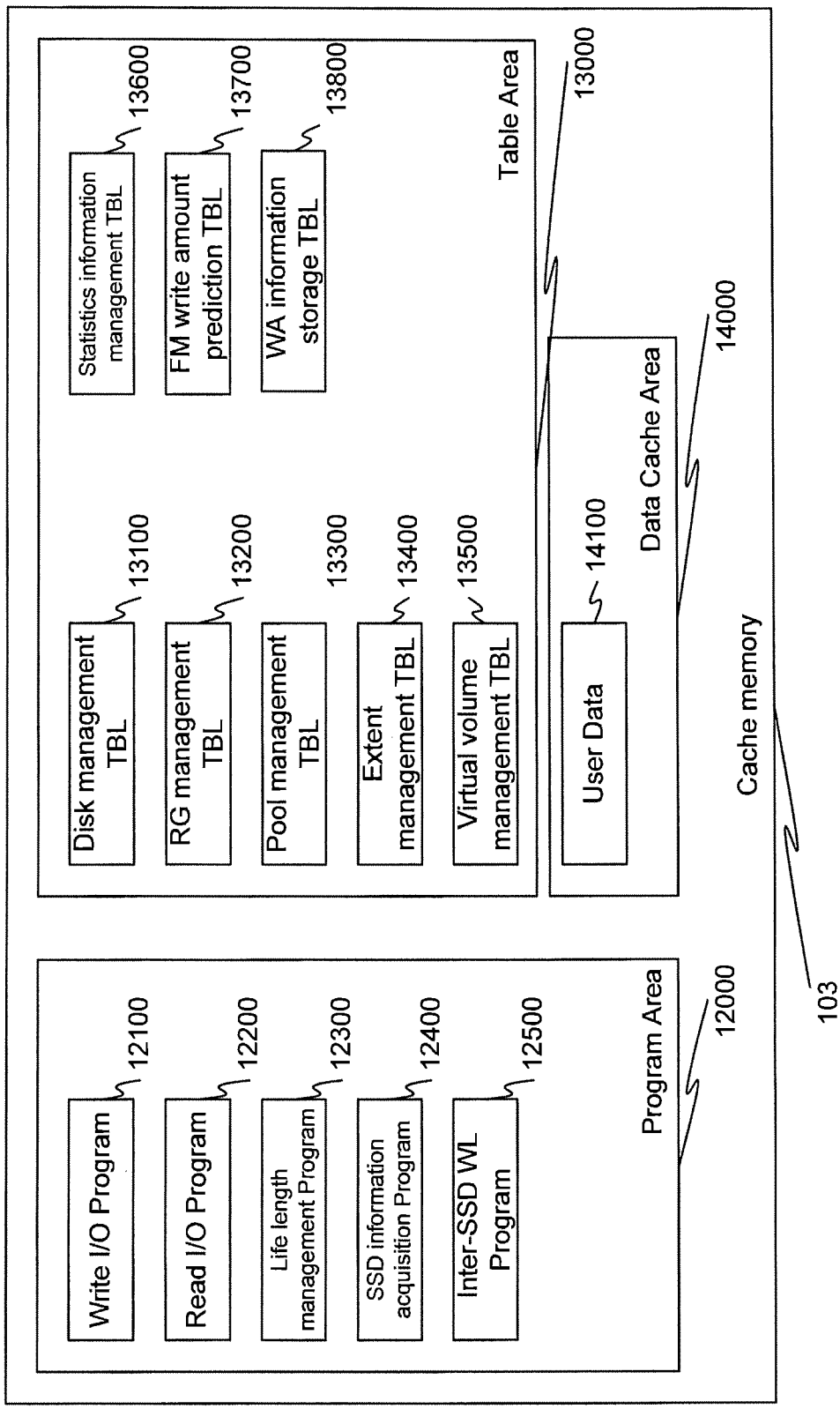
FIG. 3 is a view showing a configuration example of a cache memory 103.

FIG. 3 is a view showing a configuration example of a cache memory 103 that is included in the storage controller 100.

The cache memory 103 is provided with a Program Area 12000, a Table Area 13000, and a Data Cache Area 14000. The Program Area 12000 and the Table Area 13000 are regions in which a program for controlling the storage apparatus 10 and a wide variety of tables are stored. The Data Cache Area 14000 is a region that is used for storing user data on a temporary basis.

The Program Area 12000 stores a Write I/O Program 12100, a Read I/O Program 12200, a life length management Program 12300, an SSD information acquisition Program 12400, and an inter-SSD WL Program 12500.

The Write I/O Program 12100 is a program for processing a write request from the host computer 30. The Read I/O Program 12200 is a program for processing a read request from the host computer 30. The life length management Program 12300 is a program for managing a life length of a wide variety of Disks such as an SSD 700 by the processor 104. The SSD information acquisition Program 12400 is a program for acquiring the internal information of the SSD 700. The inter-SSD WL Program 12500 is a program for executing the inter-device WL.

The Table Area 13000 is provided with a Disk management Table (hereafter Table is referred to as TBL) 13100, an RG management TBL 13200, a Pool management TBL 13300, an extent management TBL 13400, a virtual volume management TBL 13500, a statistics information management TBL 13600, an FM (Flash Memory) write amount prediction TBL 13700, and a WA information storage TBL 13800.

The Disk management TBL 13100 is a table for storing the information related to Disk that has been stored into a Disk Box 110. The RG management TBL 13200 is a table for storing the information related to the RAID group. The Pool management TBL 13300 is a table for storing the information of a Pool Volume. The extent management TBL 13400 is a table for storing the information related to an extent. The virtual volume management TBL 13500 is a table for storing the information related to a virtual volume. The statistics information management TBL 13600 is a table for storing a wide variety of information related to a performance of the storage apparatus 10. The FM write amount prediction TBL 13700 is a table that is used for predicting a data write amount in an SSD. The WA information storage TBL 13800 is a table for storing a predicted value of a rate of a write data amount that is increased by a processing in an SSD based on a write I/O pattern to the SSD.

The user data 14100 that conforms to a write request and a read request is stored into the Data Cache Area 14000 on a temporary basis. The user data 14100 is data that is used by the host computer 30.

Figure 4:
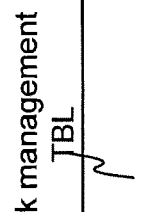
FIG. 4 is a view showing a configuration example of a Disk management TBL 13100.

FIG. 4 is a view showing a configuration example of a Disk management TBL 13100.

The information that is managed by the Disk management TBL 13100 is used for judging a length of life of each Disk in large part. The Disk management TBL 13100 is provided with a Disk #13101, a Disk Type 13102, an information update date 13103, a remaining guarantee period 13104, a total Write amount 13105, a remaining erasing frequency 13106, and a remaining life length 13107 for every Disk.

The Disk #13101 is an identifier of the Disk and a unique number. The Disk Type 13102 indicates a type of the Disk and indicates an SSD (SLC), an SSD (MLC), and an HDD for instance. Here, there are two types of an SLC (Single Level Cell) type and an MLC (Multi Level Cell) type depending on a type of a NAND flash memory to be used. The SLC is a flash memory of a high speed, a long life length, and a small capacity, and enables a block erasing of hundreds of thousands of order to tens of thousands of order. On the other hand, the MLC is a flash memory of a low speed, a short life length, and a large capacity, and enables a block erasing of tens of thousands of order to thousands of order.

The information update date 13103 indicates a latest date when the information related to the Disk was updated (for instance, a date when the life length information was updated). Here, the information update date 13103 is represented by the number of days. The remaining guarantee period 13104 indicates a remaining period of a guarantee period of the Disk decided by a vender.

The guarantee period of the Disk is a period in which a normal operation of the Disk is guaranteed (for instance, 5 years). A flash memory is deteriorated by an increase in an erasing frequency due to a write of data. In the case in which a length of life of a flash memory is reached, a read/write of data is not possible, or a data retention characteristic is extremely degraded. Consequently, as a period in which the Disk can be normally used, a threshold value is specified based on an erasing frequency and a total write amount in advance. In the case in which a usage period of the Disk exceeds the guarantee period, the Disk is exchanged.

The total Write amount 13105 is an integrated value of a write amount that has occurred in an SSD (an amount of data that has been written to a flash memory in an SSD), and is updated based on the SSD internal information. The remaining erasing frequency 13106 indicates a value that conforms to the number of times of a block erasing that can be executed for an SSD. Here, the remaining erasing frequency 13106 is represented in percentage terms and is updated based on the SSD internal information. In the case in which the numerical value becomes zero, it is indicated that the number of times of a erasing of all blocks in a flash memory reaches the upper limit.

The information that is registered as the total Write amount 13105 and the remaining erasing frequency 13106 is included in the information that is acquired from the SSD. The total Write amount 13105 and the remaining erasing frequency 13106 are updated based on the information that has been acquired from each SSD by the storage controller 100. The information is acquired by using a general-purpose interface such as an S.M.A.R.T. (Self-Monitoring Analysis and Reporting Technology).

The remaining life length 13107 indicates the remaining period of time until the remaining erasing frequency 13106 of the SSD reaches zero. The remaining life length 13107 is a numerical value that is predicted by the processor 104 (the life length management Program 12300). Here, the remaining life length 13107 is represented by the number of days.

That the remaining life length 13107 is below the remaining guarantee period 13104 means that a load is concentrated to the specific SSD due to a dispersion of an I/O for instance, the SSD is provided with a load higher than a load that has been assumed by a vender, and the SSD reaches the length of life before the expiration date for use that is guaranteed by a vender. An inter-device WL is executed between SSDs, thereby avoiding a concentration of a write to a specific SSD and lengthening a length of life of the SSD.

Moreover, the remaining life length 13107 can be calculated based on the information update date 13103, the total Write amount 13105, and the remaining erasing frequency 13106 or the like. A calculation method of the remaining life length will be described later.

The Disk management TBL 13100 stores the information related to a life length management of the Disk mainly. Consequently, it is not necessary that the information of the total Write amount 13105 to the remaining life length 13107 is an acquisition target of the processor 104 for the Disk that is not provided with a restriction of the number of times of rewrite (for instance, an HDD).

FIG. 5 is a view showing a configuration example of an RG management TBL 13200.

The RG management TBL 13200 is provided with an RG #13201, a Disk Type 13202, a RAID Level 13203, a RAID configuration 13204, and a Disk #13205 for every RG.

The RG #13201 is an identifier of an RG and a unique number. The Disk Type 13202 indicates a type of the Disk that configures an RG. The RG is configured by the Disk of the same type.

The RAID Level 13203 indicates a RAID level of an RG and is a variety of values such as RAID 1+0, 1, 3, 4, 5, and 6 for instance. The RAID configuration 13204 indicates the number of data Disks that configures the RAID (Disks that store data) and the number of parity Disks (Disks that store parity). The Disk #13205 indicates the number of the Disk that configures an RG and includes an effective numerical value that is equivalent to a numerical value of the RAID configuration 13204.

FIG. 6 is a view showing a configuration example of a Pool management TBL 13300.

The Pool management TBL 13300 is provided with a Pool #13301, an RG #13302, an RG remaining capacity 13303, and a Pool remaining capacity 13304 for every Pool.

The Pool #13301 is an identifier of a Pool and a unique number. The RG #13302 indicates an RG number of all RGs that configure the Pool. The RG remaining capacity 13303 indicates a remaining capacity for every RG. The Pool remaining capacity 13304 indicates a remaining capacity for the Pool and is equivalent to a sum total value of the RG remaining capacity 13303 of an RG that configures the Pool. Moreover, the RG remaining capacity 13303 and the Pool remaining capacity 13304 are reduced in the case in which a write of data occurs in an unallocated region of an extent of a virtual volume, and are updated to be the reduced value by the processor 104 (Write I/O Program 12100).

FIG. 7 is a view showing a configuration example of an extent management TBL 13400.

The extent management TBL 13400 is provided with an extent #13401, an RG #13402, a Size 13403, a Disk Type 13404, a Disk #13405, a Stripe #13406, a Start-LBA 13407, a Last-LBA 13408, an allocation flag 13409 for every extent.

The extent #13401 is an identifier of an extent and a unique number. The RG #13402 indicates a number of an RG that is a basis of an extent. The Size 13403 indicates a capacity of an extent. Here, a unit of the Size 13403 is Byte.

The Disk Type 13404 indicates a type of the Disk that is included in an RG that is a basis of an extent.

The Disk #13405, the Stripe #13406, the Start-LBA 13407, and the Last-LBA 13408 indicate a Disk on which the extent is prepared based, a stripe line that configures the Disk on which the extent is prepared based, and a physical space from the number of LBA to the number of LBA of a stripe line by which the extent is prepared.

The allocation flag 13409 indicates whether or not the extent has been allocated to a virtual volume. Here, a flag 13409 of an allocated extent is "done" and a flag 13409 of an unallocated extent is "not done".

FIG. 8 is a view showing a configuration example of a virtual volume management TBL 13500.

The virtual volume management TBL 13500 is provided with a virtual volume #13501, a virtual capacity 13502, a real used capacity 13503, a virtual extent #13504, and an allocating extent #13505 for every virtual volume.

The virtual volume #13501 is an identifier of a virtual volume and a unique number. The virtual capacity 13502 is a virtual capacity of a virtual volume. The virtual capacity is provided to the host computer 30. The real used capacity 13503 is a sum total value of a capacity of an extent that has been allocated to a virtual volume as a practical matter.

The virtual extent #13504 is an identifier of a virtual extent that is included in a virtual volume. It is indicated that virtual extents #0 to #n are included in a virtual volume #0.

The allocating extent #13505 is an identifier (a number) of an extent that has been allocated to a virtual volume. The storage controller 100 manages an allocating status of an extent. In other words, an extent #0 is allocated to a virtual extent #0, and an extent #100 is allocated to a virtual extent #1. However, the allocating extent #13505 of a virtual extent to which an extent has been unallocated is "-". In other words, an extent that is a physical storage region is not allocated to a virtual extent #n.

FIG. 9 is a view showing a configuration example of a statistics information management TBL 13600.

The statistics information management TBL 13600 is the information that is related to an access status such as a read/write to each extent. The storage controller 100 monitors a read/write status to each extent and configures the statistics information management TBL 13600.

The statistics information management TBL 13600 is provided with an Disk #13601, an extent #13602, a WR (an abbreviation of Write) IOPS (Input Output Per Second) 13603, an RD (an abbreviation of Read) IOPS 13604, an average WR I/O Size 13605, a WR I/O Pattern 13606, a WR rate 13607, an WR amount 13608, and an RD amount 13609 for every Disk. At least one of the information 13601 to 13609 is referred to as statistics information in some cases in the following.

The Disk #13601 is an identifier of the Disk and a unique number. The extent #13602 is an identifier of an extent based on the Disk and a unique number.

The WR IOPS 13603 and the RD IOPS 13604 indicate an occurrence frequency of a WR (write) I/O and an RD (read) I/O that have occurred in an address range that is corresponded to an extent in an address range of the Disk. Here, IOPS is an abbreviation of Input/Output Per Second.

The average WR I/O Size 13605 indicates an average size of data that is associated with a WR I/O request from the host computer 30.

The WR I/O Pattern 13606 indicates whether a WR I/O is a random pattern (RND) or a sequential pattern (SEQ). The WR rate 13607 indicates a rate of a write I/O to all I/O. The WR amount 13608 and the RD amount 13609 indicate a total amount of WR data that has occurred in an extent (data in which an address range that is corresponded to an extent in an address range of the Disk is a write destination) and a total amount of RD data that has occurred in an extent (data in which an address range that is corresponded to an extent in an address range of the Disk is a read source), respectively.

In the case in which an extent is disposed over a plurality of Disks, a value of an IOPS of the extent can be calculated as a total sum or an average value of values that are managed for every disk.

FIG. 9 shows the case in which the statistics information for every Disk is managed. However, the statistics information can also be managed for every RG. In the case in which the statistics information is acquired for every RG, the statistics information can be acquired without distinguishing the Disk for an extent that is disposed over a plurality of Disks.

In the present embodiment, the statistics information is monitored in a unit of an extent. Consequently, a monitoring load can be reduced as compared with the case in which the statistics information is monitored in a block unit or a page unit of a flash memory.

The storage controller 100 monitors an access status for an extent that is being allocated based on the virtual volume management TBL 13500. The statistics information is an accumulated value from an allocation of an extent to a virtual volume and a trend of a read/write. The statistics information can also be an accumulated value in a unit time.

Depending on a timing of a judgment of necessity of an inter-device WL, the statistics information of an extent of a target of a judgment of necessity can be reset. For instance, the storage controller 100 can reset only the statistics information that is related to an extent that has been moved by an inter-device WL.

FIG. 10 is a view showing a configuration example of an FM WR amount prediction TBL 13700 in the present embodiment.

The FM WR amount prediction TBL 13700 is configured based on the statistics information management TBL 13600. The FM WR amount prediction TBL 13700 is provided with a Disk #13701, an extent #13702, a WR amount 13706, and an FM WR predicted amount 13708 for every Disk.

The Disk #13701 is an identifier of the Disk and a unique number. The extent #13702 is an identifier of an extent and a unique number. In the case in which an extent is disposed over a plurality of SSDs that configure an RG, the extent described here means a part of an extent to be precise.

The WR amount 13706 indicates a total amount of WR data in which an address range that is corresponded to an extent in an address range of the Disk is a write destination.

The FM WR predicted amount 13708 indicates a predicted amount of data that is written to a flash memory as a practical matter.

In the present embodiment, the WR amount 13706 for an extent (or an extent part) is considered as a real WR amount for a region that is corresponded to the extent for the Disk (SSD). For instance, in the case in which a write data amount to an extent is large, a rewrite of data to a block for an SSD that is a basis of the extent occurs on a number of occasions, and an erasing frequency of a block is increased. This is because a length of life of an SSD that is provided with the block is shortened in the case in which an erasing frequency of a block is increased. Consequently, a highly accurate inter-device WL can be executed by deciding an extent of a movement target based on a write data amount to the extent in the case in which an inter-device WL is executed.

Figure 14:
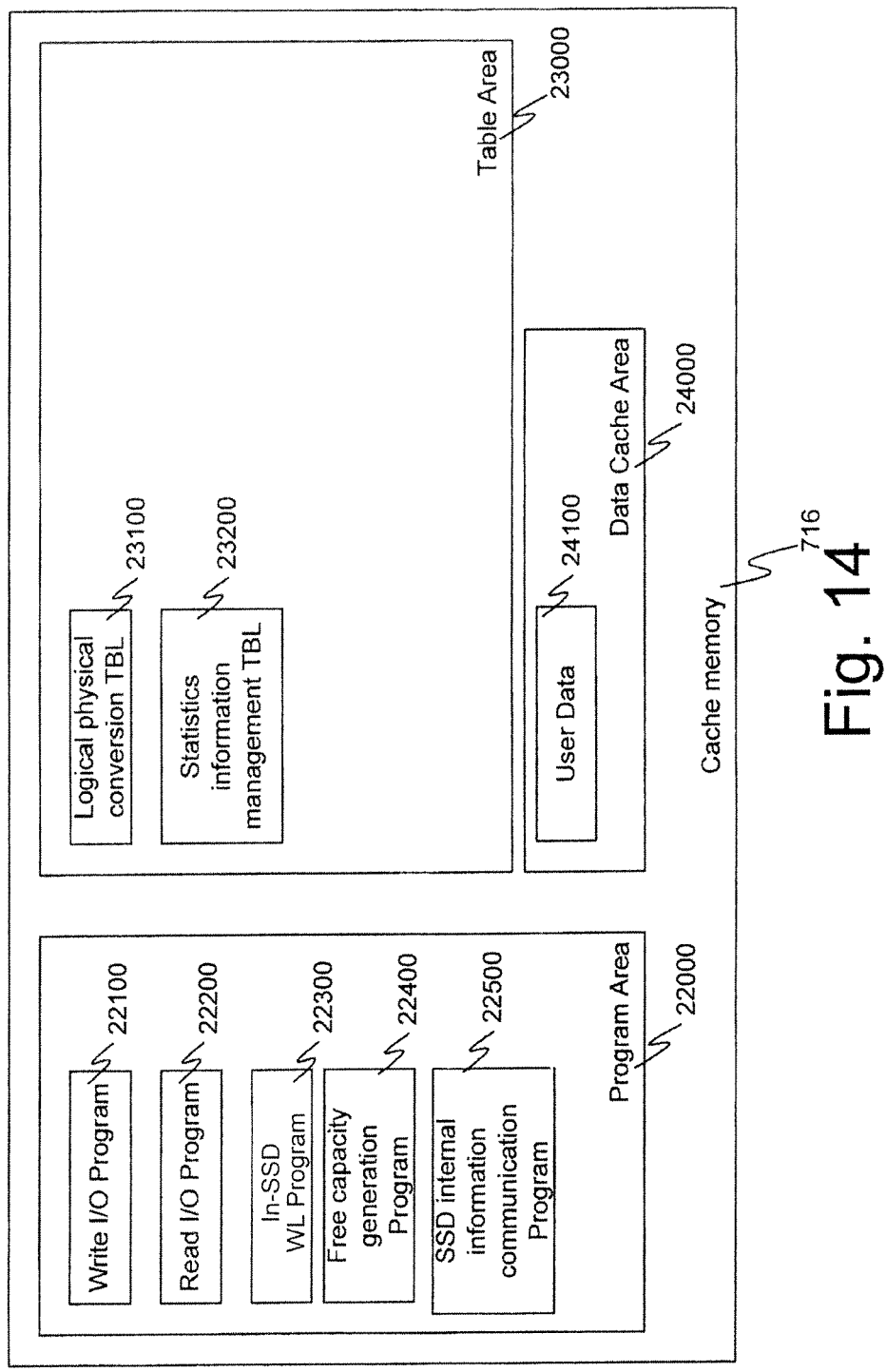
FIG. 14 is a view showing a configuration example of a cache memory 716.

FIG. 14 is a view showing a configuration example of a cache memory 716 of the SSD 700.

The cache memory 716 is provided with a Program Area 22000, a Table Area 23000, and a Data Cache Area 24000.

The Program Area 22000 and the Table Area 23000 are regions in which a program for controlling the SSD 700 and a wide variety of tables are stored. The Data Cache Area 24000 is a region that is used to store user data on a temporary basis.

The Program Area 22000 is provided with a Write I/O Program 22100, a Read I/O Program 22200, an in-SSD WL Program 22300, a free capacity generation Program 22400, and an SSD internal information communication Program 22500.

The Write I/O Program 22100 is a program for processing a write request from the storage controller 100. The Read I/O Program 22200 is a program for processing a read request from the storage controller 100. The in-SSD WL Program 22300 is a program for executing a WL in the SSD. The free capacity generation Program 22400 is a program for executing a reclamation processing that is executed for avoiding a depletion of a free space of the SSD 700.

The SSD internal information communication Program 22500 is a program for creating the internal information of an SSD in accordance with a request of the storage controller 100 and notifying the storage controller 100 of the SSD internal information.

The Table Area 23000 is provided with a logical physical conversion TBL 23100 and a statistics information management TBL 23200.

The logical physical conversion TBL 23100 is a table for managing a correspondence between a logical address space and a physical address space of the SSD 700. The statistics information management TBL 23200 is a table for managing the statistics information of the SSD.

The Data Cache Area 24000 is provided with a region that is used to store the user data 24100. Here, the user data 24100 is data that is written to a block and data that has been read from a block.

FIG. 15 is a view showing a configuration example of the logical physical conversion TBL 23100.

The logical physical conversion TBL 23100 is provided with a Start-LBA 23100, a Chunk #23102, a Block #23103, and a Page #23104.

The Start-LBA 23100 indicates a starting position of an LBA that is provided to the storage controller 100. Since an I/O unit of a flash memory is a page, a numerical value of the Start-LBA 23100 is managed by a multiple number of a page size. The Chunk #23102, the Block #23103, and the Page #23104 indicate the information of a physical address space that is corresponded to the Start-LBA 23100. The logical physical conversion TBL 23100 is provided with the information related to a chunk, a block, and a page that are corresponded to each Start-LBA 23100.

FIG. 16 is a view showing a configuration example of the statistics information management TBL 23200 in the SSD.

The information that is included in the statistics information management TBL 23200 is notified to the storage controller 100. The statistics information management TBL 23200 is provided with the information 23210 of a unit of an SSD, and the information 23220 of a unit of a Chunk.

The statistics information management TBL 23200 can be provided with at least one of the information 23210 of a unit of an SSD and the information 23220 of a unit of a Chunk (an aggregate of a plurality of extents). In the present embodiment, the statistics information management TBL 23200 is provided with the information 23210 of a unit of an SSD.

The information 23210 of a unit of an SSD is provided with an SSD #23211, a WR amount 23212, and a remaining erasing frequency 23213.

The SSD #23211 indicates an identifier of an SSD. The WR amount 23212 indicates a total amount of data that been written to an SSD. The remaining erasing frequency 23213 indicates a remaining frequency of erasing until a length of life for an SSD. The remaining erasing frequency 23213 is a value (for instance, a total sum) based on a remaining erasing frequency of a block that is included in an SSD.

The information 23220 of a unit of a Chunk is provided with a Chunk #23221, a WR amount 23222, and a remaining erasing frequency 23223.

The Chunk #23221 indicates an identifier of a Chunk. The WR amount 23222 indicates a total amount of data that been written to a Chunk. The remaining erasing frequency 23223 indicates a remaining frequency of erasing for a Chunk. The remaining erasing frequency 23223 is a value (for instance, a total sum) based on a remaining erasing frequency of a block that configures the Chunk.

As the information that is transmitted from an SSD, any one of the information 23210 of a unit of an SSD and the information 23220 of a unit of a Chunk.

A numerical value of the present table 23200 is updated (for instance, can be added) in the case in which a write of data or the erasing of data occurs. The present table 23200 can store not only the information related to a write but also the information related to a read.

Figure 17:
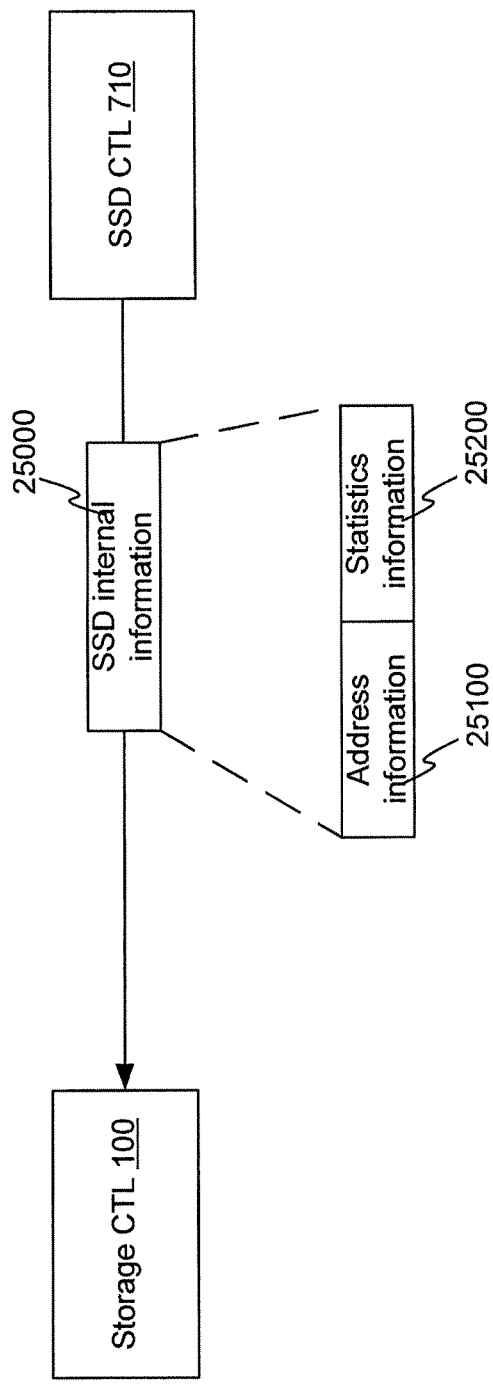
FIG. 17 is a view showing a configuration example of the SSD internal information 25000.

FIG. 17 is a view showing a configuration example of the SSD internal information 25000.

The SSD internal information 25000 is the information that is transmitted from an SSD. The SSD internal information 25000 is provided with the address information 25100 and the statistics information 25200 for instance.

The address information 25100 is the information that is created based on the logical physical conversion TBL 23100. The logical physical conversion TBL 23100 is configured to notify the storage controller 100 of a correspondence status between a logical address and a physical address for instance. The logical physical conversion TBL 23100 is the information that indicates a Chunk that is corresponded to an LBA to be more precise for instance.

In the case of the present embodiment, since a processing is executed based on the information 23210 in a unit of an SSD, the SSD address information 25100 is not notified from the SSD controller 710 to the storage controller 100. In the embodiment 3 described later, the address information 25100 is notified from the SSD controller 710 to the storage controller 100.

The statistics information 25200 is the information that is created based on the statistics information management TBL 23200. The statistics information 25200 (see FIG. 16) is the information that is configured to make the storage controller 100 to create the information related to a life length of each SSD for instance. To be more precise, the statistics information 25200 includes a data amount that has been written to an SSD and a remaining number of the erasing enable number of times for instance.

An amount of the information that is included in the SSD internal information 25000 is varied depending on a notification granularity in a unit of an SSD and a unit of a Chunk (see the statistics information management TBL 23200). An amount of the information in the case of a unit of an SSD is smaller than that in the case of a unit of a Chunk. Consequently, an overhead of a communication is smaller in the case of a unit of an SSD. On the other hand, an SSD notifies the storage controller of the information in a unit of a Chunk, it is necessary to transfer the information for a plurality of Chunks in the SSD. However, the storage controller can comprehend the internal information in more detail and can execute the inter-device WL.

As described above in the present embodiment, a notification unit is a unit of an SSD. In the present embodiment, the address information 25100 is not included and the statistics information 25200 is provided with only the information 23210 in a unit of an SSD of the statistics information management TBL 23200.

The information that is notified from the SSD controller 710 to the storage controller as the SSD internal information 25000 can include the information related to a life length of each SSD that has been created by the SSD controller 710 in addition to the information configured to make the storage controller 100 to create the information related to a life length of each SSD.

The SSD can also manage the information in a plurality of granularity such as a unit of an SSD and a unit of a Chunk, and can modify the granularity of the information to be notified of.

Figure 18:
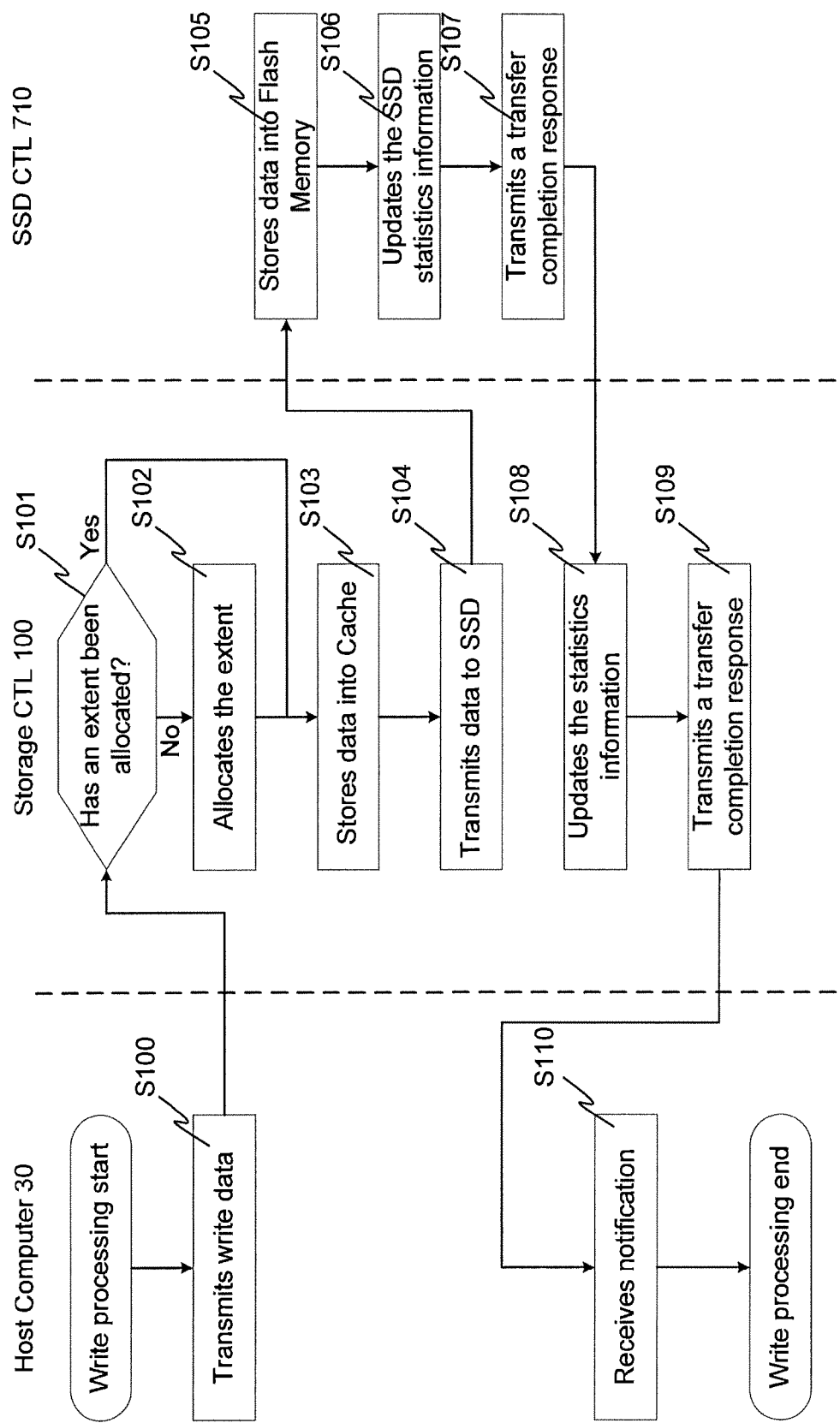
FIG. 18 is a sequence drawing showing an example of a flow of a processing from a transmission of a write request from a host computer 30 to a completion of the processing of the write request.

FIG. 18 is a sequence drawing showing an example of a flow of a processing from a transmission of a write request from the host computer 30 to a completion of the processing of the write request.

The host computer 30 transmits write data and a write request to the storage controller 100 (S100).

The storage controller 100 receives the write data and the write request and judges whether or not an extent has been allocated to a write destination range (an address range for a virtual volume) that is indicated by the write request based on the virtual volume management table 13500 (S101). The storage controller 100 can allocate an extent to a write destination range that is indicated by the write request while taking the opportunity of receiving the write request. In the case in which an extent has been unallocated as a result of the judgment (S101: No), the storage controller 100 finds an unallocated extent, allocates a virtual extent of the extent to the write destination range (S102), and stores the received data to the cache memory 103 (S103). The storage controller 100 can allocate an extent in the case in which the storage controller 100 transmits data from the cache memory 103 to the SSD.

On the other hand, in the case in which an extent has already been allocated as a result of the judgment of the S101 (S101: Yes), the storage controller 100 proceeds to the S103.

In the next place, the storage controller 100 transmits the data that has been stored into the cache memory 103 and the write request to the SSD controller 710 of an SSD 700 that is a stored destination of data (S104).

The SSD controller 710 receives the data and the write request from the storage controller 100, decides a flash memory that is a stored destination of the received data based on the logical physical conversion TBL 23100, and stores the data into the decided flash memory (S105).

After that, the SSD controller 710 updates the statistics information management TBL 23200 related to the received data (S106). The SSD controller 710 transmits a completion response of a transfer as a response of the write request that has been received in the S105 to the storage controller 100 (S107).

The storage controller 100 receives the completion response of a transfer from the SSD controller 710, and updates the statistics information management TBL 23200 (S108).

After that, the storage controller 100 transmits a completion response of a transfer as a response of the write request that has been received in the S101 to the host computer 30 (S109).

The host computer 30 receives the completion response of a transfer from the storage controller 100, and terminates a sequence of processing (S110).

The storage controller 100 can transmit the completion response of a transfer to the host computer 30 at the time point when data is stored into the cache memory 103, and then transmit data from the cache memory 103 to an SSD at an arbitrary timing. The present processing is called a post line processing, and is known as one means for improving a write processing performance of the storage controller 100.

In FIG. 18, an operation of the storage controller 100 is an operation that has been executed by an execution of an I/O Program 12100, and an operation of the SSD controller 710 is an operation that has been executed by an execution of a Write I/O Program 22100.

Figure 19:
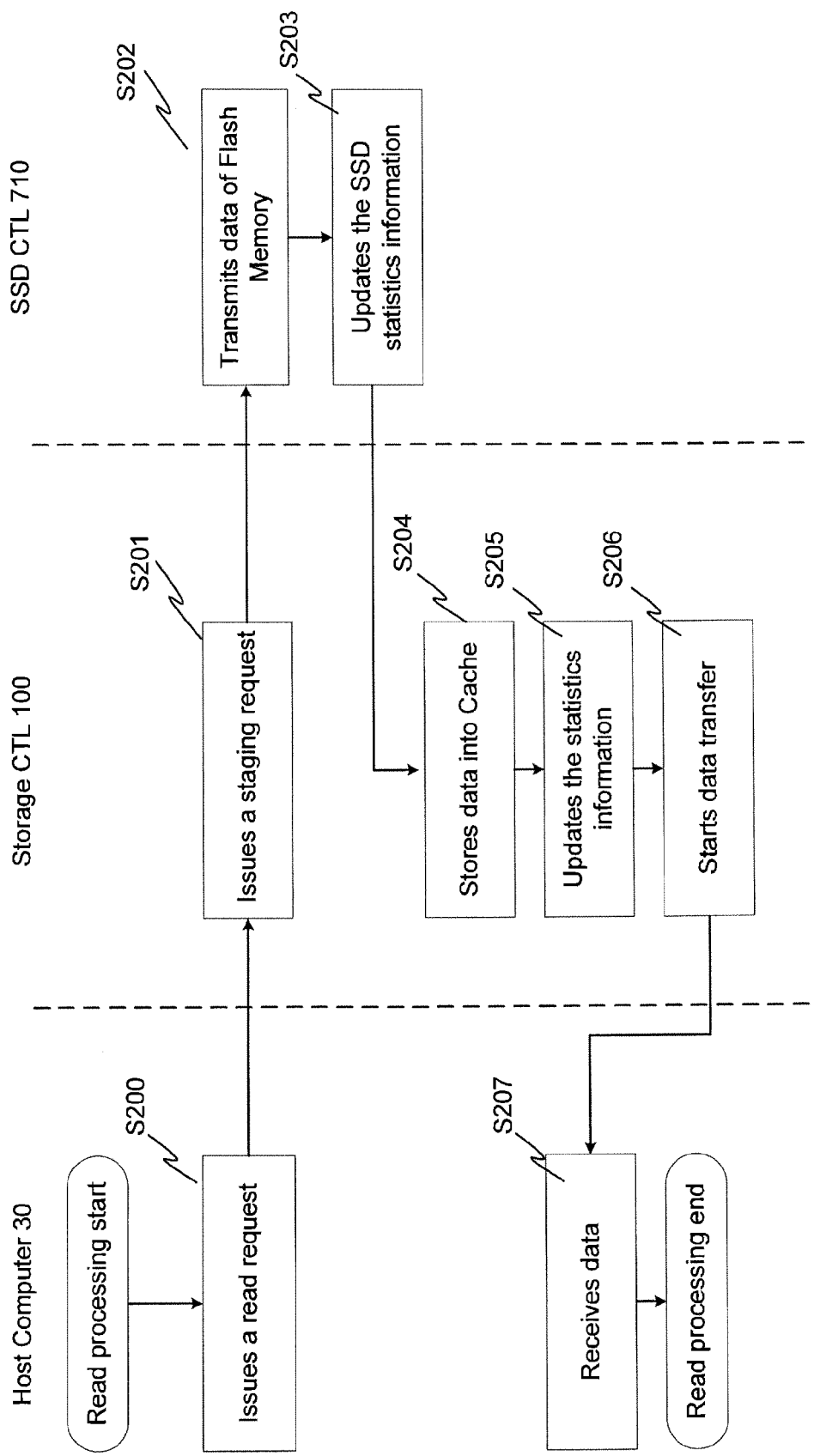
FIG. 19 is a sequence drawing showing an example of a flow of a processing from a transmission of a read request from a host computer 30 to a completion of the processing of the read request.

FIG. 19 is a sequence drawing showing an example of a flow of a processing from a transmission of a read request from the host computer 30 to a completion of the processing of the read request.

The host computer 30 transmits write data and a read request to the storage controller 100 (S200).

The storage controller 100 receives the read request of data, identifies an SSD that is a basis of an extent that has been allocated to a read source range (an address range of a virtual volume) that conforms to the read request, and transmits the read request of data (also referred to as a staging request) to the SSD controller 710 of the identified SSD (S201).

The SSD controller 710 receives the read request of data, identifies a physical address range that is corresponded to a logical address range that conforms to the read request based on the logical physical conversion TBL 23100, reads data from the physical address range (at least one page), and transmits the read data to the storage controller 100 (S202). At this time, the SSD controller 710 updates the statistics information management TBL 23200 (S203).

The storage controller 100 receives data from the SSD controller 710 as a response of the read request that has been transmitted in the S201, stores the received date into the cache memory 103 (S204), and updates the statistics information management TBL 13600 (S205). After that, the storage controller 100 transmits data that has been stored in the S204 to the host computer 30 (S206).

The host computer 30 receives data from the storage controller 100 as a response of the read request that has been transmitted in the S200, and terminates a sequence of processing (S207).

In FIG. 19, an operation of the storage controller 100 is an operation that has been executed by an execution of a Read I/O Program 12200, and an operation of the SSD controller 710 is an operation that has been executed by an execution of a Read I/O Program 22200.

Figure 20:
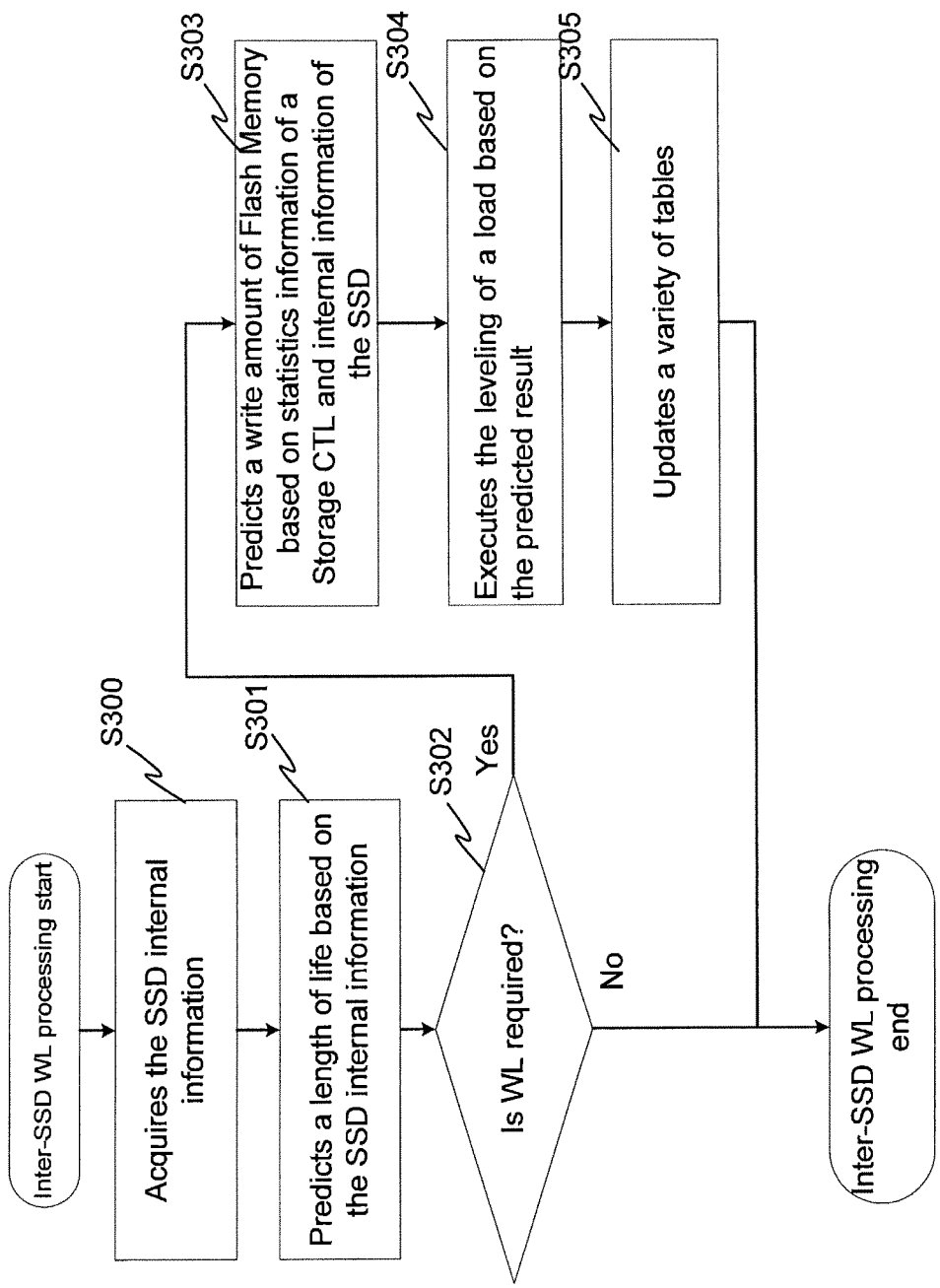
FIG. 20 is a sequence drawing showing an example of a flow of a WL control processing.

FIG. 20 is a sequence drawing showing an example of a flow of an inter-device WL control processing.

The storage controller 100 requests a notification of the internal information 25000 (see FIG. 17) to the SSD controller 710, and receives the internal information of the SSD 700 from the SSD controller 710 in response to the request (S300).

The storage controller 100 updates the Disk management TBL 13100 and calculates a remaining length of life of each SSD based on the internal information (S301). A method for calculating a remaining length of life will be described later with reference to FIG. 21.

In the next place, the storage controller 100 judges whether or not the inter-device WL is required (S302). This can be judged by checking whether or not there is an SSD that reaches a length of life prior to a guarantee period (a remaining life length 13107 is shorter than a remaining guarantee period 13104) or whether or not there is a dispersion of a write amount between SSDs (a total write amount 13105 is not equalized) for instance. In the case in which an extent is disposed over a plurality of SSDs and there is at least one SSD that reaches a length of life prior to a guarantee period among the plurality of SSDs, the storage controller 100 can also execute an inter-device WL.

In the case in which the inter-device WL is required as a result of the judgment of the S302 (S302: Yes), the storage controller 100 proceeds to the S303 and predicts a write amount of a flash memory for every extent based on the statistics information (13701 to 13706) of the storage controller 100 and the internal information (23211 to 23213) of the SSD 700 (S303: the details will be described with reference to FIG. 22).

In the next place, the storage controller 100 executes the inter-device WL based on the predicted result of the S303 (S304: the details will be described with reference to FIGS. 22 to 32). After that, the storage controller 100 updates the information related to an extent that has stored data that has been moved in the inter-device WL (for instance, the information that has been stored into a table) (S305). Subsequently, the storage controller 100 terminates the present processing.

In the case in which the inter-device WL is not required as a result of the judgment of the S302 (S302: No), the storage controller 100 terminates the present processing.

The present processing can also be executed at any timing. The present processing can also be executed at the same interval of time (for instance, every other day). Moreover, the present processing can be executed in conjunction with an I/O request of the host computer 30. Moreover, the present processing can be executed at the timing when a specific command is received. Moreover, the present processing can be executed in the case in which a user instructs an execution opportunity of the present processing from the control software of the host computer 30.

In FIG. 20, an operation of the storage controller 100 is an operation that has been executed by executing the inter-SSD WL Program 12500.

Figure 21:
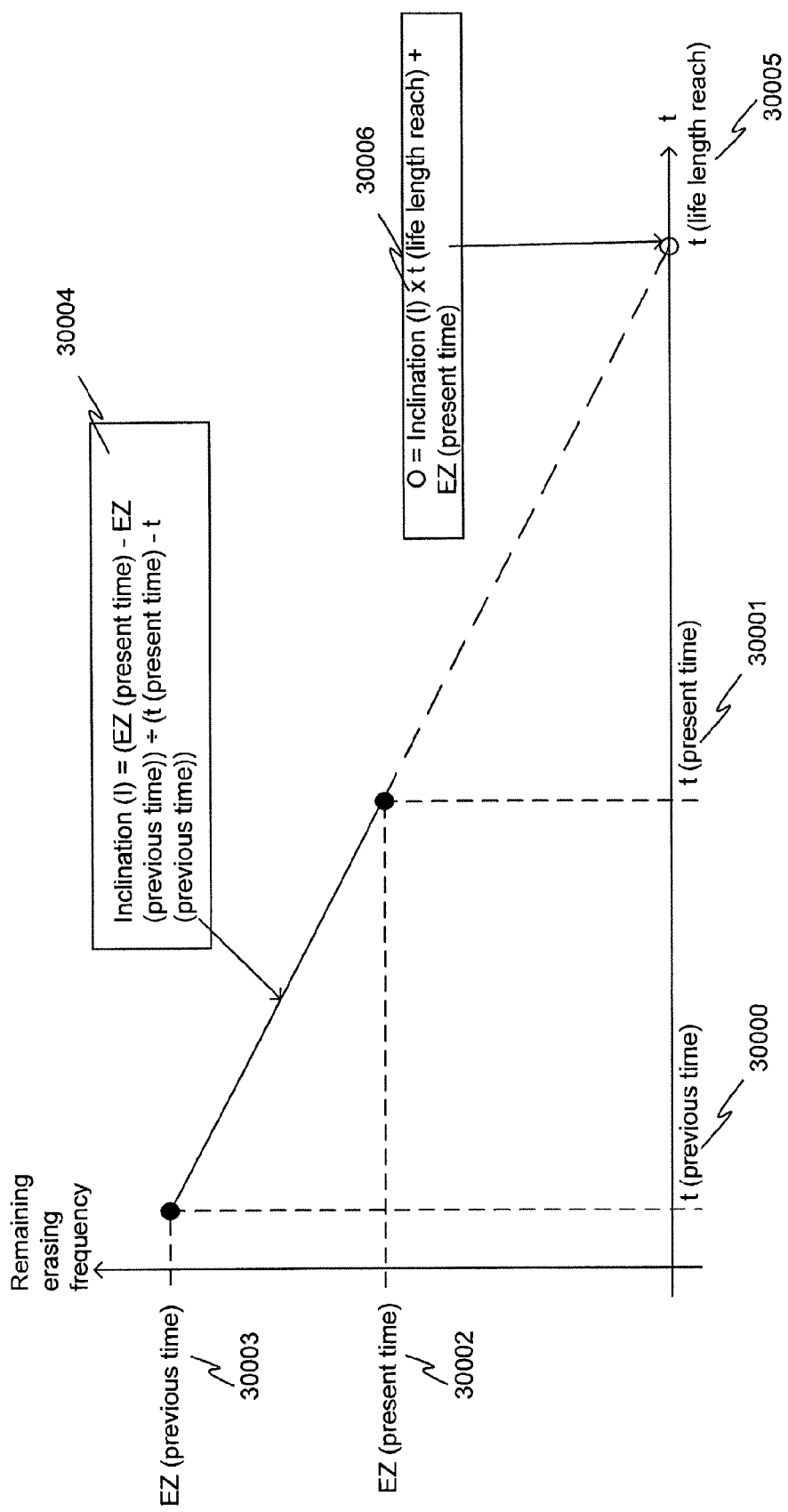
FIG. 21 is a schematic illustrative drawing showing S301 (a life length prediction of an SSD) of FIG. 20.

FIG. 21 is a schematic illustrative drawing showing S301 (a life length prediction of an SSD) of FIG. 20.

A method for predicting a reaching time to a length of life from the rate of decline of a remaining erasing frequency will be described in the following. A length of life of an SSD is a period in which the SSD can be used as a practical matter. In the figure, a horizontal axis indicates a time and a vertical axis indicates a remaining erasing frequency. In the case in which a write is concentrated to an SSD, a life length is shortened. Consequently, it is necessary that an inter-device WL is executed (more specifically, data that has been stored into an extent is exchanged between SSDs) in such a manner that other SSD that is provided with a long life length is used in a positive manner. In the present processing, an SSD that is provided with a short life length (a life length is equal to or less than a threshold value) is detected.

In FIG. 21, t (previous time) 30000 is a point of time when a life length prediction was executed at a previous time and a point of time that is indicated by a value that has been stored into the information update date 13103. EZ (previous time) 30003 is a remaining erasing frequency at a point of time of a life length prediction of a previous time and a number of times that is indicated by a value that has been stored into the remaining erasing frequency 13106.

In the next place, t (present time) 30001 is a point of time when a life length prediction was executed at a present time, and EZ (present time) 30002 is a remaining erasing frequency of a present time and a value that can be acquired from the SSD internal information that is issued this time. The following expression can be calculated by using above information:

$$\text{Inclination}(I) = (EZ(\text{present time}) - EZ(\text{previous time})) \text{ divided by } (t(\text{present time}) - t(\text{previous time}))$$

By using the above expression, an inclination (I) 3004 can be calculated. The larger the inclination (I) 3004 is, the higher the rate of decline of a remaining erasing frequency is.

The following expression can be calculated by using the inclination (I) 30004 that has been calculated and EZ (present time) 30001 that is a remaining erasing frequency of a present time:

$$t(\text{life length reach}) = -(EZ(\text{present time}) \text{ divided by inclination}(I))$$

By using the above expression, a time when a remaining erasing frequency becomes zero, that is, t (life length reach) 30005 that is a life length reaching time can be calculated. A remaining life length period is calculated from a remaining erasing frequency and the rate of decline and is stored into the Disk management TBL 13100.

It is important that the storage media and the storage apparatus are used for a predetermined period (a guarantee period of 5 years for instance) and data is guaranteed. Consequently, in the case in which an inter-device WL is executed in which a guarantee period is one index, a plurality of storage media (such as SSDs) can be used for a guarantee period or longer.

In the case in which the all Write total amount of data that can be written until an SSD reaches a length of life is known, a vertical axis can be substituted with a remaining erasing frequency and a remaining Write amount (a value that is obtained by subtracting a total Write amount 13105 from the all Write total amount) can also be used.

Figure 22:
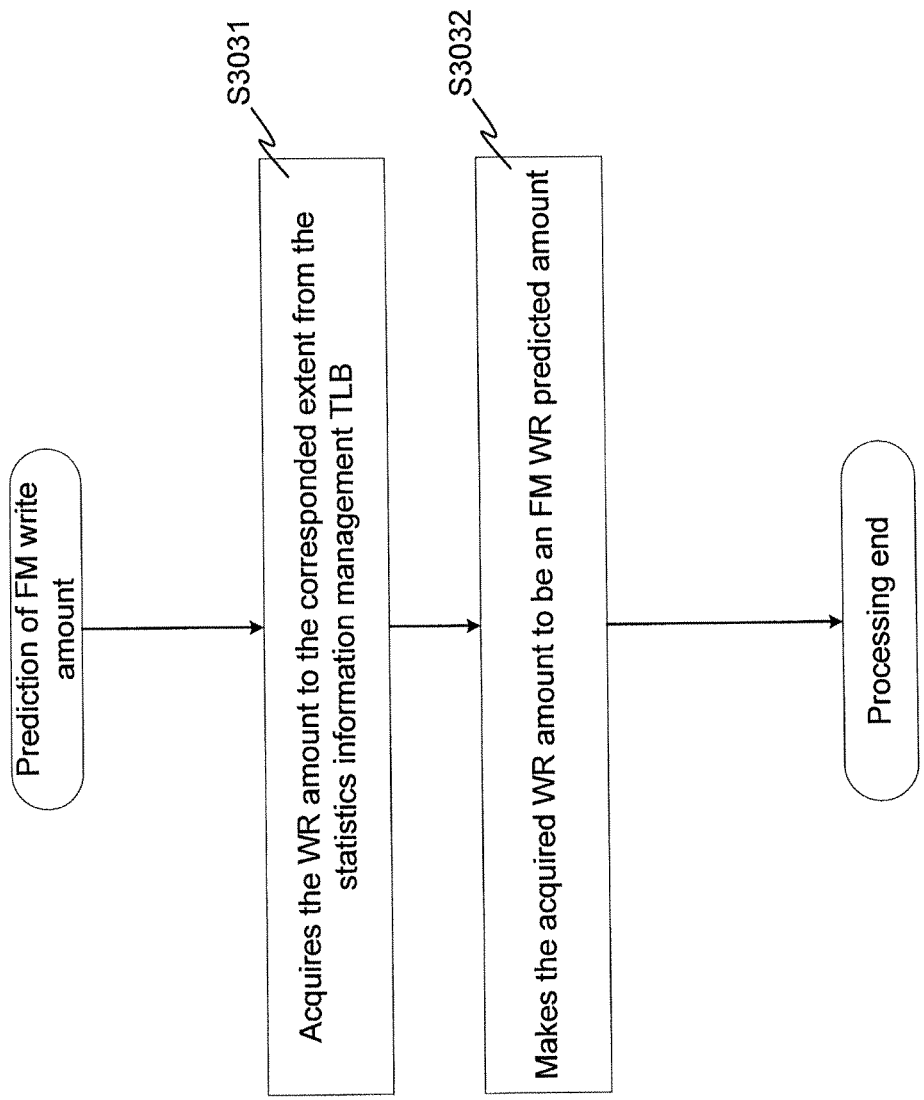
FIG. 22 is a sequence drawing showing an example of a flow of an FM WR amount prediction in accordance with a first embodiment (S303 of FIG. 20).

FIG. 22 is a sequence drawing showing an example of a flow of S303 (a prediction of a write amount of a flash memory) of FIG. 20.

The processor 104 acquires a WR amount 13706 to an extent that is the statistics information that is required for the FM WR amount prediction TBL 13700 based on the information of the statistics information management TBL 13600 (S3031).

In the next place, the processor 104 makes the WR amount 13706 that has been acquired to be an FM WR predicted amount to a flash memory in an SSD to which an extent belongs (S3032).

In the next place, a summary of the S304 (an inter-device WL) of FIG. 20 will be described.

Figure 23:
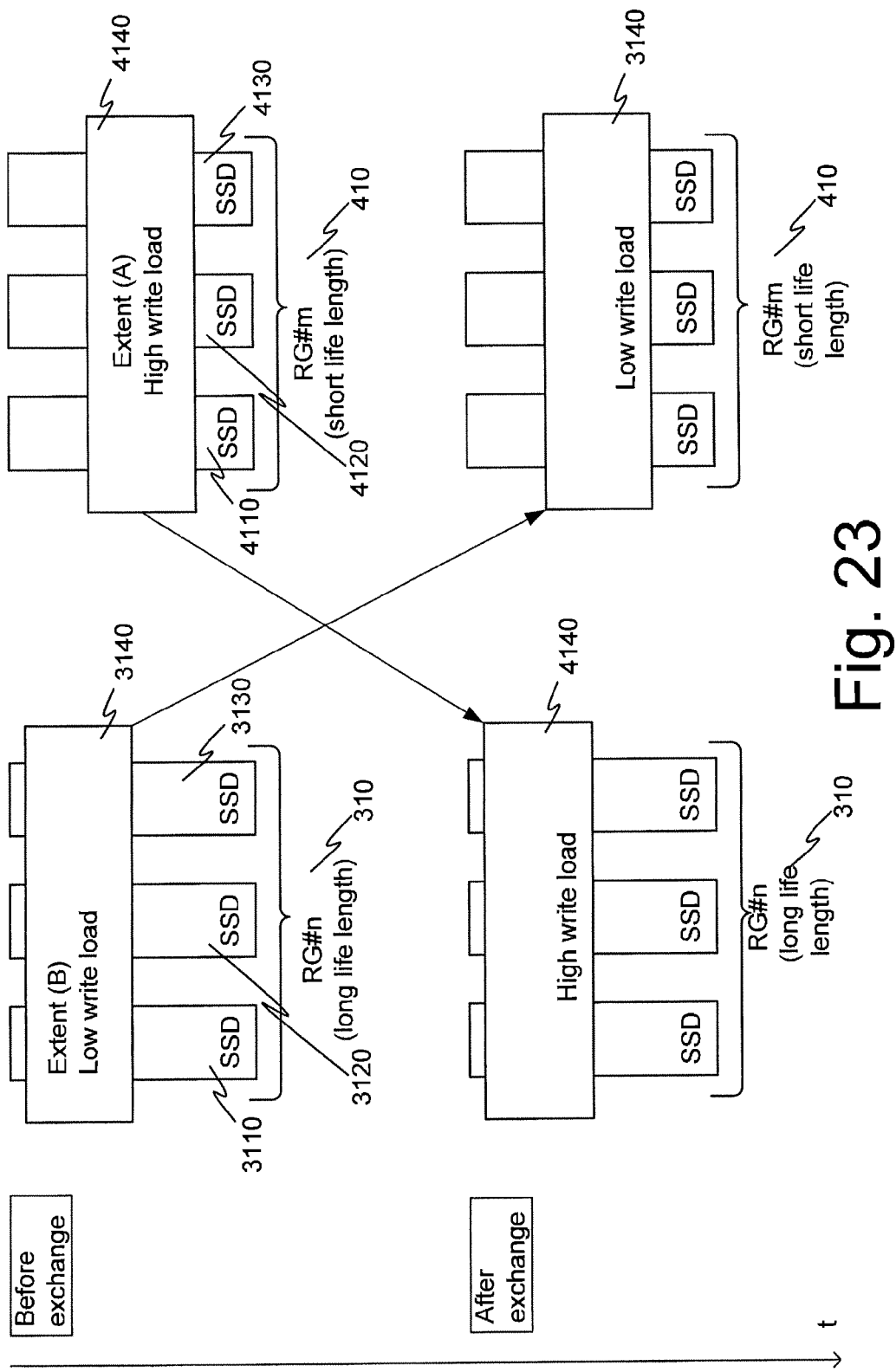
FIG. 23 is a schematic illustrative drawing showing an execution pattern A of an inter-device WL.
Figure 25:
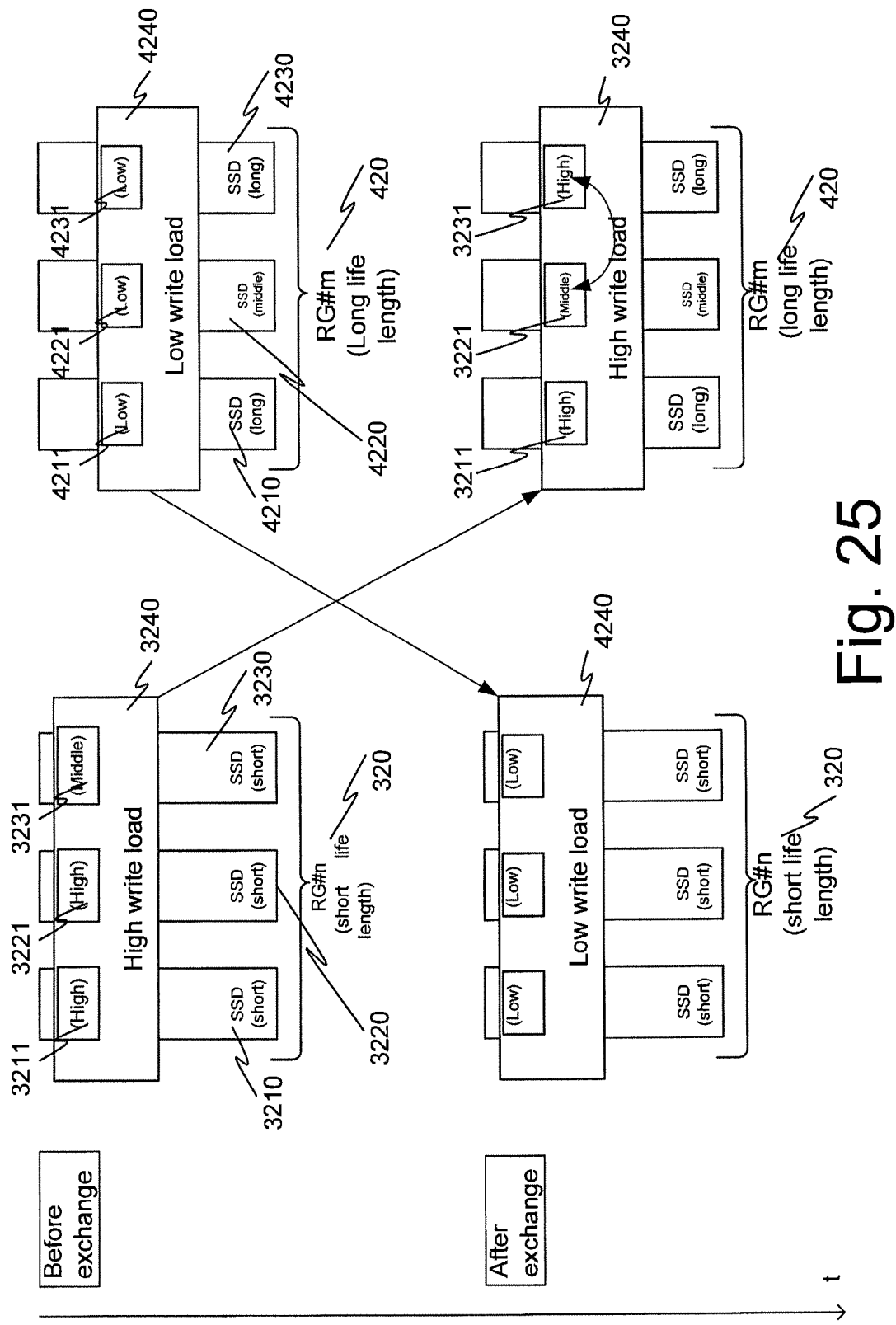
FIG. 25 is a schematic illustrative drawing showing an execution pattern B of an inter-device WL.
Figure 27:
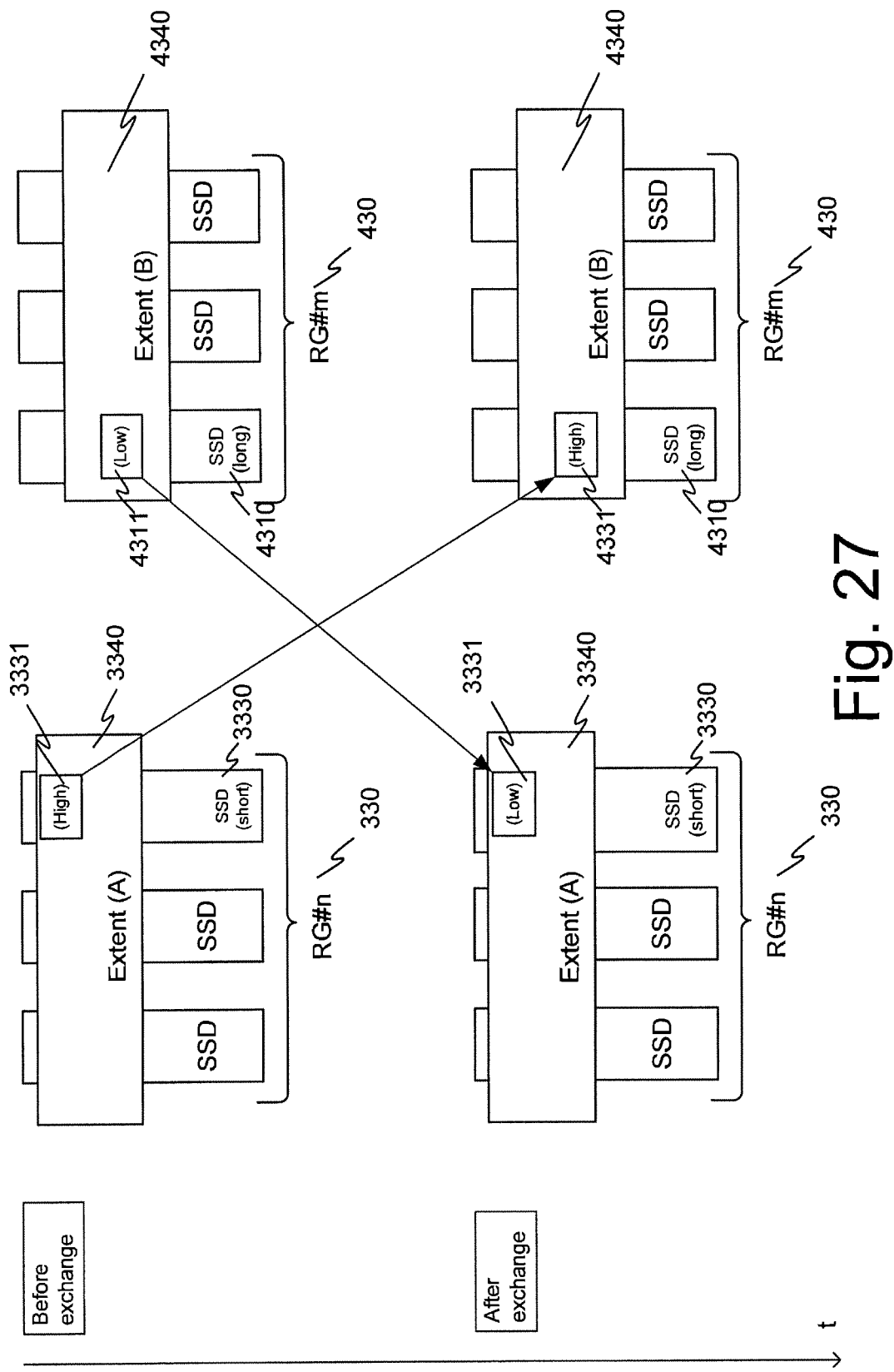
FIG. 27 is a schematic illustrative drawing showing an execution pattern C of an inter-device WL.
Figure 28:
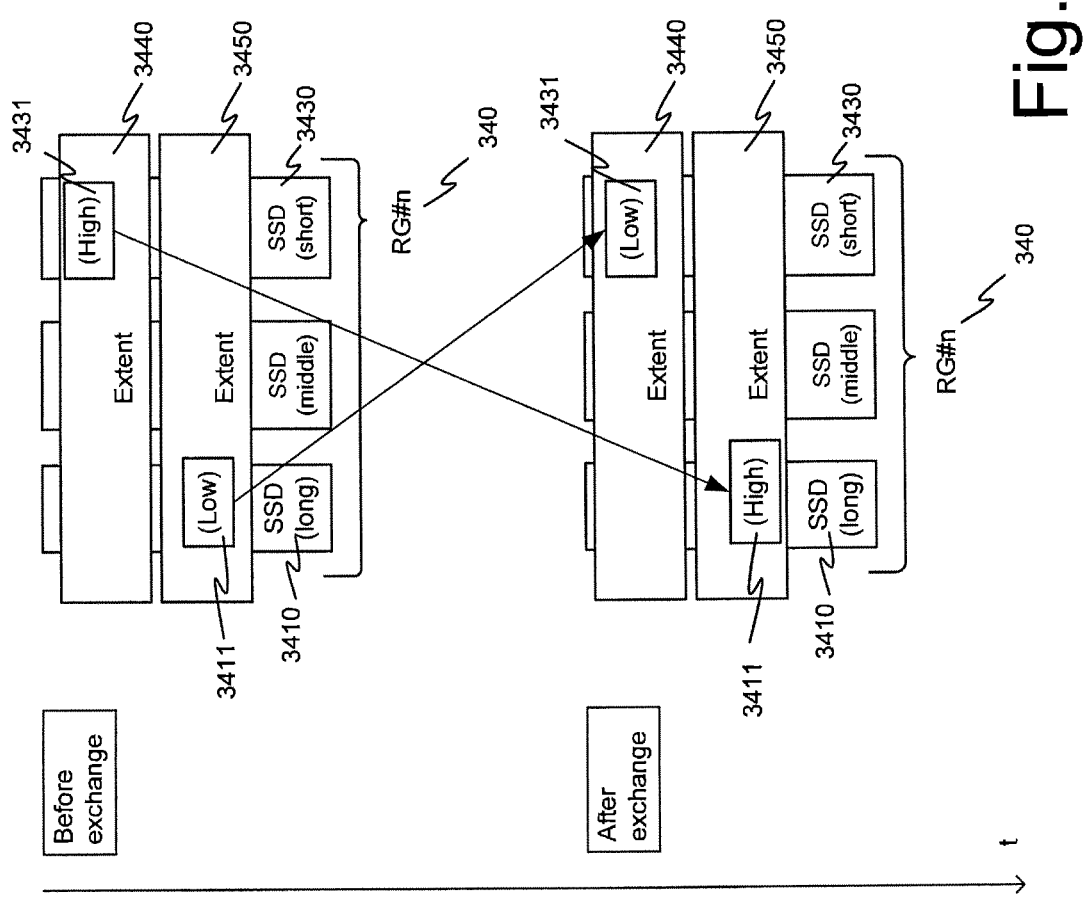
FIG. 28 is a schematic illustrative drawing showing an execution pattern D of an inter-device WL.
Figure 32:
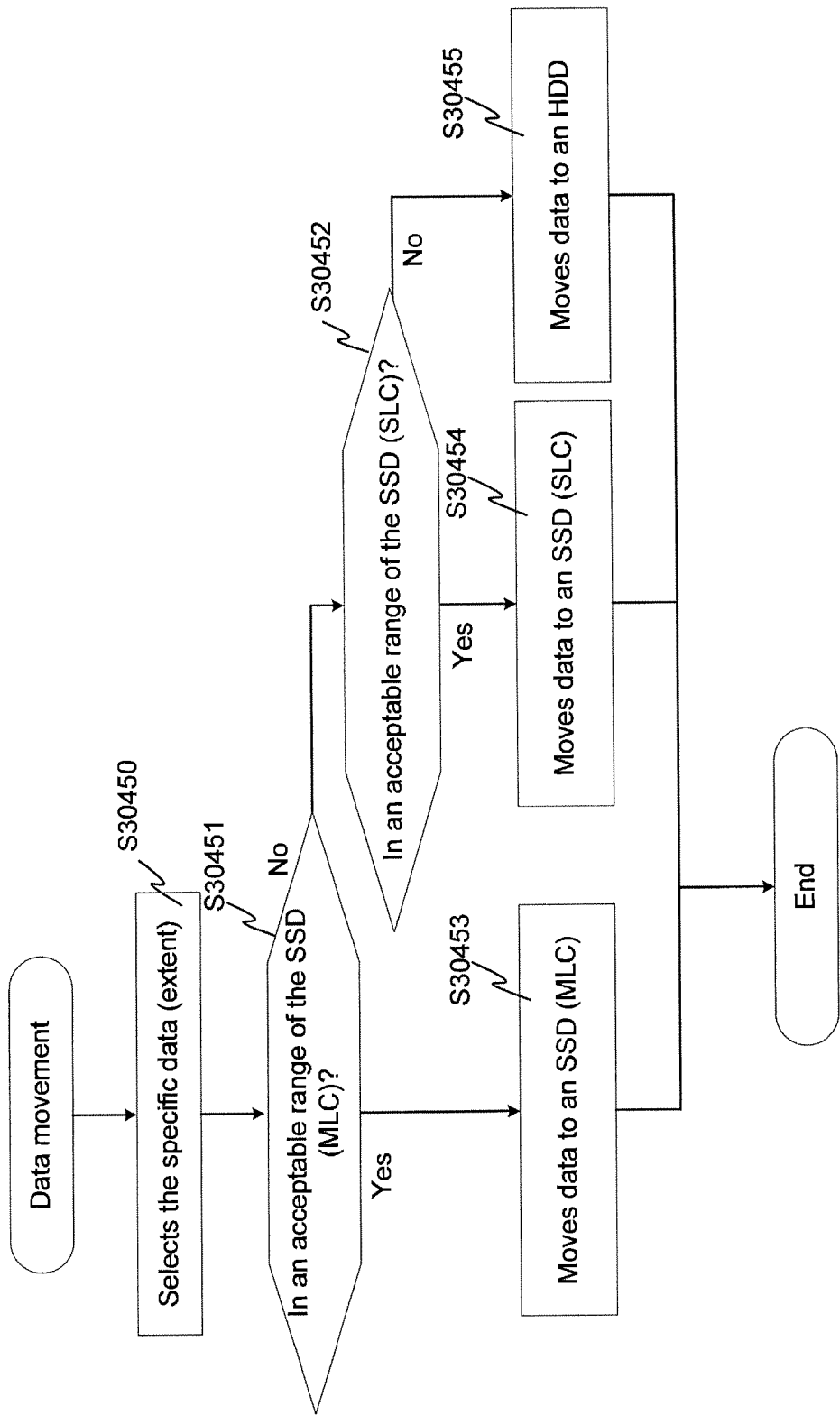
FIG. 32 is a sequence drawing showing an example of an execution pattern F of an inter-device WL.

As an inter-device WL, there are some patterns, for instance, the following five execution patterns (patterns A to E):

Pattern A: data is moved between RGs in a unit of an extent (FIG. 23);
Pattern B: data is moved between RGs in a unit of an extent, and a storage location of a plurality of data elements (data (and parity)) based on data in the extent is optimized for the RG of a movement destination (FIG. 25);
Pattern C: data is moved between RGs in a specific unit of data in an extent (FIG. 27);
Pattern D: data is moved in an RG in a specific unit of data in an extent (FIG. 28);
Pattern E: data is moved between different devices in accordance with a performance characteristic of a device (FIG. 30); and
Pattern F: data is moved in accordance with a life length characteristic of a device (FIG. 32).

For the patterns A to C, the condition is that at least two RGs exist. Moreover, for the pattern D, there is at least one RG. Moreover, for the pattern E and the pattern F, the condition is that at least two RGs that are provided with different Disk types exist.

In the present embodiment, a write load is an FM WR predicted amount. In other words, a high (low) write load means that an FM WR predicted amount is large (small).

FIG. 23 is a schematic illustrative drawing showing an execution pattern A of an inter-device WL.

For the pattern A, data in an extent is moved between different RGs. An RG #n 310 is configured by an SSD 3110, an SSD 3120, and an SSD 3130, and there is an extent #3140 based on an RG #n 310. Data based on data 3111 in the SSD 3110, data 3121 in the SSD 3120, and data 3131 in the SSD 3130 has been stored into the extent #3140.

An RG #m 410 is configured by an SSD 4110, an SSD 4120, and an SSD 4130, and there is an extent #4140 based on an RG #m 410. Data based on data 4111 in the SSD 4110, data 4121 in the SSD 4120, and data 4131 in the SSD 4130 has been stored into the extent #4140.

The RG #m 410 is a RAID group in which a length of life is short. For instance, the RG #m 410 includes an SSD in which a remaining length of life is shorter than a threshold value. In other words, a RAID group in which a length of life is short includes an SSD in which a length of life is shorter than a guarantee period. An extent (A) in which an FM WR predicted amount is largest is a target of an inter-device WL among a plurality of extents that are included in the RAID group.

The RG #n 310 is a RAID group in which a length of life is long. For instance, an SSD that is included in the RAID group is provided with a remaining length of life that is larger than a threshold value. An extent (B) in which an FM WR predicted amount is largest is a target of an inter-device WL among a plurality of extents that are included in the RAID group.

Even in the case in which a length of life of any RAID group is in a guarantee period, in the case in which a divergence of a length of life between RAID groups (a divergence of a length of life of an SSD that configures each RAID group) is equal to or larger than a predetermined value, the storage controller 100 can execute an inter-device WL.

As described above, in the case in which there is a divergence between a remaining length of life of the RG #n 310 and a remaining length of life of the RG #m 410, an inter-device WL is executed.

More specifically, data that has been stored into the extent #3140 and data that has been stored into the extent #4140 are exchanged with each other for instance. By this exchange, data that is provided with a high write load is stored into the RG #n 310 that is provided with a long remaining length of life, and data that is provided with a low write load is stored into the RG #m 410 that is provided with a short remaining length of life.

Here, the data exchange" means that the storage controller 100 executes the following processing for instance:

(*) the storage controller 100 identifies a range of a logical address of the extent #3140 in which data has been stored and a range of a logical address of the extent #4140 in which data has been stored by referring to the extent management TBL 13400.

(*) the storage controller 100 issues a read request to an SSD that includes the identified logical address range (more specifically, issues a read request to an SSD that is a basis of the extent #3140 and an SSD that is a basis of the extent #4140), reads the data from the SSD, and stores the read data into the cache memory 103 on a temporary basis. At this time, the SSD that has received the read request identifies a physical page in which data has been stored, reads the data, and transmits the data to the storage controller based on a logical address that is included in the read request and the logical physical conversion TBL 23100. The data that has been read from the SSD based on the extent #3140 (first data) and the data that has been read from the SSD based on the extent #4140 (second data) are stored into the cache memory 103 on a temporary basis.

(*) the storage controller 100 identifies an SSD that includes a logical address of the extent, and issues a write request of the data that has been stored into the cache memory 103 on a temporary basis to the SSD. More specifically, a write request of the first data is issued to an SSD based on the extent #4140 and a write request of the second data is issued to an SSD based on the extent #3140. As a result, the first data from the extent #3140 is stored into the extent #4140, and the second data from the extent #4140 is stored into the extent #3140. At this time, the SSD that has received the write request identifies a free physical page from the logical physical conversion TBL 23100, writes the received data to the identified free physical page, and updates the logical physical conversion TBL 23100.

In the following, the data exchange means a processing in which data that has been stored into each of two extents is identified by the extent management TBL 13400, the identified data is stored into the cache memory 103 on a temporary basis, and the stored data is stored into the other extent that is different from an extent of a read source as described above.

In the case in which data in the extent #3140 that is provided with a small write data amount is stored into the RG #m 410 that is provided with a short remaining length of life, a write data amount to an SSD that configures the RG #m 410 that is provided with a short remaining length of life is reduced. Consequently, a reduction of a remaining length of life can be suppressed. On the other hand, in the case in which data in the extent #4140 that is provided with a large write data amount is stored into the RG #n 310 that is provided with a long remaining length of life, a write data amount of the RG #n 310 that is provided with a short remaining length of life is increased. Consequently, a divergence of a remaining length of life of the RG #n 310 and a remaining length of life of the RG #m 410 can be reduced by the data exchange. That is, an erasing frequency between devices can be leveled.

Since a data movement occurs in a unit of an extent in which a stripe line is maintained in the pattern A, a reduction of a redundancy of the RAID due to switching does not occur.

More specifically, the "data exchange" is equivalent to a modification of an allocation order of the allocating extent #13505 of the virtual volume management TBL 13500 and a modification of a value of the Disk #13405, the Stripe #13406, the Start-LBA 13407, and the Last-LBA 13408 of the extent management TBL 13400 for instance.

In the present processing, a data movement is executed between SSDs in order to reduce a divergence of a remaining length of life of the RG #n 310 and a remaining length of life of the RG #m 410 by exchanging data that has been stored into the extent #3140 and data that has been stored into the extent #4140 as described above. However, data that has been stored into the extent #4140 (a short life length and a high write load) can also be moved to an extent in which data has not been stored.

Figure 24:
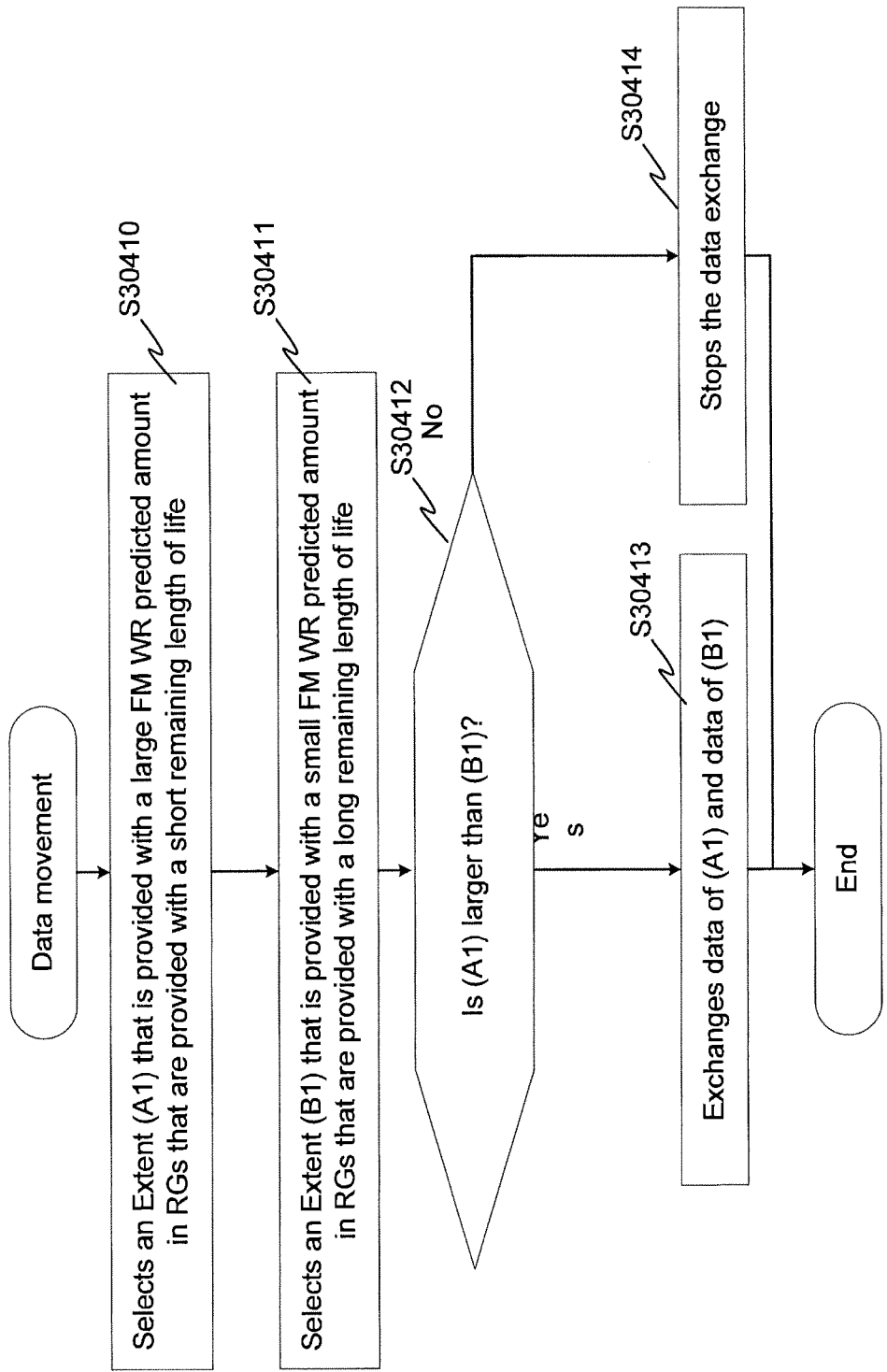
FIG. 24 is a sequence drawing showing an example of an execution pattern A of an inter-device WL.

FIG. 24 is a sequence drawing showing an example of an execution pattern A of an inter-device WL.

In the sequence drawing of the following description, the storage controller 100 transmits an exchange instruction of data that has been stored into an extent to the SSD controller 710, and the SSD controller 710 that has received the exchange instruction of data transmits data related to the exchange instruction of data to the storage controller 100.

The processor 104 selects an RG that is provided with a short length of life and that is a data movement source of an inter-device WL based on the Disk management TBL 13100 and the RG management TBL 13200. Here, the RG that is provided with a short length of life is an RG that is provided with at least one (or at least two) SSDs in which a remaining life length period is equal to or less than the predetermined threshold value (a short length of life among a plurality of SSDs that are included in an RG. For instance, the threshold value is determined based on a guarantee period. That is, an RG that includes an SSD that reaches a length of life before a guarantee period is an RG that is provided with a short length of life. In the case in which an SSD reaches a length of life before a guarantee period, it is thought that a write is concentrated to the SSD. Consequently, data that is provided with a high write load is moved from such an SSD, thereby enabling a long length of life of an SSD.

In the case in which there are RGs that are provided with a short length of life, any RG can be a target of an inter-device WL. In this case, a length of life of each RG is a length of life of an SSD that is provided with a shortest length of life among SSDs that are included in each RG, and an inter-device WL can be executed in order from an RG that is provided with a shorter length of life. Moreover, an inter-device WL can be executed in order from an RG in which the number of SSDs that are provided with a length of life shorter than a guarantee period is larger.

The processor 104 refers to the FM WR amount prediction TBL 13700, and selects an extent (A1) that is provided with a large FM WR predicted amount in RGs that are provided with a short length of life (S30410).

An extent that is provided with a large FM WR predicted amount is an extent that is provided with a largest FM WR predicted amount among a plurality of extents. The extents that are provided with a FM WR predicted amount that is equal to or larger than a threshold value can be grouped, and one extent can be selected from the group. In this case, it is not necessary that an extent that is provided with a largest FM WR predicted amount is searched, thereby shortening a processing time.

In the next place, the processor 104 selects an RG that is provided with a long length of life based on the Disk management TBL 13100 and the RG management TBL 13200. Here, the RG that is provided with a long length of life is an RG that is not provided with an SSD that is provided with a short length of life among a plurality of SSDs that are included in an RG. In the case in which there is not such an RG, an RG in which the number of SSDs that are provided with a short length of life is less can be an RG that is provided with a longer length of life.

Moreover, the processor 104 refers to the FM WR amount prediction TBL 13700, and selects an extent (A1) that is provided with a small FM WR predicted amount in RGs that are provided with a long length of life (S30411).

An extent that is provided with a small FM WR predicted amount is an extent that is provided with a smallest FM WR predicted amount among a plurality of extents. The extents that are provided with a FM WR predicted amount that is equal to or less than a threshold value can be grouped, and one extent can be selected from the group.

The processor 104 then judges whether or not an FM WR predicted amount of the extent (A1) is larger than an FM WR predicted amount of the extent (B1) (S30412).

In the case in which an FM WR predicted amount of the extent (B1) is larger than an FM WR predicted amount of the extent (A1) and the extent (B1) is moved to an RG that is provided with a short remaining length of life, a write data amount to the RG is more increased, and an erasing frequency is not leveled between devices. Consequently, by this judgment, an erasing frequency can be leveled between devices in an appropriate manner without executing an unnecessary data movement.

In the case in which the result of the judgment is positive (S30412: Yes), the processor 104 exchanges data in the extent (A1) and data in the extent (B1) with each other (S30413) and terminates the present processing. On the other hand, in the case in which the result of the judgment is negative (S30412: No), the processor 104 stops the data exchange (S30414) and terminates the present processing.

FIG. 25 is a schematic illustrative drawing showing an execution pattern B of an inter-device WL.

For the pattern B, a data movement (a data exchange) is executed in a unit of an extent between RGs, and an optimization of a data store location in an extent is also executed. Even in the case in which data is moved between RGs, it is not always true that an optimization of a data store location in an extent is executed.

An RG #n 320 is configured by an SSD 3210, an SSD 3220, and an SSD 3230, and there is an extent #3240 based on an RG #n 320. Data that is based on data in the SSD 3210, data in the SSD 3220, and data in the SSD 3230 has been stored into the extent #3240.

An RG #m 420 is configured by an SSD 4210, an SSD 4220, and an SSD 4230, and there is an extent #4240 based on an RG #m 420. Data that is based on data in the SSD 4210, data in the SSD 4220, and data in the SSD 4230 has been stored into the extent #4240.

The extent #3240 of the RG #n 320 is provided with the regions (3211 and 3221) that are provided with a high FM WR predicted amount and the region (3231) that is provided with a middle FM WR predicted amount. In other words, the extent #3240 is provided with regions (extent parts) that are provided with different FM WR predicted amounts. In the case in which a logical address range based on one SSD is called an "extent", it can also be said that an extent group #3240 is provided with extents that are provided with different FM WR predicted amounts. Moreover, the RG #n 320 is a RAID group that is provided with a short length of life.

On the other hand, the extent #4240 of the RG #m 420 has stored data that is provided with a low FM WR predicted amount (4211, 4221, and 4231). However, a length of life of an SSD that configures the RG #m 420 is dispersed. More specifically, an SSD 4210 and an SSD 4230 are provided with a long length of life (a remaining erasing frequency is high) for instance, and an SSD 4220 is provided with a middle remaining length of life.

In other words, there is a divergence between a remaining length of life of the RG #n 320 and a remaining length of life of the RG #m 420.

In order to reduce a divergence between a remaining length of life of the RG #n 320 and a remaining length of life of the RG #m 420, a WL in which the extents #3240 and #4240 are targets of an inter-device WL is executed between SSDs. More specifically, the following will be executed:

(*) Data that has been stored into the extent #3240 and data that has been stored into the extent #4240 are exchanged with each other. More specifically, data that is provided with a large FM WR predicted amount is stored into the RG #n 320 that is provided with a long length of life, and data that is provided with a small FM WR predicted amount is stored into the RG #m 420 that is provided with a short length of life for instance. By this data exchange, a divergence between a remaining length of life of the RG #n 320 and a remaining length of life of the RG #m 420 can be reduced.

(*) In order to solve a dispersion of a remaining length of life between SSDs that configure the RG #m 420, the stored destinations of at least two data of a plurality of data based on data that has been stored into the extent #3240 are exchanged for the extent #3240. More specifically, the data 3231 that is provided with a middle FM WR predicted amount is stored into the SSD 4220 that is provided with a middle remaining length of life, and the data 3221 that is provided with a large FM WR predicted amount is stored into the SSD 4230 that is provided with a long length of life for instance. That is, the stored locations of the data 3231 and 3221 are exchanged with each other for the extent #3240. By this configuration, it is expected that a dispersion of a remaining length of life between SSDs can be solved for the RG #m 420 after an inter-device WL is executed.

Figure 26:
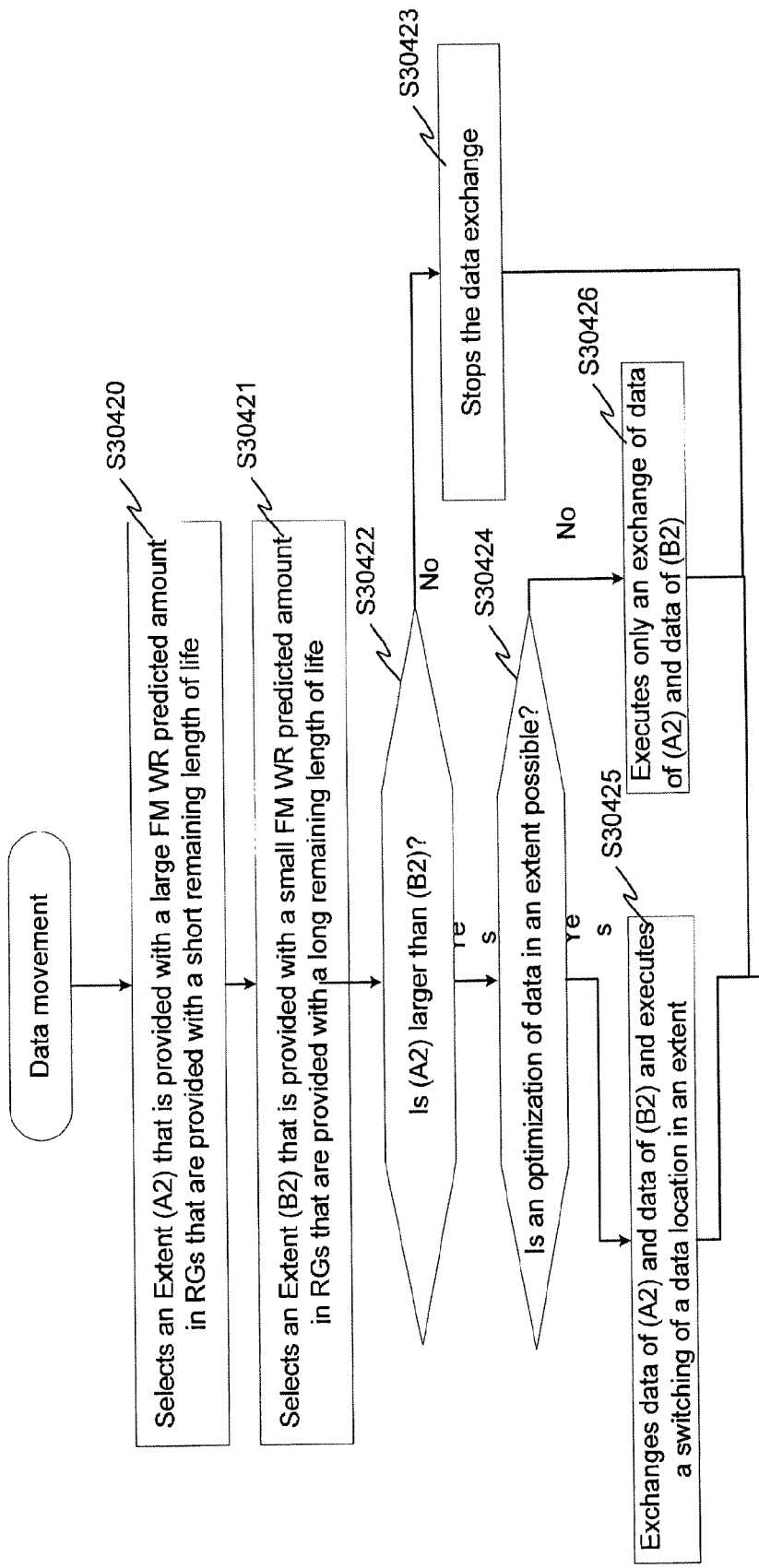
FIG. 26 is a sequence drawing showing an example of an execution pattern B of an inter-device WL.

FIG. 26 is a sequence drawing showing an example of an execution pattern B of an inter-device WL.

The processor 104 selects an RG that is provided with a short length of life based on the Disk management TBL 13100 and the RG management TBL 13200. Moreover, the processor 104 refers to the FM WR amount prediction TBL 13700, and selects an extent (A2) that is provided with a large FM WR predicted amount in RGs that are provided with a short length of life (S30420).

In the next place, the processor 104 selects an RG that is provided with a long length of life based on the Disk management TBL 13100 and the RG management TBL 13200. Moreover, the processor 104 refers to the FM WR amount prediction TBL 13700, and selects an extent (B2) that is provided with a small FM WR predicted amount in RGs that are provided with a long length of life (S30420).

The processor 104 then judges whether or not an FM WR amount of the extent (A2) is larger than an FM WR amount of the extent (B2) (S30422).

In the case in which the result of the judgment is positive (S30422: Yes), the processor 104 judges whether or not an optimization of a data store location in an extent is possible (S30424). The optimization of a data store location in an extent is to store the data into an SSD that is provided with a remaining length of life that is suitable for a degree of an FM WR predicted amount of the data, more specifically, to store the data that is provided with a large FM WR predicted amount into an SSD that is provided with a long remaining length of life and to store the data that is provided with a small FM WR predicted amount into an SSD that is provided with a short remaining length of life.

In the case in which the result of the judgment is positive (S30424: Yes), the processor 104 exchanges data in the extent (A2) and data in the extent (B2) with each other, executes a switching of a data location (an optimization of a data store location) in an extent (S30425), and terminates the present processing.

In the case in which the result of the judgment of the S30424 is negative (S30424: No), the processor 104 exchanges data in the extent (A2) and data in the extent (B2)

with each other (S30426) and terminates the present processing without executing an optimization of a data store location.

In the case in which the result of the judgment of the S30422 is negative (S30422: No), the processor 104 stops the data movement (S30423) and terminates the present processing.

FIG. 27 is a schematic illustrative drawing showing an execution pattern C of an inter-device WL.

For the pattern C, a data movement between RGs is executed in a unit of an extent part. There are an extent (A) 3340 based on the RG #n 330 and an extent (B) 4340 based on the RG #m. An SSD 3330 belongs to the RG #n 330 and is provided with a short length of life. However, the SSD 3330 is based on a region (an extent part of the extent (A) 3340) that is provided with a large FM WR predicted amount and data has been stored into the region 3331. On the other hand, an SSD 4310 belongs to the RG #n 430 and is provided with a long length of life. However, the SSD 4310 is based on a region (an extent part of the extent (B) 4340) that is provided with a small FM WR predicted amount and data has been stored into the region 4331.

In order to level a remaining length of life of the SSD 3330 and the SSD 4310, a data movement (a data exchange) is executed. More specifically, the data is exchanged between the region 3331 that is provided with a large FM WR predicted amount and the region 4311 that is provided with a small FM WR predicted amount.

However, there is a possibility that a stripe line cannot be maintained due to the data movement. In the case in which data or parity that belongs to the same stripe line is stored into the same SSD, a redundancy of the RAID is deteriorated.

To avoid the above problem, the processor 104 can refers to the extent management TBL 13400 in a movement of data, and can suppress the movement of data in the case in which a redundancy of the RAID is deteriorated Before a data movement, one extent (A) 3340 (in other words, three extent parts of the same extent (A) 3340) is allocated to one virtual extent for instance. After the data movement, two extents (A) and (B) (in other words, an extent part of the extent (A) 3340 and an extent part of the extent (B) 4340) are corresponded to the virtual extent for instance. More specifically, after the data movement, an allocated destination to which the extent (A) 3340 has been allocated is modified from a part of the extent (A) 3340 (a data movement source) to a part of the extent (B) 4340 (a data movement destination). Similarly, an allocated destination of a part of a virtual extent to which the extent (B) 4340 has been allocated is modified from a part of the extent (B) 4340 (a data movement source) to a part of the extent (A) 3340 (a data movement destination).

FIG. 28 is a schematic illustrative drawing showing an execution pattern D of an inter-device WL.

For the pattern D, a data movement is executed in a unit of an extent part in an RG.

The pattern D that is different from the pattern C is not a movement between RGs but a data movement in the same RG. The basic concept of the pattern D is equal to that of the pattern C, and is to level a write load of the SSD 3410, the SSD 3420, and the SSD 3430 that configure the RG #n 340.

For instance, the RG #n 340 is configured by the SSD 3410 that is provided with a long remaining length of life, the SSD 3420 that is provided with a middle remaining length of life, and the SSD 3430 that is provided with a short remaining length of life. The extents #3440 and #3450 are based on the RG #n 340.

The data that has been stored into the SSD 3430 that is provided with a short length of life and that has been stored into the region 3413 that is provided with a large FM WR predicted amount is moved to the SSD 3410 that is provided with a long length of life. Moreover, the data that has been stored into the SSD 3410 that is provided with a long length of life and that has been stored into the region 3411 that is provided with a small FM WR predicted amount is moved to the SSD 3430 that is provided with a short length of life.

Similarly to the pattern C, a redundancy of the RAID is at risk of being deteriorated due to a movement of data. In that case, the processor 104 suppresses the movement of data.

For the execution patterns C and D of an inter-device WL, data that configures the same stripe line is not stored into the same extent. Consequently, the processor 104 can store a correspondence relationship between an extent part of a movement source of the data and an extent part of a movement destination into the cache memory 103. In the case in which the processor 104 reads a data group that configures the same stripe line and that is dispersed to a plurality of extents, a movement source can be a plurality of extents based on the correspondence relationship that has been stored. Alternatively, in the case in which data that configures the same stripe line is dispersed to a plurality of extents, the processor 104 can modify the correspondence relationship between a part of a logical address range of an extent and a physical address range of an SSD. By this configuration, some extent can based on an SSD of a part of one RAID group and an SSD of a part of another RAID group.

Figure 29:
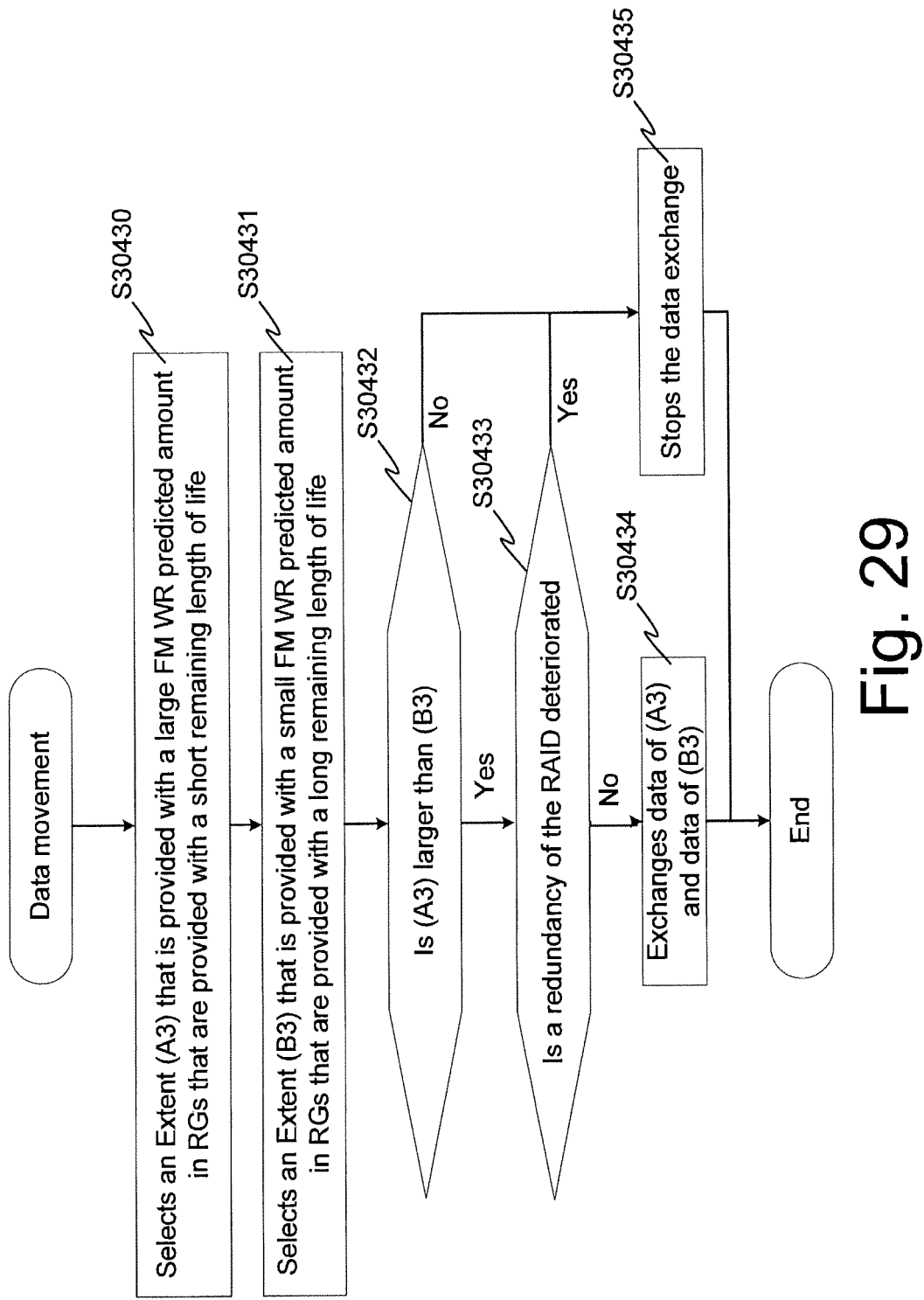
FIG. 29 is a sequence drawing showing an example of the execution patterns C and D of an inter-device WL.

FIG. 29 is a sequence drawing showing an example of the execution patterns C and D of an inter-device WL.

The processor 104 selects an RG that is formed based on the Disk that is provided with a short length of life based on the Disk management TBL 13100 and the RG management TBL 13200. Moreover, the processor 104 refers to the FM WR amount prediction TBL 13700 and selects an extent (A3) that is provided with a large FM WR predicted amount in Disks that are provided with a short length of life (S30430).

In the next place, the processor 104 selects a Disk that is provided with a long length of life based on the Disk management TBL 13100 and the FM WR amount prediction TBL 13700. Here, the processor 104 selects a Disk that is provided with a long length of life among Disks that configure an RG that is different from an RG that is provided with a Disk that is provided with a short length of life in the pattern C. Moreover, the processor 104 selects a Disk that is provided with a long length of life among Disks that configure an RG that is equal to an RG that is provided with a Disk that is provided with a short length of life in the pattern D.

In the next place, the processor 104 selects the data (B3) that is provided with a small FM WR amount among Disks that are provided with a long length of life (S30431). The processor 104 then judges whether or not an FM WR amount of the data (A3) is larger than an FM WR amount of the data (B3) (S30432).

In the case in which the result of the judgment is positive (S30432: Yes), the processor 104 refers to the extent management TBL 13400 and judges whether or not a redundancy of the RAID is deteriorated due to a data movement (S30433).

In the case in which the result of the judgment is negative (S30433: No), the processor 104 executes a data movement for exchanging a store location of the data (A) and the data (B) with each other (S30433) and terminates the present processing.

On the other hand, in the case in which the result of the judgment is positive (S30433: Yes), the processor 104 stops a movement of data (S30435) and terminates the present processing.

Moreover, in the case in which the result of the judgment is negative (S30432: No), the processor 104 stops a movement of data (S30435) and terminates the present processing.

Figure 30:
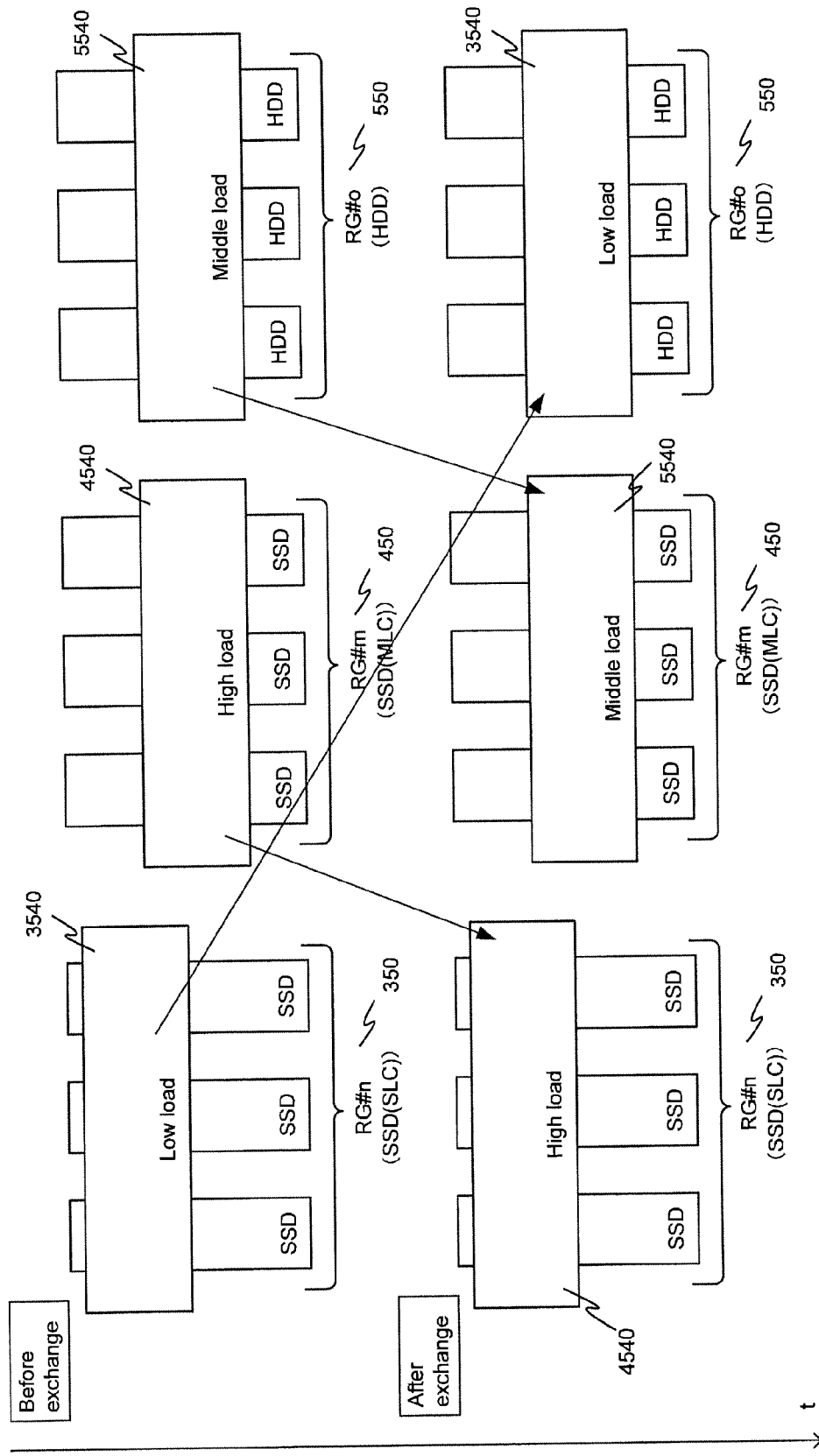
FIG. 30 is a schematic illustrative drawing showing an execution pattern E of an inter-device WL.

FIG. 30 is a schematic illustrative drawing showing an execution pattern E of an inter-device WL.

For the pattern E, a data movement is executed in accordance with a characteristic of a device that affects a remaining length of life of the storage media.

The RG #n 350 is configured by an SSD of an SLC type. The RG #m 450 is configured by an SSD of an MLC type. The RG #o 550 is configured by an HDD. In other words, the RG #n 350 is characterized by a high speed and a long life length. The RG #m 450 is characterized by a high speed and a short life length. The RG #o 550 is characterized by a low speed and no restriction of rewriting in a substantial way.

For the pattern E, a device that is most suitable for a stored destination of data is selected by using a difference in a characteristic for every device.

More specifically, the data that has been stored into an extent that is provided with a small FM WR predicted amount among is stored into an extent that is provided with a small FM WR predicted amount of the SSD of an SLC type, the data that is provided with a high read load is stored into an extent that is provided with a small FM WR predicted amount of the SSD of an MLC type, and the data that is provided with a low read load is moved to an HDD.

As described above, in the case in which a data movement is executed between devices that are provided with different characteristic, each of data can be stored into a device of a type that is most suitable for the I/O characteristic.

To simplify the descriptions, FIG. 30 shows an example of the pattern A (a data movement between RGs). However, the pattern E can also be applied to both of the pattern B (a data movement between RGs and a data movement between SSDs that are basis of the same extent) and the pattern C (a data movement between RGs in a specific data unit).

Figure 31:
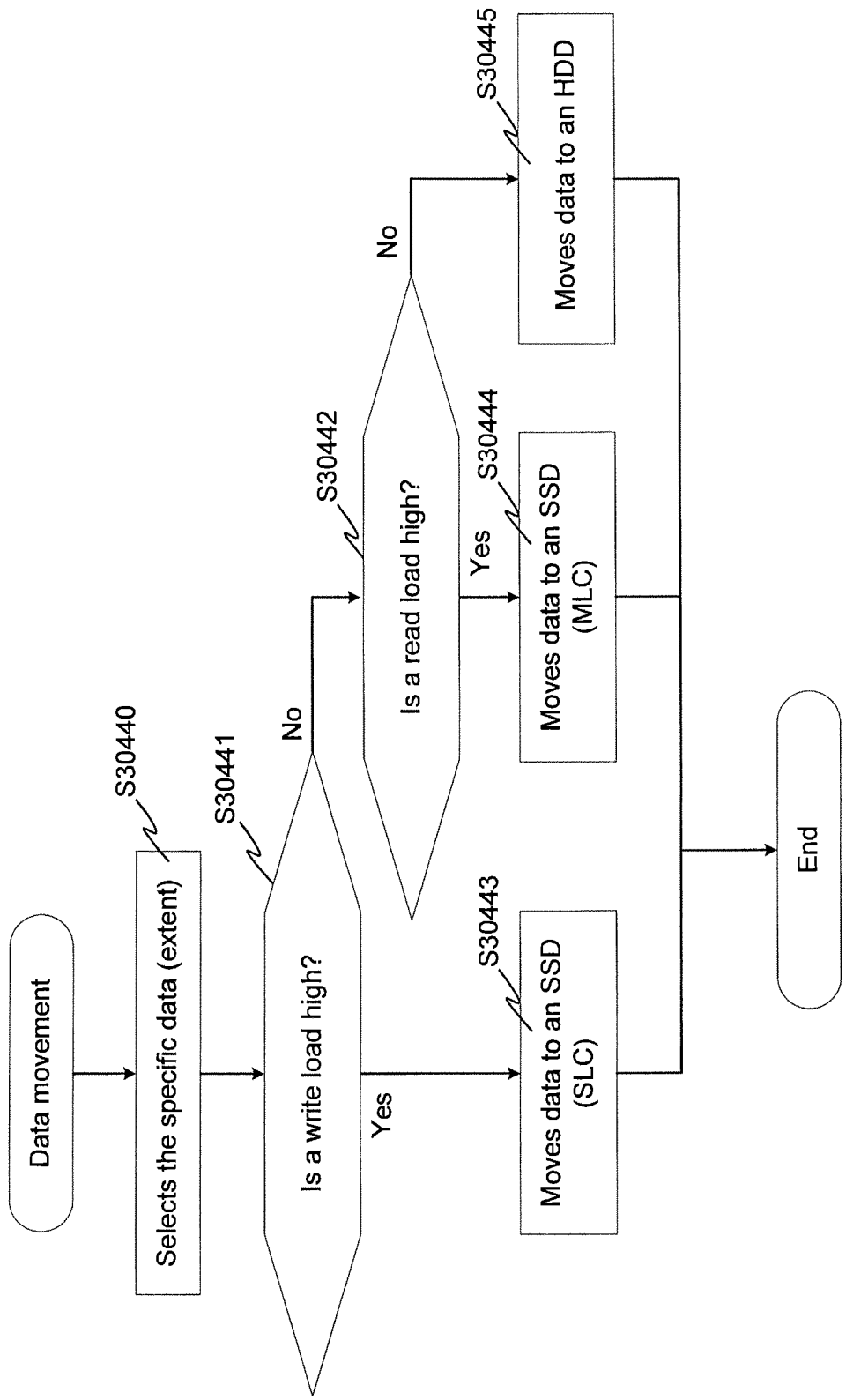
FIG. 31 is a sequence drawing showing an example of an execution pattern E of an inter-device WL.

FIG. 31 is a sequence drawing showing an example of an execution pattern E of an inter-device WL.

The processor 104 selects a specific extent that is a processing target based on the Disk management TBL 13100, the RG management TBL 13200, the extent management TBL 13400, and the FM WR amount prediction TBL 13700 (S30440). In the description of FIG. 31 in the following, an extent that has been selected in the S30440 is referred to as a "target extent".

In the next place, the processor 104 judges whether or not a target extent includes a region that is provided with a large FM WR predicted amount based on the Disk management TBL 13100, the RG management TBL 13200, the extent management TBL 13400, and the FM WR amount prediction TBL 13700 (S30441). In the case in which the result of the judgment is positive (S30441: Yes), the processor 104 moves data in the target extent to an extent based on an SSD of an SLC type (S30443) and terminates the present processing.

On the other hand, in the case in which the result of the judgment of the S30441 is negative (S30441: No), the processor 104 judges whether or not a read load of a target extent is high (S30442).

In the case in which the result of the judgment is positive (S30442: Yes), the processor 104 moves data in the target extent to an extent based on an SSD of an MLC type (S30444) and terminates the present processing.

On the other hand, in the case in which the result of the judgment of the S30442 is negative (S30442: No), the processor 104 moves data in the target extent to an extent based on an HDD (S30445) and terminates the present processing.

FIG. 32 is a sequence drawing showing an example of an execution pattern F of an inter-device WL.

For the pattern F, the data is moved in accordance with a life length of a device. The processor 104 selects a specific extent that is a processing target based on the Disk management TBL 13100, the RG management TBL 13200, the extent management TBL 13400, and the FM WR amount prediction TBL 13700 (S30450).

An extent that is selected here is an extent that is provided with a large FM WR predicted amount. In the description of FIG. 32 in the following, an extent that has been selected in the S30450 is referred to as a "target extent".

In the next place, the processor 104 judges whether or not data in the target extent can be stored into an extent based on an SSD of an MLC type from a point of view of a length of life (S30451). More specifically, the processor 104 refers to the Disk management TBL 13100 and checks whether or not a remaining life length period 13107 of an SSD is shorter than a remaining guarantee period 13104 of the SSD for each of the SSD of an MLC type that configures the same RG. This is because in the case in which a remaining life length period 13107 of an SSD is shorter than a remaining guarantee period 13104 of the SSD for each of the SSD of an MLC type that configures the same RG, a high write load that exceeds an acceptable amount occurs for the SSD of an MLC type, and a problem of a length of life cannot be solved even in the case in which a movement destination of data is an extent based on the SSD of an MLC type.

In the case in which a remaining life length period 13107 of all SSDs of an MLC type is shorter than a remaining guarantee period 13104 of the SSD (S30451: No), the processor 104 tries to move data to an extent based on the SSD of an SLC type that is provided with a length of life longer than that of the SSD of an MLC type (S30452). This is possible in the case in which the processor 104 refers to the Disk management TBL 13100 and judges whether or not a remaining life length period 13107 of an SSD is shorter than a remaining guarantee period 13104 of the SSD for the SSD of an SLC type that configures the same RG.

In the case in which the SSD of an SLC type is not suitable as a movement destination (S30452: No), the processor 104 decides that an HDD that is not provided with an upper limit of a rewriting is a movement destination of data (S30455).

In the case in which the SSD of an MLC type has the capacity to a length of life as a result of the judgment of the step S30451 (S30451: Yes), the processor 104 decides that the SSD of an MLC type is a movement destination of data (S30453).

In the case in which the SSD of an SLC type has the capacity to a length of life as a result of the judgment of the step S30452 (S30452: Yes), the processor 104 decides that the SSD of an SLC type is a movement destination of data (S30454).

Embodiment 2

An embodiment 2 will be described in the next place. The present embodiment includes many of common parts with the embodiment 1. Consequently, in the present embodiment, a part that is different from the embodiment 1 will be described mainly. In the case in which a WL target is selected in the embodiment 2, a predicted WA (see FIG. 36) is used in addition to the FM WR predicted amount.

Since a unique processing of the SSD such as a WL and a reclamation processing occurs in the SSD 700 in general, there is a characteristic in which an amount of data that is written to a flash memory as a practical matter is larger than an amount of data that has been received from the storage controller 100 by the SSD 700. This is called a WA (Write Amplification). An increase in a write data amount due to a processing in an SSD depends on an access pattern and a size of write data or the like.

In the case in which a write data amount is increased by a unique processing in the SSD, an erasing frequency is also increased in accordance with the step. In the present embodiment consequently, an accuracy of an inter-device WL is improved by predicting a WA.

The WA will be described in detail in the following in the first place.

The WA is a rate that is obtained by dividing the following (b) by (a) ((b)/(a)):

(a) an amount of data that has been received from the storage controller 100 by the SSD; and (b) an amount of data that is written to a flash memory as a practical matter.

For instance, in the case in which the SSD 700 receives WR data from the storage controller 100 in the state in which no data has been written to the SSD 700, the data is written to a free page without any change, whereby the predicted WA have a high probability of being "1.0". Moreover for instance, in the case in which the effective data has been written to a page of the SSD 700 and a reclamation processing is required without a free page, a page that is a movement destination of the effective data and a page in which data from the storage controller 100 is to be written are required, whereby the predicted WA exceeds "1.0".

However, it is not always true that the WA 13707 is small even in the case in which the WR amount 13706 is small. This is because a unique processing of the SSD such as a WL and a reclamation processing occurs in the SSD 700.

The reclamation processing is a processing in which a free block is generated by collecting pages that store the effective data to write to another block, by generating a block that is provided with only the ineffective data, and by erasing data in the block in the case in which a free block is started to be depleted for instance.

Moreover in general, the WA has a characteristic in which a random I/O (also referred to as a random access) is larger than a sequential I/O (also referred to as a sequential access).

The sequential I/O is an I/O to a continuous LBA space in general. Consequently, there is a high possibility that new data is written to all pages that configure one block. Therefore, all data that exist in the block are not ineffective data in some case and a free page can be formed only by executing an erasing processing to the block. Accordingly, since there is a low necessity of moving data for the sequential I/O, a page that is a movement destination of data is not consumed and there is a high possibility that the WA is "1" or a numerical value that is close to "1".

The random I/O is an I/O to a discontinuous LBA in general and a plurality of blocks is I/O destinations in some cases for instance. In this case, there is a high possibility that much effective data is included in one block. Consequently, a data amount that is moved in a reclamation processing is larger as compared with a sequential write. Therefore, there is a high possibility that the WA is a numerical value that is larger than "1".

Moreover in general, the WA is larger for a small size I/O as compared with a large size I/O. Here, a small size I/O means that a size of data that is associated with an I/O command is small. A large size I/O means that a size of data that is associated with an I/O command is large. In the case in which data of 512 B is transmitted to an SSD as a write target for instance and the minimum write unit (page) is 8192 B, one page of 8192 B is consumed and data of 512 B is stored. This is equal to that a write of data of 16 times as compared with a size of data to an SSD is executed to an internal flash memory. This depends on an I/O size and a page size.

Moreover, a value of a WA also depends on an existence or non-existence of a compression function of an SSD, an existence or non-existence of a duplication exclusion function of an SSD, and a type of a compression algorithm of a compression function. This is because data in which a compression effect or a duplication exclusion effect is high is provided with a small write data size.

Moreover, a value of a WA also depends on a cache hit rate in an SSD. This is because a write to a flash memory does not occur in the case in which write data is updated on a cache in an SSD.

Moreover, a value of a WA also depends on a data storage rate of an SSD (a rate of the total amount of user data to a capacity of an SSD).

In the case in which user data of 50 GB has been stored into an SSD that is provided with a physical capacity of 100 GB for instance, the SSD can utilize a remaining region of 50 GB as a free page. Even in the case in which all of the user data of 50 GB is updated to new data, the new data can be written to a remaining free page of 50 GB. At this time, since the updated data is invalid data all, a free page can be formed by only executing an erasing processing in the reclamation processing. Consequently, in the case in which a data storage rate of an SSD is small (more specifically, a half or less), an efficiency of the reclamation is improved and there is a high possibility that the WA comes close to "1".

As described above, a WA is affected by a wide variety of factors. In the present embodiment, the storage controller predicts a WA in consideration of these (see FIG. 34).

FIG. 33 is a view showing a configuration example of an FM WR amount prediction TBL 13700 in accordance with the present embodiment.

The FM WR amount prediction TBL 13700 includes the information that is required for predicting a data amount that is written in an SSD as a practical matter.

The FM WR amount prediction TBL 13700 is configured based on the statistics information management TBL 13600. The FM WR amount prediction TBL 13700 is provided with a Disk #13701, an extent #13702, an average WR I/O Size 13703, a WR I/O Pattern 13704, a WR rate 13705, a WR amount 13706, a predicted WA (Write Amplification) 13707, and an FM WR predicted amount 13708 for every Disk.

The Disk #13701 is an identifier of the Disk and a unique number. The extent #13702 is an identifier of an extent and a unique number.

The average WR I/O Size 13703 is an average size of data in which an address range that is corresponded to an extent in an address range of the Disk is a WR I/O destination. The WR I/O Pattern 13704 indicates whether a pattern of a WR I/O is a random pattern or a sequential pattern. The WR rate 13705 indicates a rate of a WR command of an I/O to an address range that is corresponded to an extent in an address range of the Disk. The WR amount 13706 indicates a total amount of WR data in which an address range that is corresponded to an extent in an address range of the Disk is a write destination.

The predicted WA 13707 is a numerical value that predicts a multiple number of an increase of WR data from the storage controller 100 in the SSD 700. The predicted WA is based on a WA information storage TBL 13800 described later.

The FM WR predicted amount 13708 indicates a predicted amount of data that is written to a flash memory as a practical matter. The value is a numerical value that is obtained based on the WR amount 13706 and the predicted WA 13707 (a product of the WR amount 13706 and the predicted WA 13707).

The present table 13700 is a table for comprehending a data amount in a unit of an extent in the SSD 700 for a write data amount that has been transmitted from the storage controller 100 to the SSD 700.

The Disk #13701 to the WR amount 13706 are updated based on the statistics information management TBL 13600.

FIG. 34 is a view showing a configuration example of a WA information storage table 13800 in accordance with a second embodiment.

The WA information storage table 13800 is provided with a WR I/O pattern 13801, an average WR I/O size 13802, and a predicted WA 13803. It is thought that the WA is also affected by factors other than a WR I/O pattern and an average WR I/O size. However, the present embodiment is based on a concept that an influence of a WR I/O pattern and an average WR I/O size to the WA is large. As substitute for or in addition to an average WR I/O size, the maximum (or minimum) WR I/O size in a unit time can also be adopted. Moreover, the predicted WA 13803 can also be determined based on not only the WR I/O pattern 13801 and the average WR I/O size 13802 but also any items (a WR IOPS 13603, an RD IOPS 13604, a WR rate 13607, a WR amount 13608, and an RD amount 13609) of the statistics information management TBL 13600. Moreover, the information that is included in the statistics information (see FIG. 9) is the information that can be easily acquired by monitoring an I/O by the storage controller 100 (the statistics information may be installed in advance as a function of the storage controller 100). Consequently, an WA can be predicted without executing a communication overhead between the storage controller and an SSD.

The WR I/O pattern 13801 indicates an I/O pattern of a write. The average WR I/O size 13802 indicates an average value of a size of write data. The predicted WA 13803 indicates a value of a WA that is predicted to the I/O pattern and the average I/O size.

In the present embodiment, in the case in which an I/O pattern is sequential, a predicted WA is 1.0 regardless of an average I/O size. In the case in which an I/O pattern is random, a predicted WA is larger as an I/O size is smaller.

In the case in which an SSD is provided with a compression function or a duplication exclusion function, the compression function and the duplication exclusion function can be added to the WA information storage table 13800. The data of a specific pattern (such as all zero data) is provided with a high compression effect, and a write amount in an SSD is small. Consequently, in the case in which the storage controller 100 has a high tendency to write a data pattern in which a compression effect or a duplication exclusion effect is high to an SSD, the predicted WA is made small.

Moreover, in the case in which the storage controller 100 acquires a value of a cache hit rate in an SSD from the SSD and a cache hit rate is high, the predicted WA can be made small.

Moreover, in the case in which the storage controller 100 acquires a data storage rate in an SSD from the SSD and a data storage rate is small, the predicted WA can be made small.

As described above, in the case in which the storage controller 100 acquires the internal information from the SSD and predicts a WA, an accuracy of the predicted WA can be more improved.

Since a basic flow of an inter-device WL is equal to that of the embodiment 1, the descriptions are omitted. The processing of the S303 shown in FIG. 20 is different as described in the following.

Figure 35:
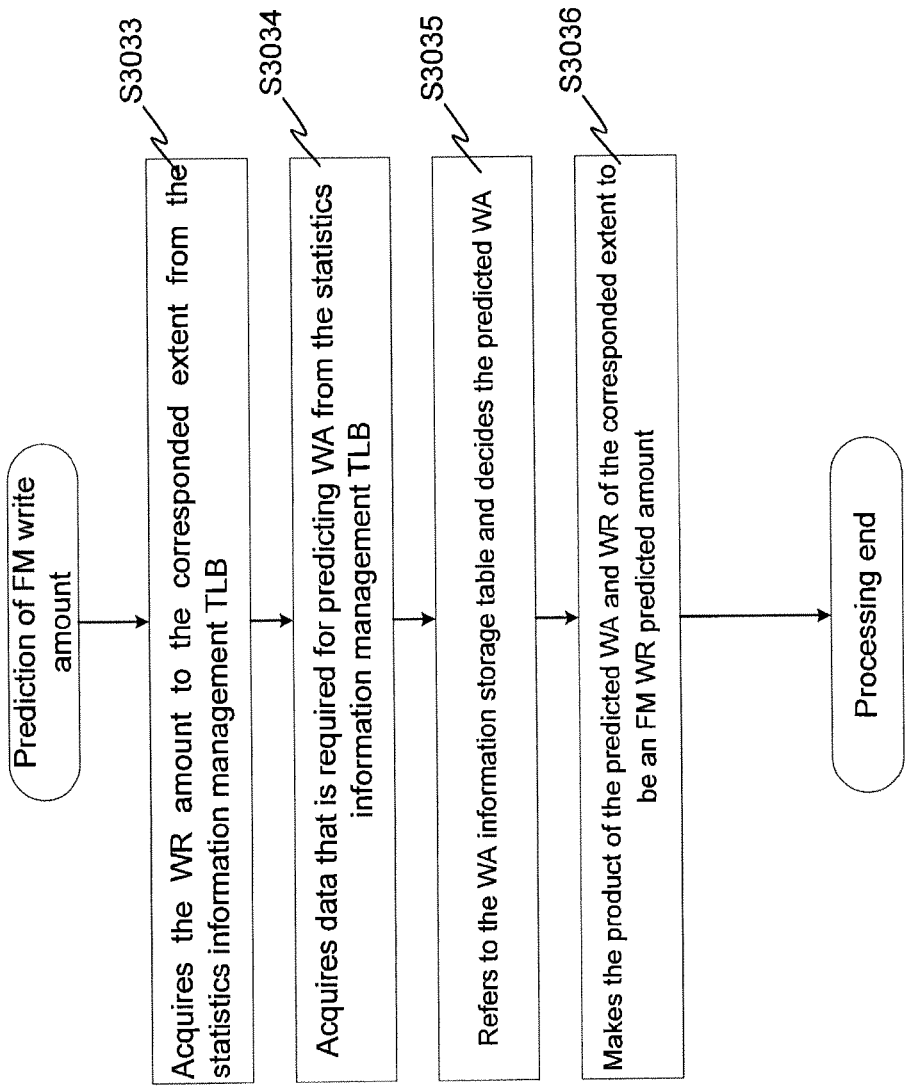
FIG. 35 is a sequence drawing showing an example of a flow of an FM WR amount prediction in accordance with a second embodiment (S303 of FIG. 20).

FIG. 35 is a sequence drawing showing an example of a flow of S303 (a prediction of a write amount of a flash memory) of FIG. 20.

The processor 104 acquires a WR amount to an extent from the statistics information management TBL 13600 (S3033).

The processor 104 acquires an average WR I/O Size 13703, a WR I/O Pattern 13704, and a WR amount 13706 that are the statistics information that is required for the FM WR amount prediction TBL 13700 based on the information of the statistics information management TBL 13600 (S3034).

In the next place, the processor 104 acquires a value of a predicted WR13803 from the WA information storage TBL 13800 based on the information that has been acquired in the S3034 (S3031).

In the next place, the processor 104 calculates the FM WR predicted amount 13708 based on the predicted WA 13803 and the WR amount 13706 to an extent. Here, the FM WR predicted amount 13708 is calculated by a product of the predicted WA 13803 and the WR amount 13706 to an extent.

In the present embodiment, the FM WR predicted amount 13708 is obtained not only by the WR amount 13706 but also based on the WR amount 13706 to an extent and the predicted WA 13707. Consequently, an inter-device WL with a higher degree of precision can be executed, thereby lengthening a life length of an SSD.

Embodiment 3

An embodiment 3 will be described in the next place. The present embodiment includes many of common parts with the embodiments 1 and 2. Consequently, in the present embodiment, a part that is different from the embodiments 1 and 2 will be described mainly.

In the embodiment 3, a granularity of the information that is acquired by the storage controller 100 is expanded in a Chunk unit. In this case, the statistics information 25200 shown in FIG. 17 can include the information 23210 in an SSD unit and the information 23220 in a Chunk (an aggregate of a plurality of extents) unit. Moreover, the address information 25100 (see FIG. 17) includes the information in a unit of an SSD and the logical physical conversion information in a Chunk unit.

Consequently, the processor 104 can comprehend a Chunk to which an extent belongs. In other words, the information that is acquired by the storage controller 100 for the present embodiment is more detailed as compared with that of the embodiments 1 and 2. Consequently, a predicted accuracy of an FM WR amount is improved, thereby improving an accuracy of an inter-device WL. A specific point that has been modified from the embodiment 1 will be described with reference to FIG. 36.

FIG. 36 is a view showing a configuration example of an FM WR amount prediction TBL 13700 in accordance with the present embodiment.

A difference from the embodiment 1 (FIG. 10) is that the FM WR amount prediction TBL 13700 includes the information of the Chunk #13710 and the Chunk WR amount 13711. The Chunk #13710 indicates the number of a Chunk to which an extent belongs. The Chunk WR amount 13711 indicates the total value of an FM WR amount that is corresponded to a Chunk (an amount of data that has been written to a flash memory region that is corresponded to a Chunk) In the case in which the information of the Chunk WR amount 13711 in which a notification granularity is higher than that of the information in a unit of an SSD is referred to, the present embodiment enables the FM WR predicted amount 13708 to be calculated with a higher degree of accuracy as compared with the embodiment 1.

By the above method, even in the case in which it is difficult that the internal information of an SSD is comprehended in detail, an inter-device WL can be implemented with a high degree of accuracy in the case in which the storage controller 100 predicts an internal status of an SSD (for instance, the FM WR predicted amount 13708) based on the statistics information 25200.

For an execution of an inter-device WL, as the information for making a decision for predicting a data write amount in the SSD by the storage controller 100, it is also possible to use a write I/O frequency and/or a data write amount for every extent.

In the embodiment 1 to the embodiment 3, the storage controller 100 executes a processing for converting a remaining erasing frequency to the number of remaining dates. However, an SSD can also directly notify of the number of remaining dates. This can be implemented in the case in which an SSD is provided with a function for converting a remaining erasing frequency to the number of remaining dates as shown in FIG. 21 for instance.

In the embodiment 1 to the embodiment 3, an erasing frequency or an FM WR predicted amount is used for calculating a remaining length of life. However, a flash memory is provided with a characteristic in which as a time from a write (programming) of data to an erasing is shorter, the flash memory is deteriorated more easily. Consequently, in the case in which a remaining length of life is calculated, not only an erasing frequency and an FM WR predicted amount but also an index "degree of deterioration" in consideration of a time from a write to an erasing can also be used.

As a degree of deterioration, an accumulation of values (points) that are corresponded to a time elapsed from a previous write for every erasing of a block can be used for instance. More specifically, a degree of deterioration can be managed by adding points that are corresponded to an elapsed time for every erasing as 40 points in the case in which data is erased within 5 minutes from a time when data was written and 35 points in the case in which data is erased within 10 minutes from a time when data was written for instance.

In the case in which the maximum value (upper limit) of a degree of deterioration is determined in advance, a length of life can be predicted by a rate of increase in a degree of deterioration. By this step, a length of life can be predicted with a higher degree of accuracy as compared with the case in which only an FM WR predicted amount and an erasing frequency are used, thereby executing an inter-device WL with a high degree of accuracy.

In the embodiment 1 to the embodiment 3, a processing for executing an inter-device WL in a unit of an extent was described. However, an inter-device WL can also be executed in a unit of an LU (Logical unit). In this case, the storage controller 100 acquires the statistics information in a unit of an LU. For other processing, a RAID group of a movement source (a RAID group that is provided with a short length of life) and a RAID group of a movement destination (a RAID group that is provided with a long length of life) are selected based on a length of life of a RAID group similarly to the above embodiments, and data that has been stored into an LU is moved based on a predicted write amount (a write load) of the RAID group of a movement source and the RAID group of a movement destination that have been selected.

REFERENCE SIGNS LIST

10: Storage apparatus

The invention claimed is:

1. A storage control method for a storage apparatus including a storage controller and a plurality of nonvolatile semiconductor storage units, each including a plurality of nonvolatile semiconductor memory chips, each of the plurality of nonvolatile semiconductor memory chips including a plurality of blocks, the method comprising the steps of:
 managing life length information based on at least erasing frequency of the plurality of blocks and providing logical storage regions corresponding to the plurality of nonvolatile semiconductor memory chips;
 writing data to a nonvolatile semiconductor storage unit that is a basis of a logical storage region of a write destination of a plurality of logical storage regions;
 sending a request to each of the nonvolatile semiconductor storage units for acquiring the life length information;
 sending the life length information to the storage controller in response to the request;
 identifying, based on the life length information, a first nonvolatile semiconductor storage unit, and a second nonvolatile semiconductor storage unit that has a remaining length of life longer than a remaining length of life of the first nonvolatile semiconductor storage unit;
 transferring data from a first logical storage region of the first nonvolatile semiconductor storage unit to a second logical storage region of the second nonvolatile semiconductor storage unit;
 determining whether the remaining life length of a particular nonvolatile semiconductor storage unit is shorter than a remaining guarantee period;
 moving, when it is determined that the remaining life length of the particular nonvolatile semiconductor storage unit is shorter than the remaining guarantee period, data to a hard disk drive (HDD) that is free of an upper limit of rewriting, wherein:
 the plurality of nonvolatile semiconductor storage units configure a plurality of nonvolatile semiconductor storage RAID groups,
 a plurality of HDDs configure a HDD RAID group, and
 data is moved between the nonvolatile semiconductor storage RAID groups and the HDD RAID group in a unit of an extent;
 determining whether the remaining life length of a first nonvolatile semiconductor storage RAID group is shorter than a remaining guarantee period of the first nonvolatile semiconductor storage RAID group;
 moving, when it is determined that the remaining life length of the first nonvolatile semiconductor storage RAID group is shorter than the remaining guarantee period of the first nonvolatile semiconductor storage RAID group, data to a second nonvolatile semiconductor storage RAID group having a remaining life length that is longer than a remaining guarantee period of the second nonvolatile semiconductor storage RAID group;
 determining whether the remaining life length of all of the nonvolatile semiconductor storage RAID groups is shorter than a remaining guarantee period of all of the nonvolatile semiconductor storage RAID groups; and
 moving, when it is determined that the remaining life length of all of the nonvolatile semiconductor storage RAID groups is shorter than the remaining guarantee period of all of the nonvolatile semiconductor storage RAID groups, data to the HDD RAID group.

2. A storage apparatus, comprising:
 a plurality of nonvolatile semiconductor storage units, each including a memory controller and a plurality of nonvolatile semiconductor memory chips, each of the nonvolatile semiconductor memory chips including a plurality of blocks as a unit of data erasing, the memory controller being configured to manage life length information based on at least erasing frequency of the plurality of blocks and provide logical storage regions corresponding to the nonvolatile semiconductor memory chips; and a storage controller coupled to the plurality of nonvolatile semiconductor storage units, wherein:

the storage controller is configured to write data to a nonvolatile semiconductor storage unit that is a basis of a logical storage region of a write destination of a plurality of logical storage regions, the storage controller is configured to send a request to each of the nonvolatile semiconductor storage units for acquiring the life length information, the memory controller of each of the nonvolatile semiconductor storage units is configured to send the life length information to the storage controller in response to the request, the storage controller is configured to identify, based on the life length information, a first nonvolatile semiconductor storage unit, and a second nonvolatile semiconductor storage unit that has a remaining length of life longer than a remaining length of life of the first nonvolatile semiconductor storage unit, the storage controller is configured to transfer data from a first logical storage region of the first nonvolatile semiconductor storage unit to a second logical storage region of the second nonvolatile semiconductor storage unit, the storage controller is configured to determine whether the remaining life length of a particular nonvolatile semiconductor storage unit is shorter than a remaining guarantee period, and move, when it is determined that the remaining life length of the particular nonvolatile semiconductor storage unit is shorter than the remaining guarantee period, data to a hard disk drive (HDD) that is free of an upper limit of rewriting, wherein the plurality of nonvolatile semiconductor storage units configure a plurality of nonvolatile semiconductor storage RAID groups, the plurality of HDDs configure a HDD RAID group, the storage controller is configured to move data between the nonvolatile semiconductor storage RAID groups and the HDD RAID group in a unit of an extent, the storage controller is configured to determine whether the remaining life length of a first nonvolatile semiconductor storage RAID group is shorter than a remaining guarantee period of the first nonvolatile semiconductor storage RAID group, and move, when it is determined that the remaining life length of the first nonvolatile semiconductor storage RAID group is shorter than the remaining guarantee period of the first nonvolatile semiconductor storage RAID group, data to a second nonvolatile semiconductor storage RAID group having a remaining life length that is longer than a remaining guarantee period of the second nonvolatile semiconductor storage RAID group, and the storage controller is configured to determine whether the remaining life length of all of the nonvolatile semiconductor storage RAID groups is shorter than a remaining guarantee period of all of the nonvolatile semiconductor storage RAID groups, and move, when it is determined that the remaining life length of all of the nonvolatile semiconductor storage RAID groups is shorter than the remaining guarantee period of all of the nonvolatile semiconductor storage RAID groups, data to the HDD RAID group.

3. The storage apparatus according to claim 1, wherein each of the nonvolatile semiconductor storage units is a basis of a logical storage region.

4. The storage apparatus according to claim 1, wherein:
the storage controller is configured to:
acquire the life length information from each of the nonvolatile semiconductor memory chips on a regular basis or on an irregular basis for instance and store the life length information that has been acquired from each nonvolatile semiconductor memory chip, store statistics information that is related to a write for the first and second logical storage regions and store remaining life length information that is related to a remaining length of life of each of the nonvolatile semiconductor memory chips for the plurality of nonvolatile semiconductor memory chips, identify the first logical storage region for the first nonvolatile semiconductor storage unit and the second logical storage region that is provided with a write load higher than a write load of the first logical storage region for the second nonvolatile semiconductor storage unit based on the statistics information that is related to a write for the first and second logical storage regions, and read data from a first logical storage region and a second logical storage region, and write data that has been read from the first logical storage region to the second logical storage region or write data that has been read from the second logical storage region to the first logical storage region.

5. The storage apparatus according to claim 4, wherein: the life length information for each nonvolatile semiconductor memory chip includes a numerical value that is related to a remaining length of life of the nonvolatile semiconductor memory chip as the remaining life length information and is information in a unit larger than a minimum unit of a storage region that is included in the nonvolatile semiconductor memory chip, and the storage controller is configured to predict a remaining length of life of the nonvolatile semiconductor memory chip based on the numerical value in the life length information that has been acquired at a first point of time and the numerical value in the life length information that has been acquired at a second point of time before the first point of time for each of the nonvolatile semiconductor memory chips.

6. The storage apparatus according to claim 5, wherein:
a write load for a logical storage region based on the nonvolatile semiconductor memory chips conforms to a write amount that is a total amount of data that has been transmitted to the logical storage region as a write destination.

7. The storage apparatus according to claim 6, wherein:
the write load for the logical storage region is based on the write amount and a predicted write increase-decrease rate that is obtained based on the statistics information by the storage controller, and the predicted write increase-decrease rate for the logical storage region is obtained based on the statistics information that is related to a write to the logical storage region.

8. The storage apparatus according to claim 7, wherein:
the statistics information that is related to the write to the logical storage region includes an average size of data that conforms to the write to the logical storage region or whether a write destination of the write to the logical storage region is sequential or random.

9. The storage apparatus according to claim 5, wherein:
the plurality of RAID groups include the plurality of nonvolatile semiconductor memory chips,
each nonvolatile semiconductor storage unit is a RAID group,
at least two logical storage region groups are defined for each of the plurality of RAID groups,
each of the at least two logical storage region groups is an aggregate of at least two logical storage regions that correspond to at least two nonvolatile semiconductor memory chips that configure the RAID group,
when the storage identifies, based on the life length information, the first nonvolatile semiconductor storage unit and the second nonvolatile semiconductor storage unit that has the remaining length of life longer than the remaining length of life of the first nonvolatile semiconductor storage unit, a first RAID group and a second RAID group that has a remaining length of life that is shorter than that of the first RAID group are identified based on a remaining length of life of each nonvolatile semiconductor memory chip,
the first RAID group and the second RAID group are the first nonvolatile semiconductor storage unit and the second nonvolatile semiconductor storage unit, respectively, and
when the storage controller identifies the first logical storage region and the second logical storage region that is provided with the write load higher than the write load of the first logical storage region based on the statistics information that is related to the write for each of the first and second logical storage regions, a first one of the at least two logical storage region groups is a logical storage region group based on the first RAID group and a second one of the at least two logical storage region groups is a logical storage region group based on the second RAID group.

10. The storage apparatus according to claim 9, wherein:
when for at least one of the first RAID group and the second RAID group, the at least two nonvolatile semiconductor memory chips, based on a logical storage region group to which the data read from one of the first and second logical storage regions has been written, vary in a remaining length of life and at least two logical storage regions that configure the logical storage region group vary in a write load, the storage controller is configured to exchange between the first logical storage region and the second logical storage region for an identical logical storage region group based on a write load of the at least two logical storage regions and a remaining length of life of the at least two nonvolatile semiconductor memory chips based on the logical storage region group to which the data read from one of the first and second logical storage regions has been written,
the first logical storage region is based on a first one of the at least two nonvolatile semiconductor memory chips,
the second logical storage region is based on a second one of the at least two nonvolatile semiconductor memory chips,
the second nonvolatile semiconductor memory chip is a nonvolatile semiconductor memory chip that has a remaining length of life that is shorter than a remaining length of life of the first nonvolatile semiconductor memory chip, and
the second logical storage region is a logical storage region that is provided with the write load that is higher than the write load of the first logical storage region.

11. The storage apparatus according to claim 10, wherein:
each logical storage region is configured by a plurality of stripe lines, and
in the case in which the data are exchanged between the first logical storage region and the second logical storage region for the identical logical storage region group based on the write load of the at least two logical storage regions and the remaining length of life of the at least two nonvolatile semiconductor memory chips based on the logical storage region group to which the data read from one of the first and second logical storage regions has been written, and at least two data that are stored into an identical stripe line are stored into an identical nonvolatile semiconductor memory chip, the storage controller is configured not to exchange data between the first logical storage region and the second logical storage region for the identical logical storage region group based on the write load of the at least two logical storage regions and the remaining length of life of the at least two nonvolatile semiconductor memory chips based on the logical storage region group to which the data read from one of the first and second logical storage regions has been written.

12. The storage apparatus according to claim 4, wherein:
the plurality of RAID groups include the plurality of nonvolatile semiconductor memory chips,
at least two logical storage region groups are defined for each of the plurality of RAID groups,
when the storage controller identifies, based on the life length information, the first nonvolatile semiconductor storage unit and the second nonvolatile semiconductor storage unit that has the remaining length of life longer than the remaining length of life of the first nonvolatile semiconductor, a first nonvolatile semiconductor memory chip in a first RAID group and a second nonvolatile semiconductor memory chip in a second RAID group that has a remaining length of life that is shorter than a remaining length of life of the first RAID group are identified based on a remaining length of life of each nonvolatile semiconductor memory chip,
the first nonvolatile semiconductor memory chip and the second nonvolatile semiconductor memory chip are the first nonvolatile semiconductor storage unit and the second nonvolatile semiconductor storage unit, respectively, and
when the storage controller identifies the first logical storage region for the first nonvolatile semiconductor storage unit and the second logical storage region that is provided with the write load higher than the write load of the first logical storage region for the second nonvolatile semiconductor storage unit based on the statistics information that is related to the write for the first and second logical storage regions, the first logical storage region is a logical storage region based on the first nonvolatile semiconductor memory chip and the second logical storage region is a logical storage region based on the second nonvolatile semiconductor memory chip.

13. The storage apparatus according to claim 12, wherein:
the storage controller is configured to provide a virtual volume that is configured by a plurality of virtual regions, allocate a logical storage region group to a virtual region of a write destination, and write data of a write target to the logical storage region group, and when the storage controller reads the data from the first logical storage region and the second logical storage region, and write the data that has been read from the first logical storage region to the second logical storage region or write data that has been read from the second logical storage region to the first logical storage region, the second logical storage region is allocated to a first virtual region to which a logical storage region group based on the first RAID group has been allocated as substitute for the first storage region of the logical storage region group, or the first logical storage region is allocated to a second virtual region to which a logical storage region group based on the second RAID group has been allocated as substitute for the second storage region of the logical storage region group.

14. The storage apparatus according to claim 5, wherein:
the RAID group includes the plurality of nonvolatile semiconductor memory chips,
at least two logical storage regions are defined based on the RAID group,
when the storage controller identifies, based on the life length information, the first nonvolatile semiconductor storage unit and the second nonvolatile semiconductor storage unit that has the remaining length of life longer than the remaining length of life of the first nonvolatile semiconductor storage, a first nonvolatile semiconductor memory chip and a second nonvolatile semiconductor memory chip that are included in a first RAID group are identified based on a remaining length of life of each nonvolatile semiconductor memory chip,
the first nonvolatile semiconductor memory chip and the second nonvolatile semiconductor memory chip are the first nonvolatile semiconductor storage unit and the second nonvolatile semiconductor storage unit, respectively, and
when the storage controller identifies the first logical storage region for the first nonvolatile semiconductor storage unit and the second logical storage region that is provided with the write load higher than the write load of the first logical storage region for the second nonvolatile semiconductor storage unit based on the statistics information that is related to the write for the first and second logical storage regions, the first logical storage region is a logical storage region based on the first nonvolatile semiconductor memory chip and the second logical storage region is a logical storage region based on the second nonvolatile semiconductor memory chip.

15. The storage apparatus according to claim 14, wherein:
a logical storage region group includes a plurality of stripe lines, and
in the case in which at least two data that are stored into the same stripe line are stored into the same nonvolatile semiconductor memory chip, the storage controller is configured not to exchange data between the first logical storage region and the second logical storage region for an identical logical storage region group based on a write load of the at least two logical storage regions and a remaining length of life of the at least two nonvolatile semiconductor memory chips based on the one logical storage region to which data has been written.

16. The storage apparatus according to claim 4, wherein:
the logical storage region of a write destination of the data that has been read from the first logical storage region and the second logical storage region is decided based on a read load of the logical storage region in addition to the write load for the logical storage region, and
a read load that conforms to an amount of data that is read in a unit time.

17. The storage apparatus according to claim 5, wherein:
the storage controller is configured to store information that indicates a period of guarantee of the nonvolatile semiconductor memory chips, and
the first nonvolatile semiconductor storage unit and the second nonvolatile semiconductor storage unit have characteristics of a remaining length of life and a period of guarantee, which are decided based on a result of a comparison of a remaining length of life of each nonvolatile semiconductor storage unit and a period of guarantee of each nonvolatile semiconductor storage unit.

18. The storage apparatus according to claim 5, wherein:
the numerical value is related to at least one of a remaining frequency of erasing and a real write amount, and
the real write amount of a nonvolatile semiconductor storage unit is a total amount of data that has been written in the nonvolatile semiconductor storage unit as a practical matter.

19. The storage apparatus according to claim 5, wherein:
a unit of the predicted remaining length of life is a day.

20. The storage apparatus according to claim 5, wherein:
the storage controller is configured to identify a nonvolatile semiconductor storage unit in which a remaining length of life is equal to or less than a threshold value based on the remaining life length information that has been acquired,
the storage controller is configured to identify the first logical storage region for the identified nonvolatile semiconductor storage unit and the second logical storage region that is provided with the write load higher than the write load of the first logical storage region based on the statistics information that is related to the write for the first and second logical storage regions, and
the storage controller is configured to read data from the first logical storage region and the second logical storage region, write data that has been read from the first logical storage region to the second logical storage region, or write data that has been read from the second logical storage region to the first logical storage region.

* * * * *